United States Patent
McCullough et al.

(10) Patent No.: US 11,124,289 B2
(45) Date of Patent: Sep. 21, 2021

(54) PRIORITIZING USE OF FLIGHT ATTITUDE CONTROLS OF AIRCRAFT

(71) Applicant: Textron Innovations Inc., Providence, RI (US)

(72) Inventors: John Richard McCullough, Weatherford, TX (US); Paul K. Oldroyd, Azle, TX (US)

(73) Assignee: Textron Innovations Inc., Providence, RI (US)

( * ) Notice: Subject to any disclaimer, the term of this patent is extended or adjusted under 35 U.S.C. 154(b) by 300 days.

(21) Appl. No.: 16/154,282

(22) Filed: Oct. 8, 2018

(65) Prior Publication Data
US 2019/0031338 A1    Jan. 31, 2019

Related U.S. Application Data

(63) Continuation-in-part of application No. 15/972,431, filed on May 7, 2018, now Pat. No. 10,597,164, (Continued)

(51) Int. Cl.
*B64C 13/16* (2006.01)
*B64C 29/02* (2006.01)
(Continued)

(52) U.S. Cl.
CPC .............. *B64C 13/16* (2013.01); *B64C 11/46* (2013.01); *B64C 29/02* (2013.01); *G05D 1/0077* (2013.01);
(Continued)

(58) Field of Classification Search
CPC ....... B64C 29/02; B64C 13/16; G01C 23/005; G05D 1/0858; G05D 1/08; G05D 1/0808
See application file for complete search history.

(56) References Cited

U.S. PATENT DOCUMENTS

| 1,655,113 A | 1/1928 | Nikola |
| 3,002,712 A | 10/1961 | Sterling |

(Continued)

FOREIGN PATENT DOCUMENTS

| CN | 105539833 A | 5/2016 |
| FR | 2977865 A3 | 1/2013 |

(Continued)

OTHER PUBLICATIONS

Air Launched Unmanned Disaster Relief Delivery Vehicle, 33rd Annual AHS Student Design Competition, University of Maryland, Undated but admitted prior art.
(Continued)

*Primary Examiner* — Magdalena Topolski
*Assistant Examiner* — Marisa V Conlon
(74) *Attorney, Agent, or Firm* — Lawrence Youst PLLC

(57) ABSTRACT

Systems and methods of prioritizing the use of flight attitude controls of aircraft operable to transition between thrust-borne lift in a VTOL orientation and wing-borne lift in a biplane orientation. A method includes determining an optimal flight attitude state for the aircraft during flight, the aircraft including first and second wings with first and second pylons coupled therebetween forming an airframe with a two-dimensional distributed thrust array and a plurality of aerosurfaces coupled to the airframe; monitoring the current flight attitude state of the aircraft; identifying deviations between the current flight attitude state and the optimal flight attitude state; ordering the flight attitude controls of the aircraft based upon the flight attitude control authority of each in the current flight attitude state; and implementing the highest order flight attitude control to bias the aircraft from the current flight attitude state toward the optimal flight attitude state.

16 Claims, 34 Drawing Sheets

Related U.S. Application Data which is a continuation-in-part of application No. 15/606,242, filed on May 26, 2017, now Pat. No. 10,501,193, which is a continuation-in-part of application No. 15/200,163, filed on Jul. 1, 2016, now Pat. No. 9,963,228.

(51) Int. Cl.
| | |
|---|---|
| *G05D 1/08* | (2006.01) |
| *G05D 1/00* | (2006.01) |
| *B64C 11/46* | (2006.01) |
| *B64D 27/24* | (2006.01) |
| *B64C 39/02* | (2006.01) |

(52) U.S. Cl.
CPC .......... *G05D 1/0858* (2013.01); *B64C 39/024* (2013.01); *B64C 2201/021* (2013.01); *B64C 2201/042* (2013.01); *B64C 2201/108* (2013.01); *B64D 27/24* (2013.01)

(56) References Cited

U.S. PATENT DOCUMENTS

| | | | |
|---|---|---|---|
| 3,081,964 A | 3/1963 | Quenzler | |
| 3,181,810 A | 5/1965 | Olson | |
| 3,259,343 A | 7/1966 | Roppel | |
| 3,289,980 A | 12/1966 | Gardner | |
| 3,350,035 A | 10/1967 | Schlieben | |
| 3,592,412 A | 7/1971 | Glatfelter | |
| 3,618,875 A | 11/1971 | Kappus | |
| 3,783,618 A | 1/1974 | Kawamura | |
| 3,916,588 A | 11/1975 | Magill | |
| 4,458,864 A | 7/1984 | Colombo et al. | |
| 4,571,157 A | 2/1986 | Eickmann | |
| 4,596,368 A | 6/1986 | Schmittle | |
| 4,613,098 A | 9/1986 | Eickmann | |
| 4,771,967 A | 9/1988 | Geldbaugh | |
| 4,913,377 A | 4/1990 | Eickmann | |
| 5,131,605 A | 7/1992 | Kress | |
| 5,592,894 A | 1/1997 | Johnson | |
| 5,842,667 A | 12/1998 | Jones | |
| 6,086,015 A | 7/2000 | MacCready | |
| 6,170,778 B1 | 1/2001 | Cycon et al. | |
| 6,260,793 B1 | 7/2001 | Balayn et al. | |
| 6,270,038 B1 | 8/2001 | Cycon et al. | |
| 6,402,088 B1 | 6/2002 | Syrovy et al. | |
| 6,655,631 B2 | 12/2003 | Austen-Brown | |
| 6,845,939 B1 | 1/2005 | Baldwin | |
| 6,886,776 B2 | 5/2005 | Wagner et al. | |
| 6,892,980 B2 | 5/2005 | Kawai | |
| 7,059,562 B2 | 6/2006 | Baldwin | |
| 7,150,429 B2 | 12/2006 | Kusic | |
| 7,210,654 B1 | 5/2007 | Cox et al. | |
| 7,465,236 B2 | 12/2008 | Wagels | |
| 7,472,863 B2 | 1/2009 | Pak | |
| 7,555,893 B2 | 7/2009 | Okai et al. | |
| 7,984,684 B2 | 7/2011 | Hinderks | |
| 8,152,096 B2 | 4/2012 | Smith | |
| 8,505,846 B1 | 8/2013 | Sanders | |
| 8,602,348 B2 | 12/2013 | Bryant | |
| 8,733,690 B2 | 5/2014 | Bevirt et al. | |
| 8,800,912 B2 | 8/2014 | Oliver | |
| 8,820,672 B2 | 9/2014 | Erben et al. | |
| 8,833,692 B2 | 9/2014 | Yoeli | |
| 8,909,391 B1 | 12/2014 | Peeters et al. | |
| 8,948,935 B1 | 2/2015 | Peeters et al. | |
| 9,022,312 B2 | 5/2015 | Kosheleff | |
| 9,045,226 B2 | 6/2015 | Piasecki et al. | |
| 9,087,451 B1 | 7/2015 | Jarrell | |
| 9,108,744 B2 | 8/2015 | Takeuchi | |
| 9,109,575 B2 | 8/2015 | Weddendorf et al. | |
| 9,120,560 B1 | 9/2015 | Armer et al. | |
| 9,127,908 B2 | 9/2015 | Miralles | |
| 9,162,753 B1 | 10/2015 | Panto et al. | |
| 9,187,174 B2 | 11/2015 | Shaw | |
| 9,193,460 B2 | 11/2015 | Laudrain | |
| 9,221,538 B2 | 12/2015 | Takahashi et al. | |
| 9,242,714 B2 | 1/2016 | Wang et al. | |
| 9,254,916 B2 | 2/2016 | Yang | |
| 9,284,049 B1 | 3/2016 | Wang et al. | |
| 9,321,530 B2 | 4/2016 | Wang et al. | |
| 9,376,208 B1 | 6/2016 | Gentry | |
| 9,388,794 B2 | 7/2016 | Weddendorf et al. | |
| 9,403,593 B2 | 8/2016 | Downey et al. | |
| 9,440,736 B2 | 9/2016 | Bitar | |
| 9,463,875 B2 | 10/2016 | Abuelsaad et al. | |
| 9,493,225 B2 | 11/2016 | Wang et al. | |
| 9,610,817 B1 | 4/2017 | Piasecki et al. | |
| 9,643,720 B2 | 5/2017 | Hesselbarth | |
| 9,694,908 B2 | 7/2017 | Razroev | |
| 9,694,911 B2 | 7/2017 | Bevirt et al. | |
| 9,714,087 B2 | 7/2017 | Matsuda | |
| 9,821,909 B2 | 11/2017 | Moshe | |
| 9,908,616 B1* | 3/2018 | Horn | B64C 13/04 |
| 9,963,228 B2 | 5/2018 | McCullough et al. | |
| 9,994,313 B2 | 6/2018 | Claridge et al. | |
| 10,011,351 B2 | 7/2018 | McCullough et al. | |
| 10,124,890 B2 | 11/2018 | Sada-Salinas et al. | |
| 10,183,746 B2 | 1/2019 | McCullough et al. | |
| 10,214,285 B2 | 2/2019 | McCullough et al. | |
| 10,220,944 B2 | 3/2019 | McCullough et al. | |
| 10,227,133 B2 | 3/2019 | McCullough et al. | |
| 10,232,950 B2 | 3/2019 | McCullough et al. | |
| 10,252,796 B2* | 4/2019 | Reichert | B64C 39/062 |
| 10,370,099 B2* | 8/2019 | Mahboubi | G05D 1/0858 |
| 10,464,670 B2* | 11/2019 | Enke | G05D 1/063 |
| 2002/0100834 A1 | 8/2002 | Baldwin | |
| 2002/0100835 A1 | 8/2002 | Kusic | |
| 2003/0062443 A1 | 4/2003 | Wagner et al. | |
| 2004/0245374 A1 | 12/2004 | Morgan | |
| 2006/0091258 A1 | 5/2006 | Chiu et al. | |
| 2006/0266881 A1 | 11/2006 | Hughey | |
| 2007/0221780 A1 | 9/2007 | Builta | |
| 2008/0237392 A1* | 10/2008 | Piasecki | G05D 1/0858 244/6 |
| 2009/0008499 A1 | 1/2009 | Shaw | |
| 2010/0147993 A1 | 6/2010 | Annati et al. | |
| 2010/0295321 A1 | 11/2010 | Bevirt | |
| 2011/0042508 A1 | 2/2011 | Bevirt | |
| 2011/0042509 A1 | 2/2011 | Bevirt et al. | |
| 2011/0057453 A1 | 3/2011 | Roberts | |
| 2011/0121570 A1 | 5/2011 | Bevirt et al. | |
| 2011/0315806 A1 | 12/2011 | Piasecki et al. | |
| 2012/0209456 A1 | 8/2012 | Harmon et al. | |
| 2012/0234968 A1 | 9/2012 | Smith | |
| 2013/0020429 A1 | 1/2013 | Kroo | |
| 2013/0175404 A1 | 7/2013 | Shefer | |
| 2014/0018979 A1 | 1/2014 | Goossen et al. | |
| 2014/0018980 A1* | 1/2014 | Bollapragada | G08G 5/0021 701/10 |
| 2015/0012154 A1 | 1/2015 | Senkel et al. | |
| 2015/0014475 A1 | 1/2015 | Taylor et al. | |
| 2015/0136897 A1 | 5/2015 | Seibel et al. | |
| 2015/0284079 A1 | 10/2015 | Matsuda | |
| 2015/0285165 A1 | 10/2015 | Steinwandel et al. | |
| 2016/0068265 A1 | 3/2016 | Hoareau et al. | |
| 2016/0180717 A1 | 6/2016 | Ubhi et al. | |
| 2016/0214712 A1 | 7/2016 | Fisher et al. | |
| 2016/0244159 A1* | 8/2016 | Bevirt | B64C 15/00 |
| 2017/0021924 A1 | 1/2017 | Kubik et al. | |
| 2017/0066531 A1 | 3/2017 | McAdoo | |
| 2017/0097644 A1 | 4/2017 | Fegely et al. | |
| 2017/0158312 A1 | 6/2017 | Alber et al. | |
| 2017/0240274 A1 | 8/2017 | Regev | |
| 2017/0297699 A1 | 10/2017 | Alber et al. | |
| 2017/0327219 A1 | 11/2017 | Alber | |
| 2017/0334557 A1 | 11/2017 | Alber et al. | |
| 2018/0002013 A1 | 1/2018 | McCullough et al. | |
| 2018/0002026 A1 | 1/2018 | Oldroyd et al. | |
| 2018/0081351 A1* | 3/2018 | Tankersley | G05D 1/0011 |

(56) References Cited

U.S. PATENT DOCUMENTS

2018/0244383 A1  8/2018  Valente et al.
2018/0265193 A1  9/2018  Gibboney et al.

FOREIGN PATENT DOCUMENTS

WO  2001074659 A1  10/2001
WO  2005039973 A2  5/2005
WO  2014067563 A1  5/2014

OTHER PUBLICATIONS

Bell and NASA Partner for UAV Development; Transportup.com; Sep. 9, 2018.
Bell APT—Automatic Pod Transport; SUASNEWS.com; Dec. 6, 2017.
Bell Autonomous Pod Transport; MONCH.com; May 2, 2018.

* cited by examiner

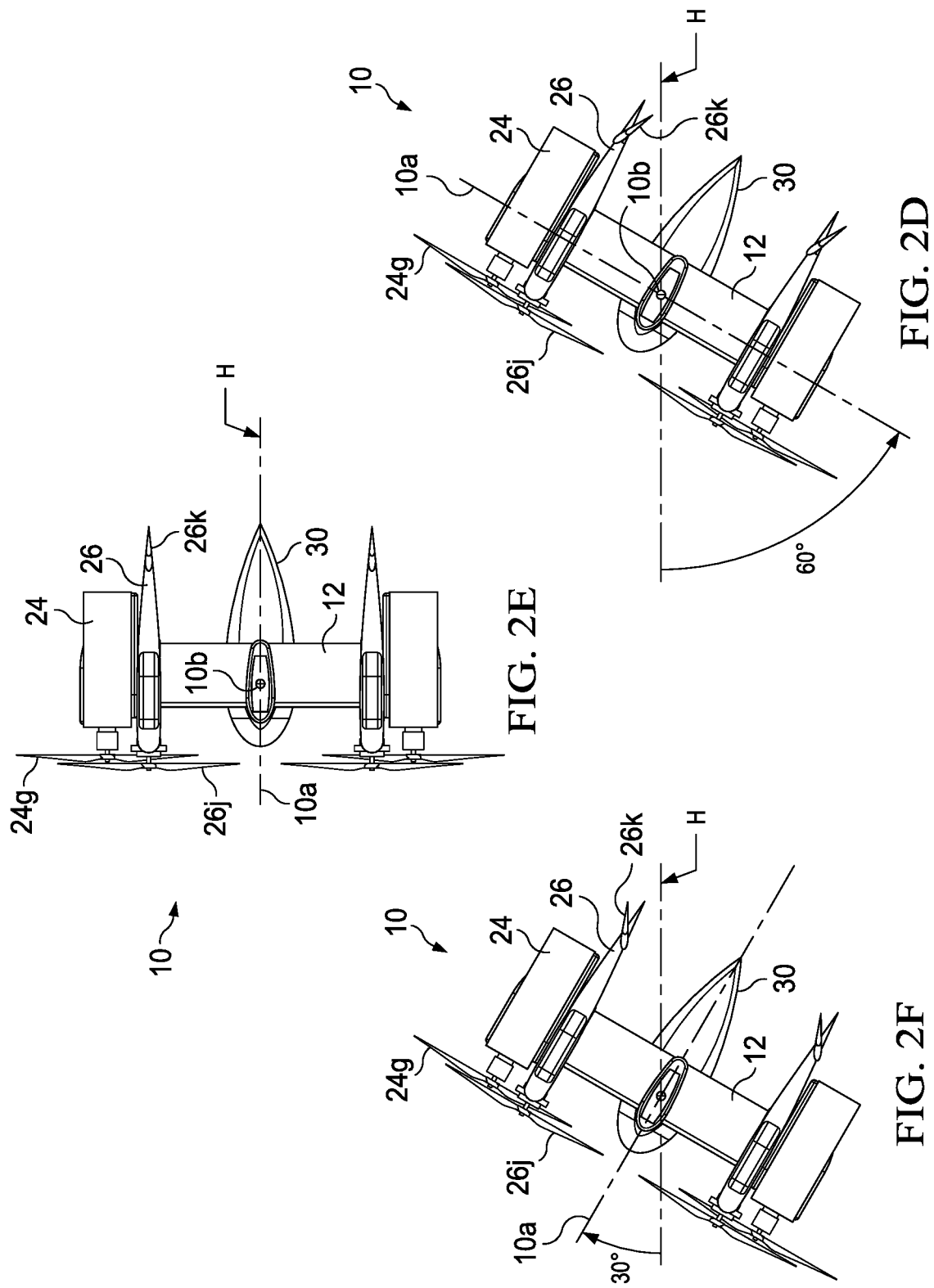

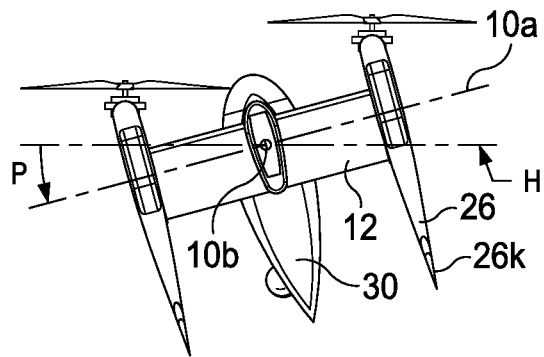
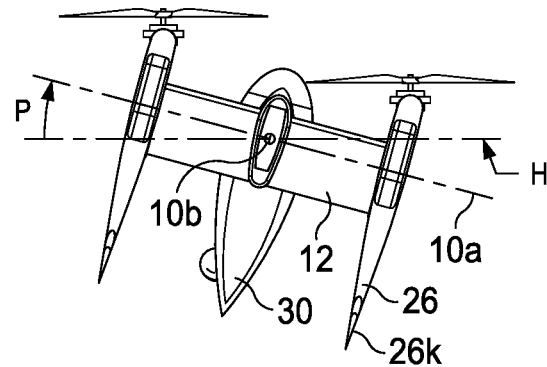
FIG. 18A  FIG. 18B
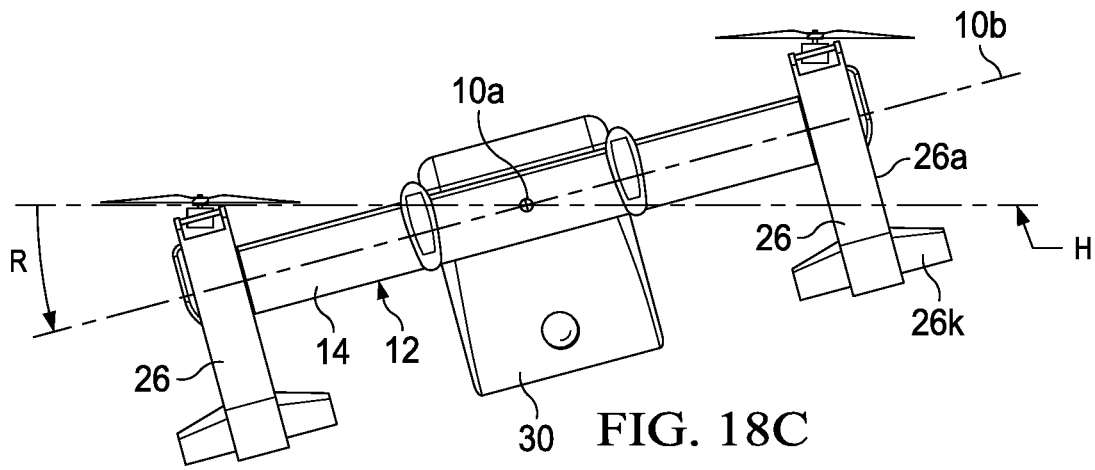
FIG. 18C
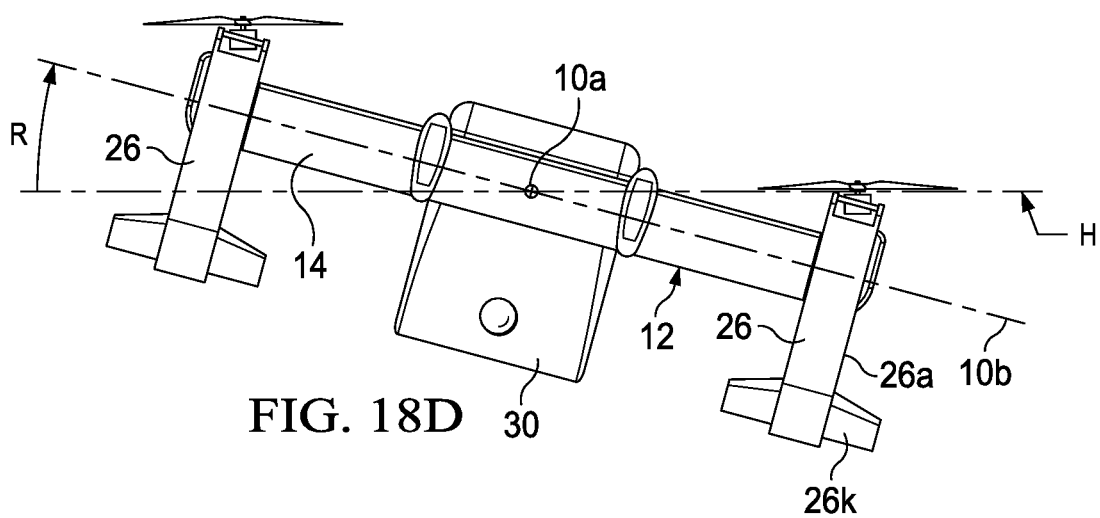
FIG. 18D

PRIORITIZING USE OF FLIGHT ATTITUDE CONTROLS OF AIRCRAFT

CROSS-REFERENCE TO RELATED APPLICATIONS

The present application is a continuation-in-part of application Ser. No. 15/972,431 filed May 7, 2018, which is a continuation-in-part of application Ser. No. 15/606,242 filed May 26, 2017, which is a continuation-in-part of application Ser. No. 15/200,163 filed Jul. 1, 2016, now U.S. Pat. No. 9,963,228, the entire contents of each is hereby incorporated by reference.

TECHNICAL FIELD OF THE DISCLOSURE

The present disclosure relates, in general, to aircraft operable to transition between thrust-borne lift in a VTOL orientation and wing-borne lift in a biplane orientation and, in particular, to aircraft operable to prioritize the use of flight attitude controls to bias the aircraft from a current flight attitude state toward an optimal flight attitude state based upon flight attitude control authority.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing. A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to a method of prioritizing use of flight attitude controls of an aircraft operable to transition between thrust-borne lift in a VTOL orientation and wing-borne lift in a biplane orientation. The method includes determining an optimal flight attitude state for an aircraft during flight, the aircraft including first and second wings with first and second pylons coupled therebetween forming an airframe, a plurality of propulsion assemblies coupled to the airframe forming a two-dimensional distributed thrust array and a plurality of aerosurfaces coupled to the airframe; monitoring a current flight attitude state of the aircraft; identifying deviations between the current flight attitude state and the optimal flight attitude state; ordering the flight attitude controls of the aircraft based upon a flight attitude control authority of each of the flight attitude controls in the current flight attitude state; and implementing the highest order flight attitude control to bias the aircraft from the current flight attitude state toward the optimal flight attitude state.

The method may also include identifying deviations between a current pitch state and an optimal pitch state of the aircraft; identifying deviations between a current roll state and an optimal roll state of the aircraft; identifying deviations between a current yaw state and an optimal yaw state of the aircraft and/or identifying deviations between current pitch, roll and yaw states and optimal pitch, roll and yaw states of the aircraft. The method may further includes whether the aircraft is in the VTOL orientation; determining whether the aircraft is in the biplane orientation; identifying the occurrence of a flight anomaly; determining the flight attitude control authority provided by thrust vectoring, changing rotor speed, changing aerosurface position and combination thereof in the current flight attitude state; and/or sensing the aircraft response to implementing the highest order flight attitude control to bias the aircraft from the current flight attitude state toward the optimal flight attitude state; determining whether the aircraft response was consistent with an expected aircraft response; and implementing the second highest order flight attitude control to bias the aircraft from the current flight attitude state to the optimal flight attitude state if the aircraft response was not consistent with the expected aircraft response.

In a second aspect, the present disclosure is directed to a system for prioritizing use of flight attitude controls of an aircraft operable to transition between thrust-borne lift in a VTOL orientation and wing-borne lift in a biplane orientation. The system includes a flight control computing system having logic stored within a non-transitory computer readable medium, the logic executable by a processor, wherein the flight control computing system is configured to determine an optimal flight attitude state for an aircraft during flight, the aircraft including first and second wings with first and second pylons coupled therebetween forming an airframe, a plurality of propulsion assemblies coupled to the airframe forming a two-dimensional distributed thrust array and a plurality of aerosurfaces coupled to the airframe;

monitor a current flight attitude state of the aircraft; identify deviations between the current flight attitude state and the optimal flight attitude state; order the flight attitude controls of the aircraft based upon a flight attitude control authority of each of the flight attitude controls in the current flight attitude state; and implement the highest order flight attitude control to bias the aircraft from the current flight attitude state toward the optimal flight attitude state.

In some embodiments, the flight control computing system may be configured to identify deviations between a current pitch state and an optimal pitch state of the aircraft; configured to identify deviations between a current roll state and an optimal roll state of the aircraft; configured to identify deviations between a current yaw state and an optimal yaw state of the aircraft and/or configured to identify deviations between current pitch, role and yaw states and optimal pitch, role and yaw states of the aircraft. In certain embodiments, the flight control computing system may be configured to determine whether the aircraft is in the VTOL orientation; configured to determine whether the aircraft is in the biplane orientation; configured to identify the occurrence of a flight anomaly; configured to determine the flight attitude control authority provided by thrust vectoring, changing rotor speed, changing aerosurface position and combination thereof in the current flight attitude state and/or configured to sense the aircraft response to the implementation of the highest order flight attitude control to bias the aircraft from the current flight attitude state toward the optimal flight attitude state; determine whether the aircraft response was consistent with an expected aircraft response; and implement the second highest order flight attitude control to bias the aircraft from the current flight attitude state to the optimal flight attitude state if the aircraft response was not consistent with the expected aircraft response.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2I are schematic illustrations of the aircraft of FIG. 1 in a sequential flight operating scenario in accordance with embodiments of the present disclosure;

FIGS. 18A-18D are schematic illustrations of an aircraft operable to maintain hover stability in inclined flight attitudes in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1B:
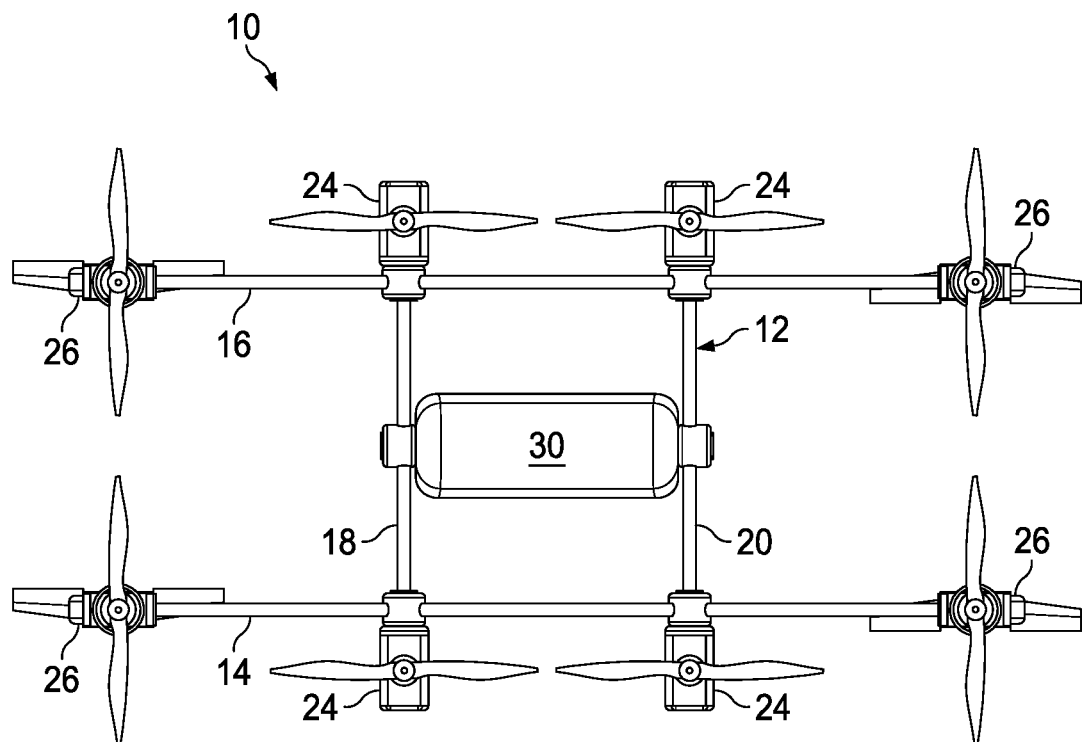
FIGS. 1A-1G are schematic illustrations of an aircraft operable to transition between thrust-borne lift in a VTOL orientation and wing-borne lift in a biplane orientation in accordance with embodiments of the present disclosure.
Figure 1A:
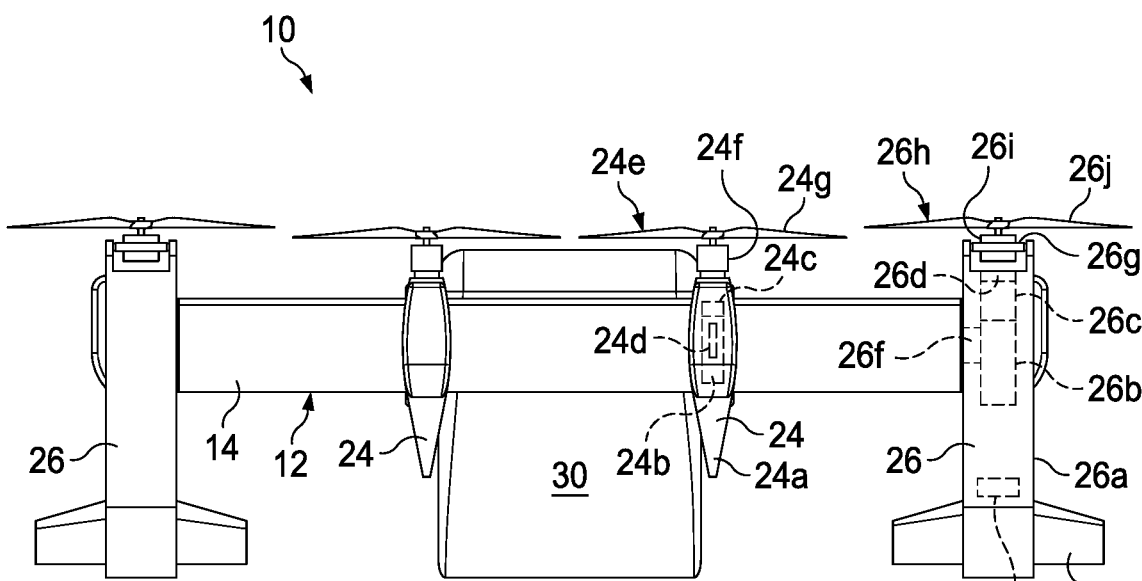
Figure 1D:
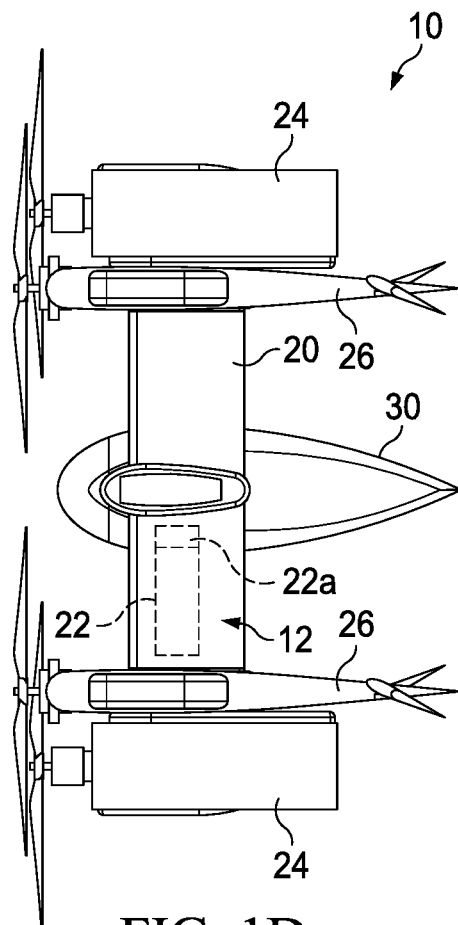
Figure 1C:
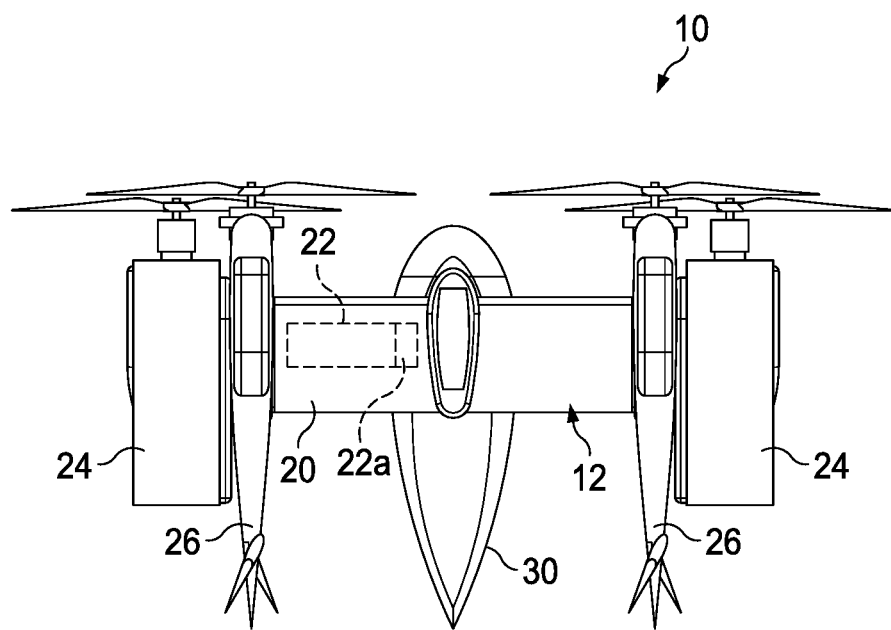
Figure 1F:
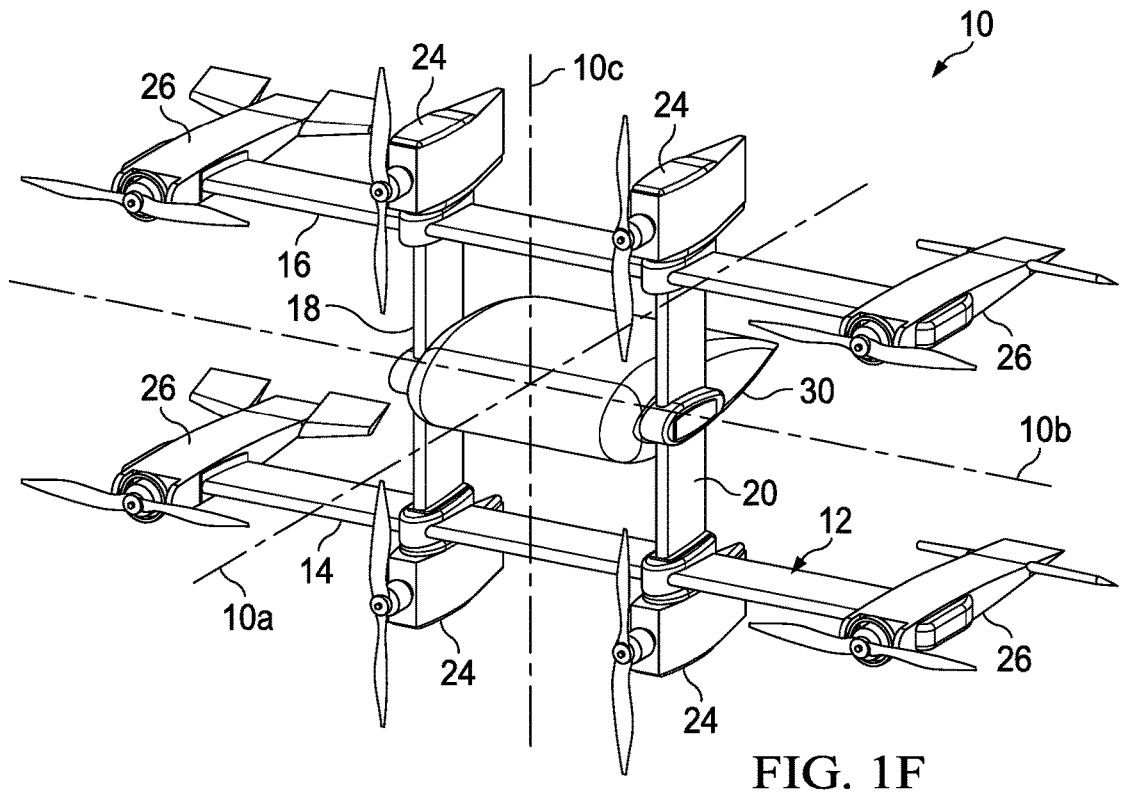
Figure 1E:
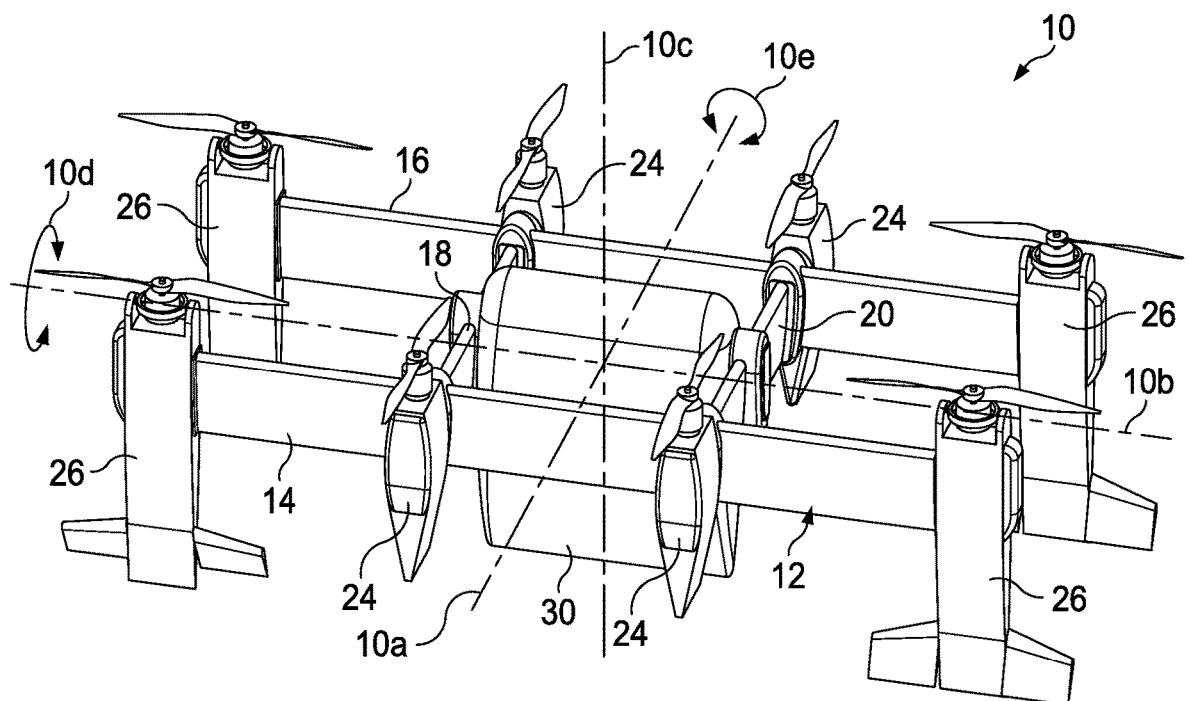

Referring to FIGS. 1A-1G in the drawings, various views of an aircraft 10 operable to transition between thrust-borne lift in a VTOL orientation and wing-borne lift in a biplane orientation are depicted. FIGS. 1A, 1C, 1E depict aircraft 10 in the VTOL orientation wherein the propulsion assemblies provide thrust-borne lift. FIGS. 1B, 1D, 1F depict aircraft 10 in the biplane orientation wherein the propulsion assemblies provide forward thrust with the forward airspeed of aircraft 10 providing wing-borne lift enabling aircraft 10 to have a high speed and/or high endurance forward flight mode. Aircraft 10 has a longitudinal axis 10a that may also be referred to as the roll axis, a lateral axis 10b that may also be referred to as the pitch axis and a vertical axis 10c that may also be referred to as the yaw axis, as best seen in FIGS. 1E and 1F. In the VTOL orientation, when longitudinal axis 10a and lateral axis 10b are both in a horizontal plane and normal to the local vertical in the earth's reference frame, aircraft 10 has a level flight attitude. When at least one of longitudinal axis 10a or lateral axis 10b extends out of the horizontal plane, aircraft 10 has an inclined flight attitude. For example, an inclined flight attitude may be a nonzero pitch flight attitude such as a pitch down flight attitude or a pitch up flight attitude. This operation is depicted in FIG. 1E with aircraft 10 rotating about lateral axis 10b, as indicated by arrow 10d. Similarly, an inclined flight attitude may be a nonzero roll flight attitude such as a roll left flight attitude or a roll right flight attitude. This operation is depicted in FIG. 1E with aircraft 10 rotating about longitudinal axis 10a, as indicated by arrow 10e. In addition, an inclined flight attitude may include both a nonzero pitch flight attitude and a nonzero roll flight attitude.

Aircraft 10 is a mission configurable aircraft operable to provide high efficiency transportation for diverse payloads. Based upon mission parameter including flight parameters such as environmental conditions, speed, range and thrust requirements as well as payload parameters such as size, shape, weight, type, durability and the like, aircraft 10 may selectively incorporate a variety of propulsion assemblies having different characteristics and/or capacities. For example, the propulsion assemblies operable for use with aircraft 10 may have difference thrust types including different maximum thrust outputs and/or different thrust vectoring capabilities including non thrust vectoring propulsion assemblies, single-axis thrust vectoring propulsion assemblies such as longitudinal thrust vectoring propulsion assemblies and/or lateral thrust vectoring propulsion assemblies and two-axis thrust vectoring propulsion assemblies which may also be referred to as omnidirectional thrust vectoring propulsion assemblies. In addition, various components of each propulsion assembly may be selectable including the power plant configuration and the rotor design. For example, the type or number of batteries in a propulsion assembly may be selected based upon the power, weight, endurance and/or temperature requirements of a mission. Likewise, the characteristics of the rotor assemblies may be selected, such as the number of rotor blades, the blade pitch, the blade twist, the rotor diameter, the chord distribution, the blade material and the like.

Figure 1G:
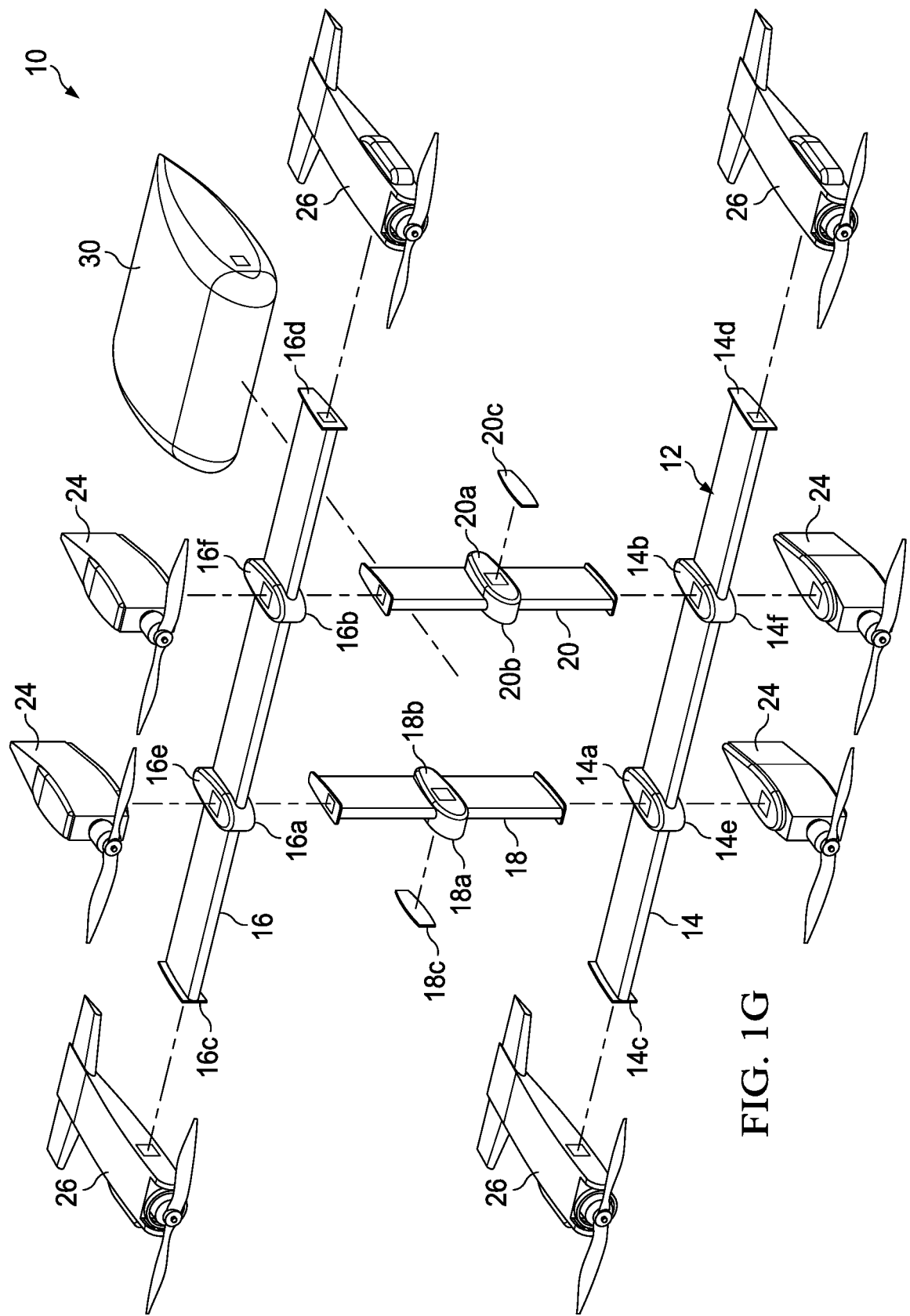

In the illustrated embodiment, aircraft 10 includes an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. As illustrated, wings 14, 16 are straight wings. In other embodiments, wings 14, 16 could have other designs such as polyhedral wing designs, swept wing designs or other suitable wing design. As best seen in FIG. 1G, wing 14 has two pylon stations 14a, 14b and four nacelle stations 14c, 14d, 14e, 14f. Likewise, wing 16 has two pylon stations 16a, 16b and four nacelle stations 16c, 16d, 16e, 16f. Each of the pylon stations and each of the nacelle stations includes a rapid connection interface operable for mechanical and electrical connectivity, as discussed herein. Extending generally perpendicularly between wings 14, 16 are two truss structures depicted as pylons 18, 20. Pylon 18 is coupled between pylon stations 14a, 16a and preferably forms a mechanical and electrical connection therebetween. Pylon 20 is coupled between pylon stations 14b, 16b and preferably forms a mechanical and electrical connection therebetween. In other embodiments, more than two pylons may be present. Pylons 18, 20 are preferably formed from high strength and lightweight materials such as fiberglass, carbon, plastic, metal or other suitable material or combination of materials. As best seen in FIG. 1G, pylon 18 has a nacelle station 18a and a payload station 18b. Likewise, pylon 20 has a nacelle station 20a and a payload station 20b. Each of the nacelle stations and each of the payload stations includes a rapid connection interface operable for mechanical and electrical connectivity, as discussed herein. In the illustrated embodiment, as no propulsion assembly is coupled to either of pylons 18, 20, a nacelle station cover 18c protects nacelle station 18a of pylon 18 and a nacelle station cover 20c protects nacelle station 20a of pylon 20.

Wings 14, 16 and pylons 18, 20 preferably include central passageways operable to contain flight control systems, energy sources, communication lines and other desired systems. For example, as best seen in FIGS. 1C and 1D, pylon 20 houses the flight control system 22 of aircraft 10. Flight control system 22 is preferably a redundant digital flight control system including multiple independent flight control computers. For example, the use of a triply redundant flight control system 22 improves the overall safety and reliability of aircraft 10 in the event of a failure in flight control system 22. Flight control system 22 preferably includes non-transitory computer readable storage media including a set of computer instructions executable by one or more processors for controlling the operation of aircraft 10. Flight control system 22 may be implemented on one or more general-purpose computers, special purpose computers or other machines with memory and processing capability. For example, flight control system 22 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 22 may be a microprocessor-based system operable to execute program code in the form of machine-executable instructions. In addition, flight control system 22 may be selectively connectable to other computer systems via a proprietary encrypted network, a public encrypted network, the Internet or other suitable communication network that may include both wired and wireless connections.

Wings 14, 16 and pylons 18, 20 may contain one or more of electrical power sources depicted as one or more batteries 22a in pylon 20, as best seen in FIGS. 1C and 1D. Batteries 22a supply electrical power to flight control system 22. In some embodiments, batteries 22a may be used to supply electrical power for the distributed thrust array of aircraft 10. Wings 14, 16 and pylons 18, 20 also contain a communication network including the electrical interfaces of the pylon stations, the nacelle stations and the payload stations that enables flight control system 22 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust arrays" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assemblies.

The two-dimensional distributed thrust array of aircraft 10 includes a plurality of inboard propulsion assemblies, individually and collectively denoted as 24 and a plurality of outboard propulsion assemblies, individually and collectively denoted as 26. Inboard propulsion assemblies 24 are respectively coupled to nacelle stations 14e, 14f of wing 14 and nacelle stations 16e, 16f of wing 16 and preferably form mechanical and electrical connections therewith. Outboard propulsion assemblies 26 are respectively coupled to nacelle stations 14c, 14d of wing 14 and nacelle stations 16c, 16d of wing 16 and preferably form mechanical and electrical connections therewith. In some embodiments, inboard propulsion assemblies 24 could form a first two-dimensional distributed thrust array and outboard propulsion assemblies 26 could form a second two-dimensional distributed thrust array. In other embodiments, inboard propulsion assemblies 24 and outboard propulsion assemblies 26 could form a single two-dimensional distributed thrust array.

In the illustrated embodiment, inboard propulsion assemblies 24 and outboard propulsion assemblies 26 have difference thrust types. For example, outboard propulsion assemblies 26, individual and collectively, may have a higher maximum thrust output than inboard propulsion assemblies 24. Alternatively or additionally, outboard propulsion assemblies 26 may be variable speed propulsion assemblies while inboard propulsion assemblies 24 may be single speed propulsion assemblies. In the illustrated embodiment, inboard propulsion assemblies 24 are fixed pitch, variable speed, non thrust vectoring propulsion assemblies while outboard propulsion assemblies 26 are fixed pitch, variable speed, omnidirectional thrust vectoring propulsion assemblies. In this regard, inboard propulsion assemblies 24 and outboard propulsion assemblies 26 each form a two-dimensional distributed thrust array of a different thrust type. Specifically, inboard propulsion assemblies 24 may be referred to as a two-dimensional distributed thrust array of non thrust vectoring propulsion assemblies. Likewise, outboard propulsion assemblies 26 may be referred to as a two-dimensional distributed thrust array of omnidirectional thrust vectoring propulsion assemblies. Including a two-dimensional distributed thrust array of omnidirectional thrust vectoring propulsion assemblies on aircraft 10 enables aircraft 10 to maintain hover stability when aircraft 10 is in a level or inclined flight attitude state. In addition, the use of a two-dimensional distributed thrust array of omnidirectional thrust vectoring propulsion assemblies on aircraft 10 enables aircraft 10 to translate and/or change altitude while maintaining a level or inclined flight attitude or while changing the flight attitude state of aircraft 10.

As illustrated, outboard propulsion assemblies 26 are coupled to the outboard ends of wings 14, 16, inboard propulsion assemblies 24 are coupled to wing 14 in a high wing configuration and inboard propulsion assemblies 24 are coupled to wing 16 in a low wing configuration. Propulsion assemblies 24, 26 are independently attachable to and detachable from airframe 12 such that aircraft 10 may be part of a man portable aircraft system having component parts with connection features designed to enable rapid in-situ assembly. Alternatively or additional, the various components of aircraft 10 including the flight control system, the wings, the pylons and the propulsion assemblies may be selected by an aircraft configuration computing system based upon mission specific parameters. This may be enabled, in part, by using propulsion assemblies 24, 26 that are standardized and/or interchangeable units and preferably line replaceable units providing easy installation and removal from airframe 12. As discussed herein, propulsion assemblies 24, 26 may be coupled to the nacelle stations of wings 14, 16 using rapid connection interfaces to form structural and electrical connections.

For example, the structural connections may include high speed fastening elements, cam and hook connections, pin connections, quarter turn latch connections, snap connections, magnetic connections or electromagnetic connections which may also be remotely releasable connections. The electrical connections may include forming communication channels including redundant communication channels or triply redundant communication channels. In addition, the use of line replaceable propulsion units is beneficial in maintenance situations if a fault is discovered with one of the propulsion assemblies 24, 26. In this case, the faulty propulsion assemblies 24, 26 can be decoupled from airframe 12 by simple operations and another propulsion assemblies 24, 26 can then be attached to airframe 12. In other embodiments, propulsion assemblies 24, 26 may be permanently coupled to wings 14, 16 by riveting, bonding and/or other suitable technique.

As best seen in FIG. 1A, each inboard propulsion assembly 24 includes a nacelle 24a that houses components including a battery 24b, an electronic speed controller 24c, an electronics node 24d, sensors and other desired electronic equipment. Nacelle 24a also supports a propulsion system 24e depicted as an electric motor 24f and a rotor assembly 24g. Each outboard propulsion assembly 26 includes a nacelle 26a that houses components including a battery 26b, an electronic speed controller 26c, gimbal actuators 26d, an aerosurface actuator 26e, an electronics node 26f, sensors and other desired electronic equipment. Nacelle 26a also supports a two-axis gimbal 26g, a propulsion system 26h depicted as an electric motor 26i and a rotor assembly 26j and aerosurfaces 26k. As the power for each propulsion assembly 24, 26 is provided by batteries housed within the respective nacelles, aircraft 10 has a distributed power system for the distributed thrust array. Alternatively or additionally, electrical power may be supplied to the electric motors and/or the batteries disposed with the nacelles from batteries 22a carried by airframe 12 via the communications network. In other embodiments, the propulsion assemblies may include internal combustion engines or hydraulic motors. In the illustrated embodiment, aerosurfaces 26k of outboard propulsion assembly 26 are active aerosurfaces that serve as horizontal stabilizers, elevators to control the pitch and/or angle of attack of wings 14, 16 and/or ailerons to control the roll or bank of aircraft 10 in the biplane orientation of aircraft 10 and serve to enhance hover stability in the VTOL orientation of aircraft 10.

Flight control system 22 communicates via the wired communications network of airframe 12 with the electronics nodes 24d, 26f of the propulsion assemblies 24, 26. Flight control system 22 receives sensor data from and sends flight command information to the electronics nodes 24d, 26f such that each propulsion assembly 24, 26 may be individually and independently controlled and operated. For example, flight control system 22 is operable to individually and independently control the speed of each propulsion assembly 24. In addition, flight control system 22 is operable to individually and independently control the speed, the thrust vector and the position of the aerosurfaces of each propulsion assembly 26. Flight control system 22 may autonomously control some or all aspects of flight operation for aircraft 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for aircraft 10. The autonomous and/or remote operation of aircraft 10 enables aircraft 10 to perform unmanned logistic operations for both military and commercial applications.

Each propulsion assembly 24, 26 includes a rotor assembly 24g, 26j that is coupled to an output drive of a respective electrical motor 24f, 26i that rotates the rotor assembly 24g, 26j in a rotational plane to generate thrust for aircraft 10. In the illustrated embodiment, rotor assemblies 24g, 26j each include two rotor blades having a fixed pitch. In other embodiments, the rotor assemblies could have other numbers of rotor blades including rotor assemblies having three or more rotor blades. Alternatively or additionally, the rotor assemblies could have variable pitch rotor blades with collective and/or cyclic pitch control. Each electrical motor 24f is paired with a rotor assembly 24g to form a propulsion system 24e. In the illustrated embodiment, each propulsion system 24e is secured to a nacelle 24a without a tilting degree of freedom such that propulsion assemblies 24 are non thrust vectoring propulsion assemblies. Each electrical motor 26i is paired with a rotor assembly 26j to form a propulsion system 26h. As described herein, each propulsion system 26h has a two-axis tilting degree of freedom relative to nacelle 26a provided by two-axis gimbal 26g such that propulsion assemblies 26 are omnidirectional thrust vectoring propulsion assemblies. In the illustrated embodiment, the maximum angle of the thrust vector may preferably be between about 10 degrees and about 30 degrees, may more preferably be between about 15 degrees and about 25 degrees and may most preferably be about 20 degrees. Notably, using a 20-degree thrust vector yields a lateral component of thrust that is about 34 percent of total thrust. In other embodiments, the inboard and/or the outboard propulsion systems may have a single-axis tilting degree of freedom in which case, the propulsion assemblies could act as longitudinal and/or lateral thrust vectoring propulsion assemblies.

Aircraft 10 may operate as a transport aircraft for a payload 30 that is fixed to or selectively attachable to and detachable from airframe 12. In the illustrated embodiment, payload 30 is selectively couplable between payload stations 18b, 20b of pylons 18, 20 preferably forming a mechanical and electrical connection therebetween. Payload 30 may carry, include or be integral with a variety of modules such as a package delivery module, an air reconnaissance module, a light detection and ranging module, a camera module, an optical targeting module, a laser module, a sensors module, an air-to-ground weapons module, an air-to-air weapons module, a communications module and/or a cargo hook module or the like depending upon the mission being perform by aircraft 10. The connection between payload stations 18b, 20b and payload 30 may be a fixed connection that secures payload 30 in a single location relative to airframe 12. Alternatively, payload 30 may be allowed to rotate and/or translate relative to airframe 12 during ground and/or flight operations. For example, it may be desirable to have payload 30 low to the ground for loading and unloading cargo but more distant from the ground for takeoff and landing. As another example, it may be desirable to change the center of mass of aircraft 10 during certain flight conditions such as moving payload 30 forward relative to airframe 12 during high speed flight in the biplane orientation. Similarly, it may be desirable to adjust the center of mass of aircraft 10 by lowering payload 30 relative to airframe 12 during hover. As illustrated, payload 30 may be selectively coupled to and decoupled from airframe 12 to enable sequential pickup, transportation and delivery of multiple payloads 30 to and from multiple locations.

Airframe 12 preferably has remote release capabilities of payload 30. For example, this feature allows airframe 12 to drop payload 30 or cargo carried by payload 30 at a desired location following transportation. In addition, this feature allows airframe 12 to jettison payload 30 during flight, for example, in the event of an emergency situation such as a propulsion assembly or other system of aircraft 10 becoming compromised. One or more communication channels may be established between payload 30 and airframe 12 when payload 30 is attached therewith such that flight control system 22 may send commands to payload 30 to perform functions. For example, flight control system 22 may operate doors and other systems of a package delivery module; start and stop aerial operations of an air reconnaissance module, a light detection and ranging module, a camera module, an optical targeting module, a laser module or a sensors module; launch missiles from an air-to-ground weapons module or an air-to-air weapons module; and/or deploy and recover items using a cargo hook module.

Figure 2C:
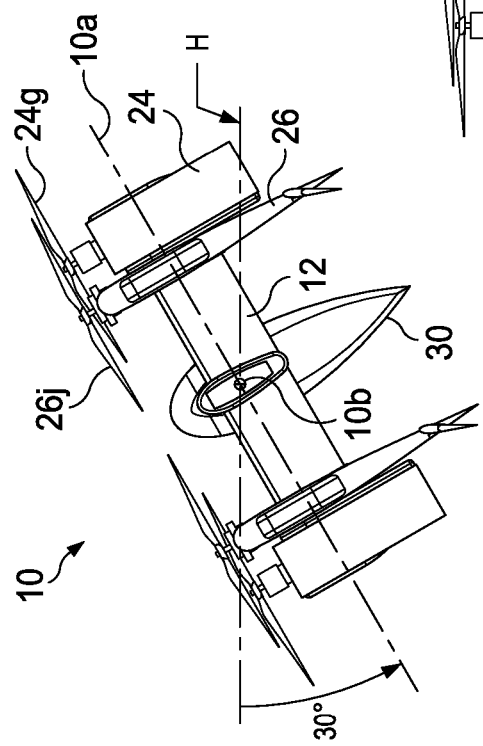
Figure 2B:
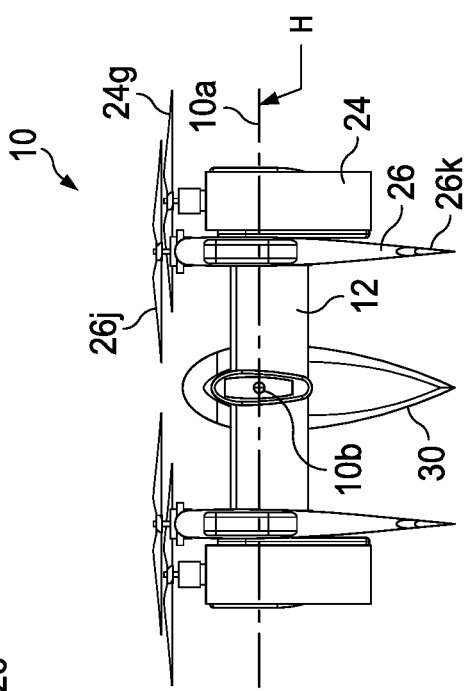
Figure 2A:
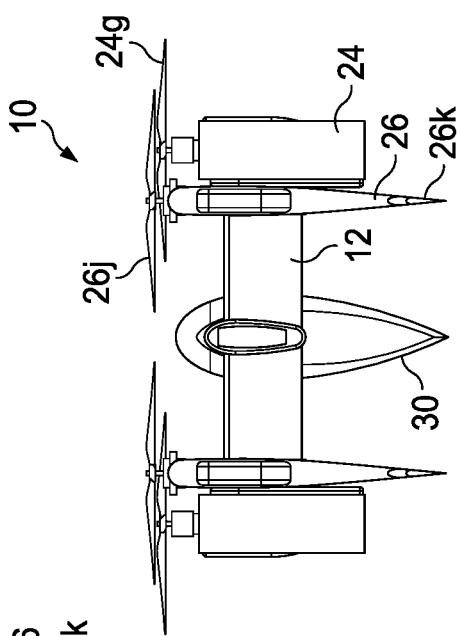

Referring additionally to FIGS. 2A-2I in the drawings, a sequential flight-operating scenario of aircraft 10 is depicted. In the illustrated embodiment, payload 30 is attached to airframe 12 and may contain a desired cargo or module. It is noted, however, that payload 30 may be selectively disconnected from airframe 12 such that a single airframe can be operably coupled to and decoupled from numerous payloads for numerous missions over time. In addition, aircraft 10 may perform missions without having a payload 30 attached to airframe 12. As best seen in FIG. 2A, aircraft 10 is in a tailsitting position on the ground. When aircraft 10 is ready for a mission, flight control system 22 commences operations to provide flight control to aircraft 10 which may be autonomous flight control, remote flight control or a combination thereof. For example, it may be desirable to utilize remote flight control during certain maneuvers such as takeoff and landing but rely on autonomous flight control during hover, high speed forward flight and/or transitions between wing-borne flight and thrust-borne flight.

As best seen in FIG. 2B, aircraft 10 has performed a vertical takeoff and is engaged in thrust-borne lift with payload 30 lifted into the air. As illustrated, rotor assemblies 24g of propulsion assemblies 24 are each rotating in the same horizontal plane forming a first two-dimensional distributed thrust array. Likewise, rotor assemblies 26j of propulsion assemblies 26 are each rotating in the same horizontal plane forming a second two-dimensional distributed thrust array. As longitudinal axis 10a and lateral axis 10b (denoted as the target) are both in a horizontal plane H, normal to the local vertical in the earth's reference frame, aircraft 10 has a level flight attitude. As discussed herein, flight control system 22 independently controls and operates each propulsion assembly 24, 26 including independently controlling speed, thrust vector and aerosurface position. During hover, flight control system 22 may utilize speed control, thrust vectoring and/or aerosurface maneuvers of selected propulsion assemblies 26 for providing hover stability for aircraft 10 and for providing pitch, roll, yaw and translation authority for aircraft 10. As used herein, the term "hover stability" refers to remaining in one place in the air while maintaining a generally or substantially static flight attitude.

Figure 3:
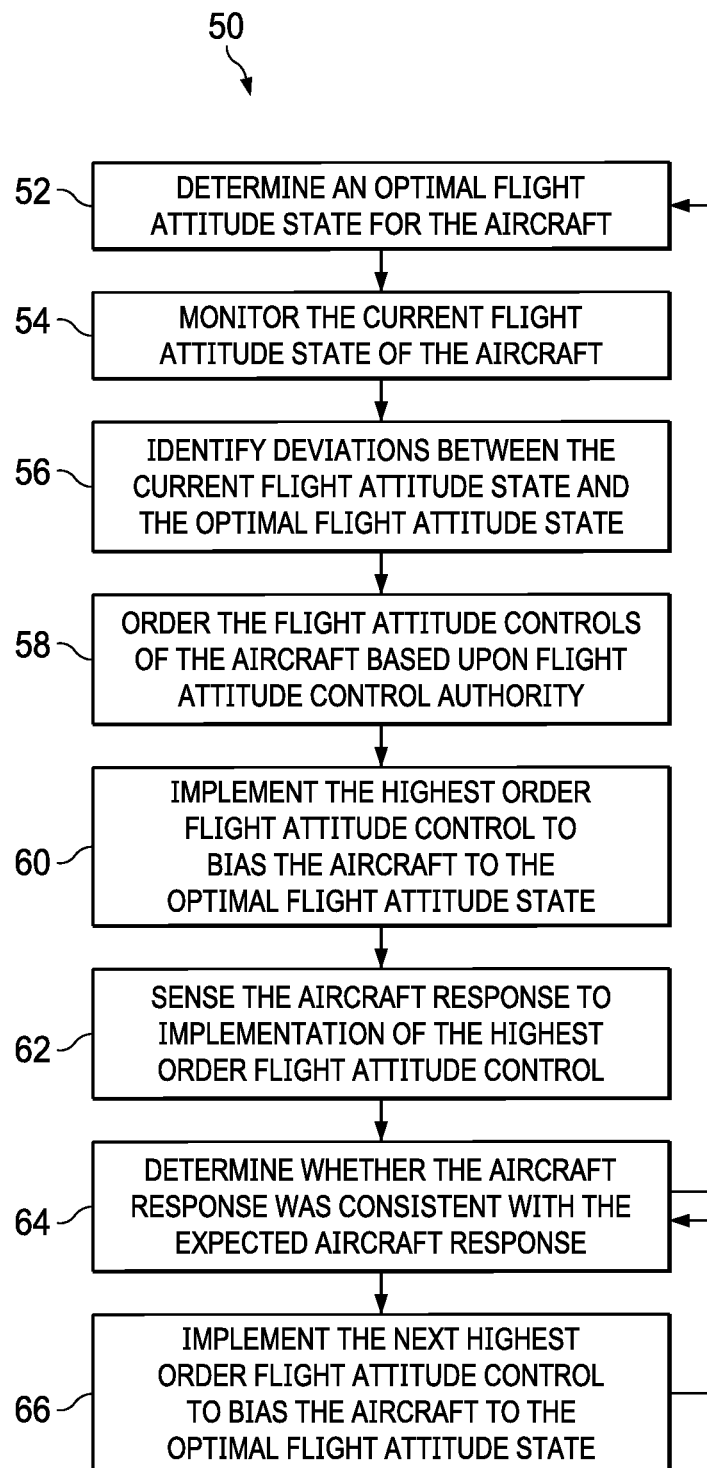
FIG. 3 is a flow diagram of a process for prioritizing the use of flight attitude controls in accordance with embodiments of the present disclosure.

For example, flight control system 22 is operable to maintain or change the flight attitude of aircraft 10 by prioritizing the use of flight attitude controls based upon flight attitude control authority as described with reference to FIG. 3. As used herein, the term "flight attitude control" refers to mechanisms used to impart change to or maintain the current flight attitude state of aircraft 10. For example, the flight attitude controls include the use of thrust vectoring, rotor speed, aerosurface position, combinations thereof and the like of one or more of the propulsion assemblies. As used herein, the term "flight attitude control authority" refers to the effectiveness and/or responsiveness of a flight attitude control to impart change to or maintain the current flight attitude state of aircraft 10. In process 50, flight control system 22 is configured to determine and maintain an optimal flight attitude state for aircraft 10. During flight, flight control system 22 performs continuous analysis of the mission parameters and the current flight conditions to determine the optimal flight attitude state for the aircraft, as indicated in block 52. This analysis determines, for example, whether the aircraft is in the VTOL orientation, the biplane orientation or some transitory orientation therebetween; whether a level flight attitude or an inclined flight attitude is desired; whether a stable flight attitude or a changing flight attitude is desired; and/or whether hover, translation, altitude change and/or direction change is desired and the rate at which such change may be desired.

In block 54, flight control system 22 monitors the current flight attitude state of the aircraft. Data for this analysis may be provided from a sensor suite carried by airframe 12, propulsion assemblies 24, 26 and/or payload 30 including, for example, an attitude and heading reference system (AHRS) with solid-state or microelectromechanical systems (MEMS) gyroscopes, accelerometers and magnetometers. Based upon the optimal flight attitude state for the aircraft and the current flight attitude state of the aircraft, flight control system 22 identifies any deviations between the current flight attitude state and the optimal flight attitude state in block 56. For example, this process may identify deviations between a current pitch state and an optimal pitch state of the aircraft, deviations between a current roll state and an optimal roll state of the aircraft, deviations between a current yaw state and an optimal yaw state of the aircraft and/or combination thereof. This process may also involve determining a cause of the deviation such as identifying the occurrence of a flight anomaly such as turbulence, a bird strike, a component fault, a one engine inoperable condition or the like.

If a deviation is identified, flight control system 22 determines an order for the flight attitude controls of the aircraft based upon the flight attitude control authority of each of the flight attitude controls in the current flight attitude state, in block 58. This process involves selecting the order in which the possible the flight attitude controls, for example, thrust vectoring, rotor speed and aerosurface position of each of the propulsion assemblies, should be used based upon the expected effectiveness and/or responsiveness of using a specific flight attitude control or a combination of flight attitude controls. The process considers the current state of each flight attitude control, the available envelope of each flight attitude control and the expected aircraft response to each flight attitude control. The process also considers the orientation of the aircraft. For example, in the VTOL orientation, changes in thrust vector and/or rotor speed of selected propulsion assemblies may create a more desired aircraft response than changes in aerosurface position, such as a response of a greater magnitude, a response with a greater rate of change and/or a response with a greater rate of rate of change. Similarly, in the biplane orientation, changes in aerosurface position and/or rotor speed of selected propulsion assemblies may create a more desired aircraft response than changes in thrust vector.

In block 60, flight control system 22 implements the highest order flight attitude control to bias the aircraft from the current flight attitude state to the optimal flight attitude state. This process results in the use of the selected flight attitude control of thrust vectoring, rotor speed, aerosurface position and/or combinations thereof for one or more of the propulsion assemblies. Importantly, in this process, the highest order flight attitude control is not limited to a single type of flight attitude control such as thrust vectoring, rotor speed or aerosurface position. Instead, flight control system 22 is operable to evaluate combinations and/or permutations of thrust vectoring, rotor speed, aerosurface position of the propulsion assemblies to formulate the highest order flight attitude control available to yield the desired aircraft response toward the optimal flight attitude state. For example, the highest order flight attitude control may involve a change in the thrust vector but no change in rotor speed or aerosurface position of some or all of outboard propulsion assemblies 26 along with no change in the operation of any of inboard propulsion assemblies 24. As another example, the highest order flight attitude control may involve a change in the rotor speed and aerosurface position but no change in the thrust vector of some or all of outboard propulsion assemblies 26 along with a change in the rotor speed of some or all of inboard propulsion assemblies 24. Based upon these examples, those skilled in the art should understand that a large variety of flight attitude controls are available to aircraft 10 that must be evaluated by flight control system 22 to prioritize the order of use thereof. In block 62, flight control system 22 senses the aircraft response to the implementation of the highest order flight attitude control to determine whether the aircraft transitioned from the current flight attitude state to the optimal flight attitude state using data, for example, from the attitude and heading reference system. In block 64, flight control system 22 determines whether the aircraft response was consistent with the expected aircraft response. This process may include determining a cause of any deviation between the actual aircraft response and the expected aircraft response such as identification of a fault in one of the flight attitude controls. For example, this process may determine whether the thrust vectoring, rotor speed or aerosurface positioning capability of a propulsion assembly failed. If the aircraft response is consistent with the expected aircraft response, the process may return to block 52 as flight control system 22 continuously performs this function. If the aircraft response was not consistent with the expected aircraft response, in block 66, flight control system 22 implements the next highest order flight attitude control to bias the aircraft from the current flight attitude state to the optimal flight attitude state. This process will take into account any faults identified in any flight attitude control to formulate the next highest order flight attitude control. The processes of block 64 and block 66 may be repeated until the optimal flight attitude state is achieved.

Returning to the sequential flight-operating scenario of aircraft 10 in FIGS. 2A-2I, after vertical assent to the desired elevation, aircraft 10 may begin the transition from thrust-borne lift to wing-borne lift. As best seen from the progression of FIGS. 2B-2E, aircraft 10 is operable to pitch down from the VTOL orientation toward the biplane orientation to enable high speed and/or long range forward flight. As seen in FIG. 2C, longitudinal axis 10a extends out of the horizontal plane H such that aircraft 10 has an inclined flight attitude of about thirty degrees pitch down. As seen in FIG. 2D, longitudinal axis 10a extends out of the horizontal plane H such that aircraft 10 has an inclined flight attitude of about sixty degrees pitch down. Flight control system 22 may achieve this operation through speed control of some or all of propulsion assemblies 24, 26, collective thrust vectoring of propulsion assemblies 26, collective maneuvers of aerosurfaces 26k or any combination thereof. As discussed herein, the specific procedure used for VTOL to biplane transitions may be dependent upon the thrust to weight configuration of aircraft 10.

Figure 2G:
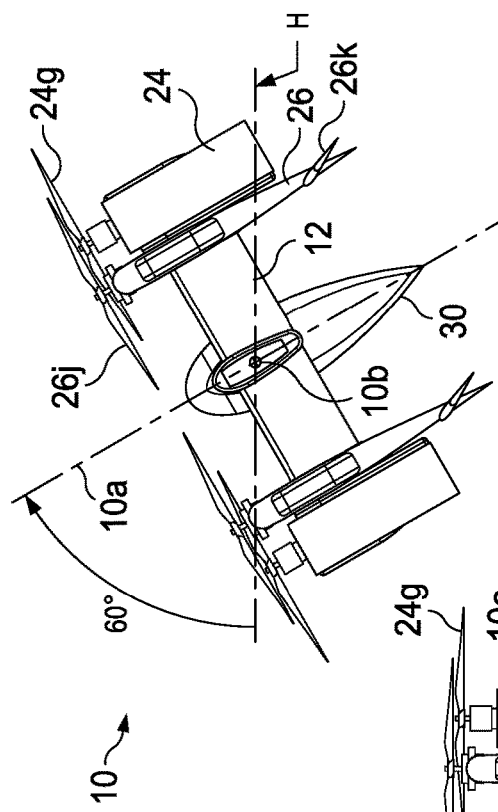
Figure 2H:
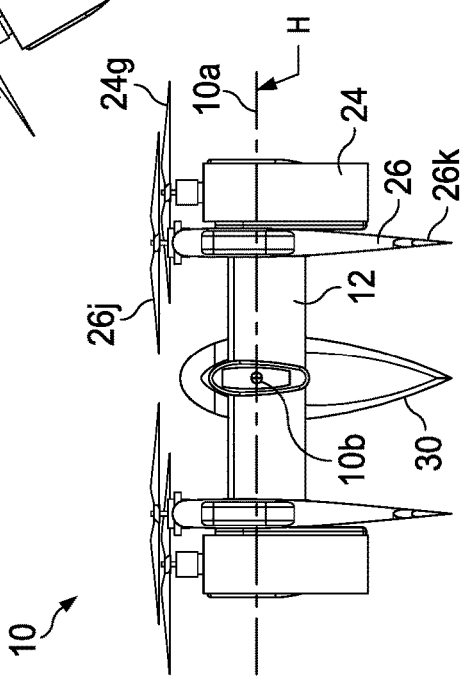
Figure 2I:
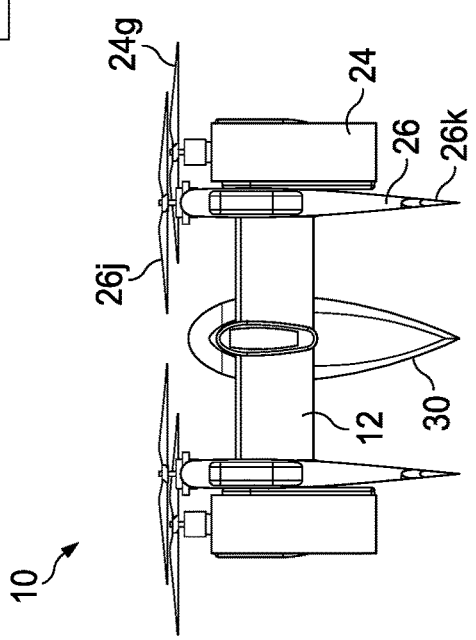

As best seen in FIG. 2E, rotor assemblies 24g of propulsion assemblies 24 are each rotating in the same vertical plane forming a first two-dimensional distributed thrust array. Likewise, rotor assemblies 26j of propulsion assemblies 26 are each rotating in the same vertical plane forming a second two-dimensional distributed thrust array. By convention, longitudinal axis 10a has been reset to be in the horizontal plane H, which also includes lateral axis 10b, such that aircraft 10 has a level flight attitude in the biplane orientation. As forward flight with wing-borne lift requires significantly less power than VTOL flight with thrust-borne lift, the operating speed of some or all of the propulsion assemblies 24, 26 may be reduced. In certain embodiments, some of the propulsion assemblies 24, 26 of aircraft 10 could be shut down during forward flight. In the biplane orientation, the independent control provided by flight control system 22 over each propulsion assembly 24, 26 provides pitch, roll and yaw authority using collective or differential thrust vectoring, differential speed control, collective or differential aerosurface maneuvers or any combination thereof. As aircraft 10 approaches its destination, aircraft 10 may begin its transition from wing-borne lift to thrust-borne lift. As best seen from the progression of FIGS. 2E-2H, aircraft 10 is operable to pitch up from the biplane orientation to the VTOL orientation to enable, for example, a vertical landing operation. As seen in FIG. 2F, longitudinal axis 10a extends out of the horizontal plane H such that aircraft 10 has an inclined flight attitude of about thirty degrees pitch up. As seen in FIG. 2G, longitudinal axis 10a extends out of the horizontal plane H such that aircraft 10 has an inclined flight attitude of about sixty degrees pitch up. Flight control system 22 may achieve this operation through speed control of some or all of propulsion assemblies 24, 26, collective thrust vectoring of propulsion assemblies 26, collective maneuvers of aerosurfaces 26k or any combination thereof. In FIG. 2H, aircraft 10 has completed the transition from the biplane orientation to the VTOL orientation and, by convention, longitudinal axis 10a has been reset to be in the horizontal plane H which also includes lateral axis 10b such that aircraft 10 has a level flight attitude in the VTOL orientation. Once aircraft 10 has completed the transition to the VTOL orientation, aircraft 10 may commence its vertical descent to a surface. As best seen in FIG. 2I, aircraft 10 has landing in a tailsitting orientation at the destination location and may, for example, remotely drop payload 30.

Figure 4A:
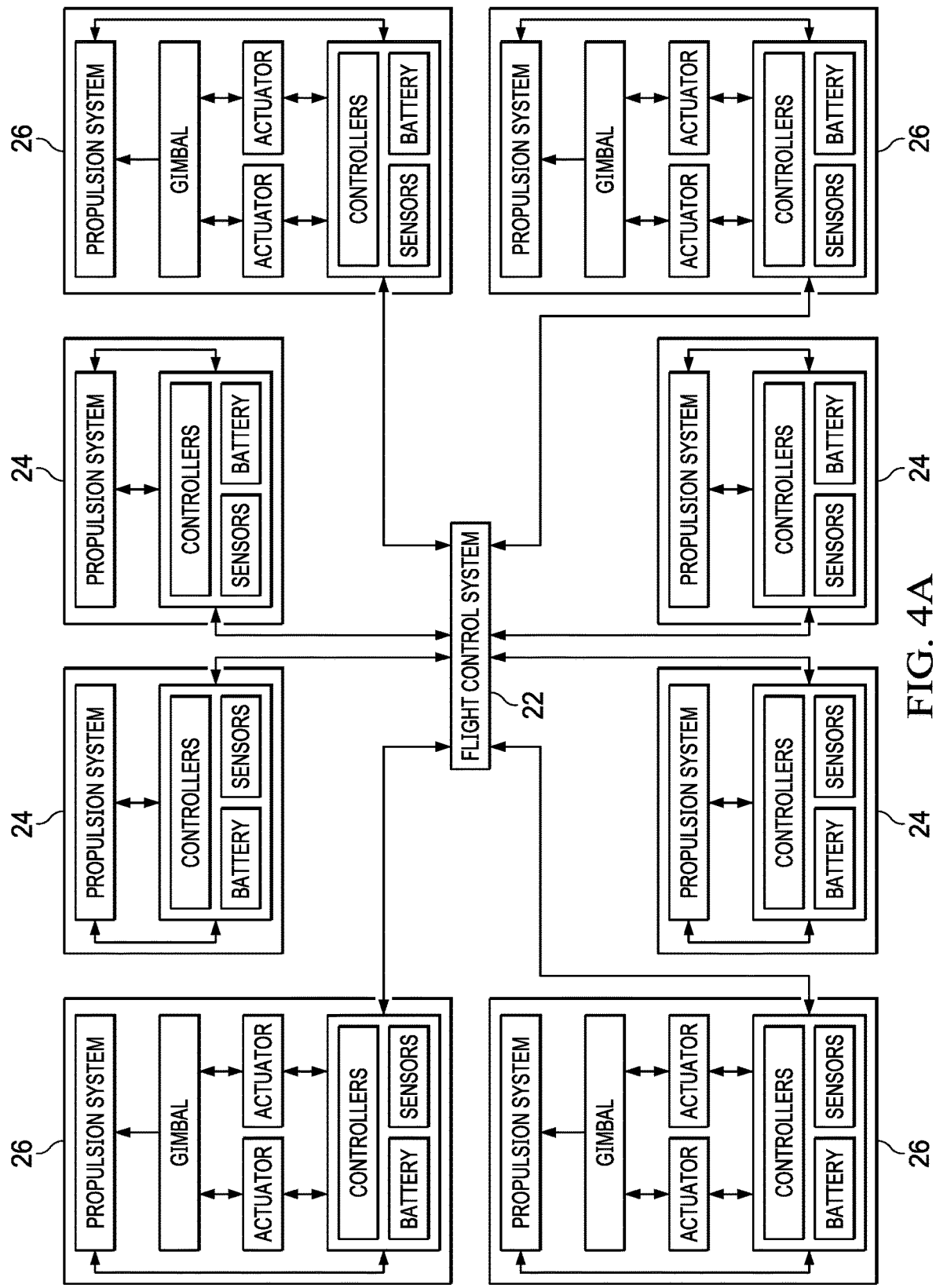
FIGS. 4A-4D are block diagram of various implementations of a thrust array and flight control system for an aircraft in accordance with embodiments of the present disclosure.

Referring next to FIGS. 4A-4D, a mission configurable aircraft having multiple thrust array configurations will now be described. FIG. 4A depicts the thrust array configuration of aircraft 10 in FIGS. 1A-1G. Specifically, aircraft 10 includes four outboard propulsion assemblies 26 that form a two-dimensional thrust array of omnidirectional thrust vectoring propulsion assemblies. Propulsion assemblies 26 each include an electronics node depicted as including controllers, sensors and one or more batteries, a two-axis gimbal operated by a pair of actuators and a propulsion system including an electric motor and a rotor assembly. The flight control system 22 is operably associated with propulsion assemblies 26 and is communicably linked to the electronic nodes thereof by a communications network depicted as the arrows between flight control system 22 and propulsion assemblies 26. Flight control system 22 receives sensor data from and sends commands to propulsion assemblies 26 to enable flight control system 22 to independently control each of propulsion assemblies 26 as discussed herein.

Figure 5C:
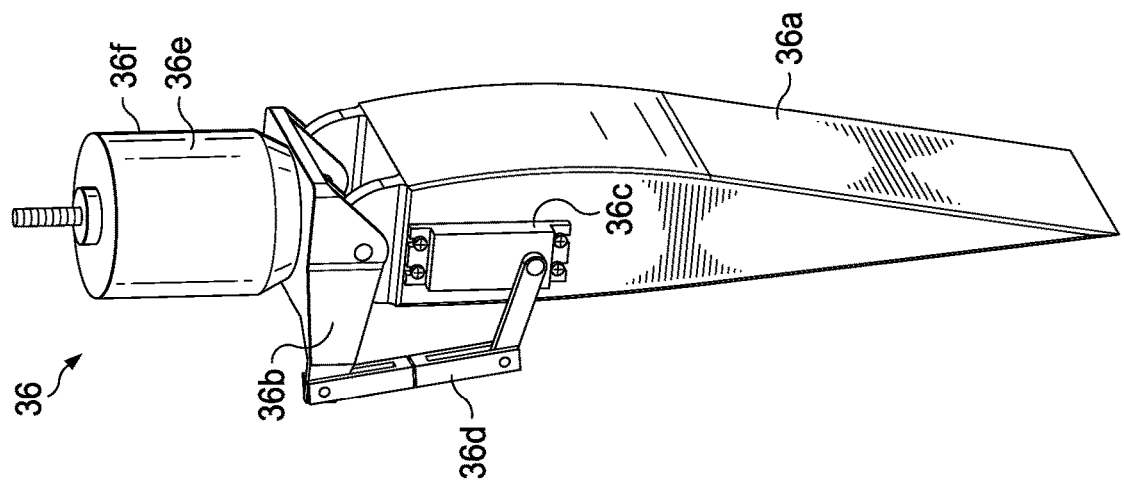
FIGS. 5A-5C are schematic illustrations of various line replaceable propulsion assemblies for an aircraft in accordance with embodiments of the present disclosure.
Figure 5B:
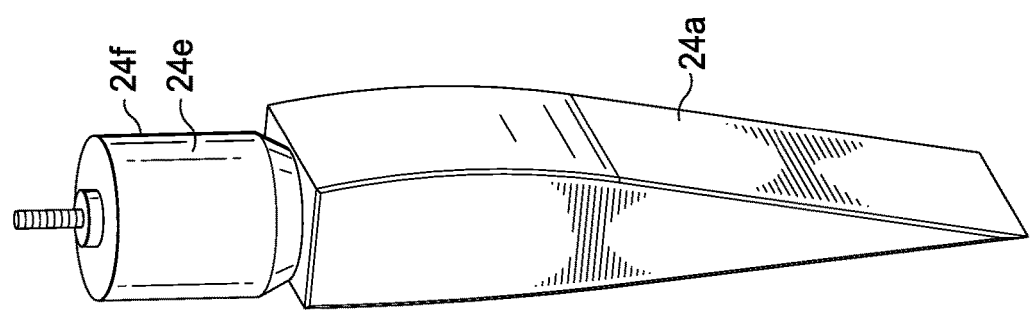
Figure 5A:
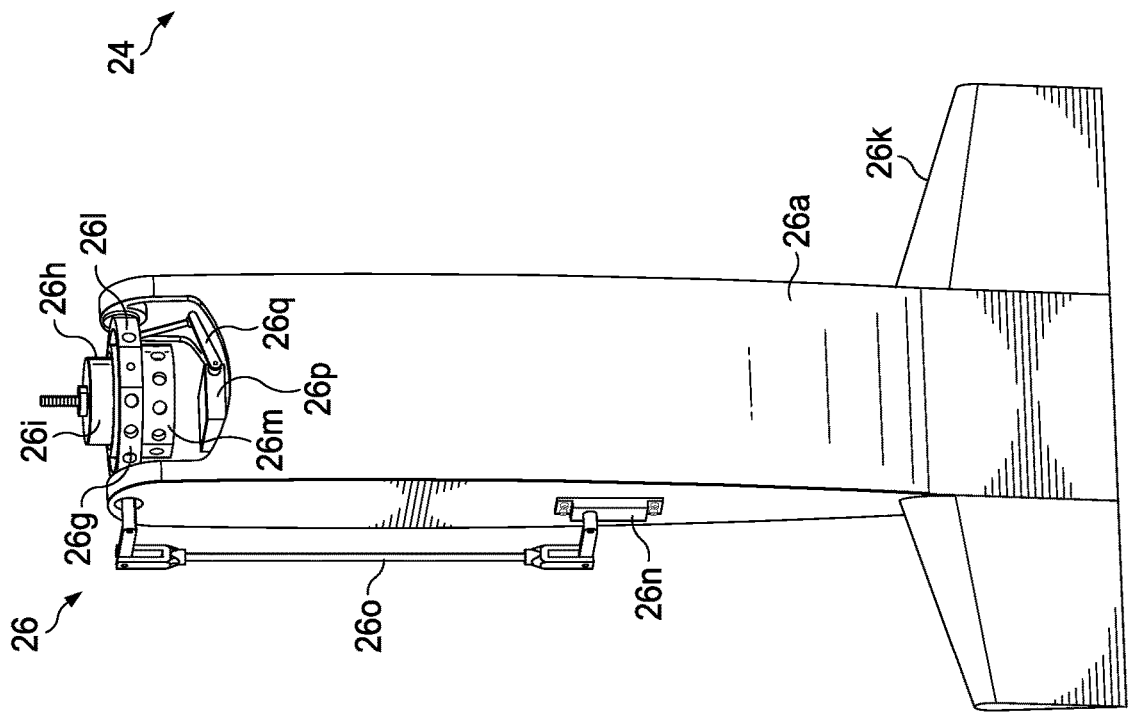

An embodiment of an omnidirectional thrust vectoring propulsion assemblies 26 is depicted in FIG. 5A. Propulsion assembly 26 includes a nacelle 26a and a gimbal 26g that is coupled to nacelle 26a. Gimbal 26g includes an outer gimbal member 26l and an inner gimbal member 26m. Outer gimbal member 26l is pivotally coupled to nacelle 26a and is operable to tilt about a first axis. Inner gimbal member 26m is pivotally coupled to outer gimbal member 26l and is operable to tilt about a second axis that is orthogonal to the first axis. In the illustrated embodiment, actuator 26n is coupled between nacelle 26a and outer gimbal member 26l such that operation of actuator 26n shift linkage 26o to tilt outer gimbal member 26l about the first axis relative to nacelle 26a. Actuator 26p is coupled between nacelle 26a and inner gimbal member 26m such that operation of actuator 26p shifts linkage 26q to tilt inner gimbal member 26m about the second axis relative to outer gimbal member 26l and nacelle 26a. A propulsion system 26h is coupled to and is operable to tilt with gimbal 26g about both axes relative to nacelle 26a. In the illustrated embodiment, the rotor assembly has been removed from propulsion system 26h such that only electric motor 26i is visible.

Figure 6A:
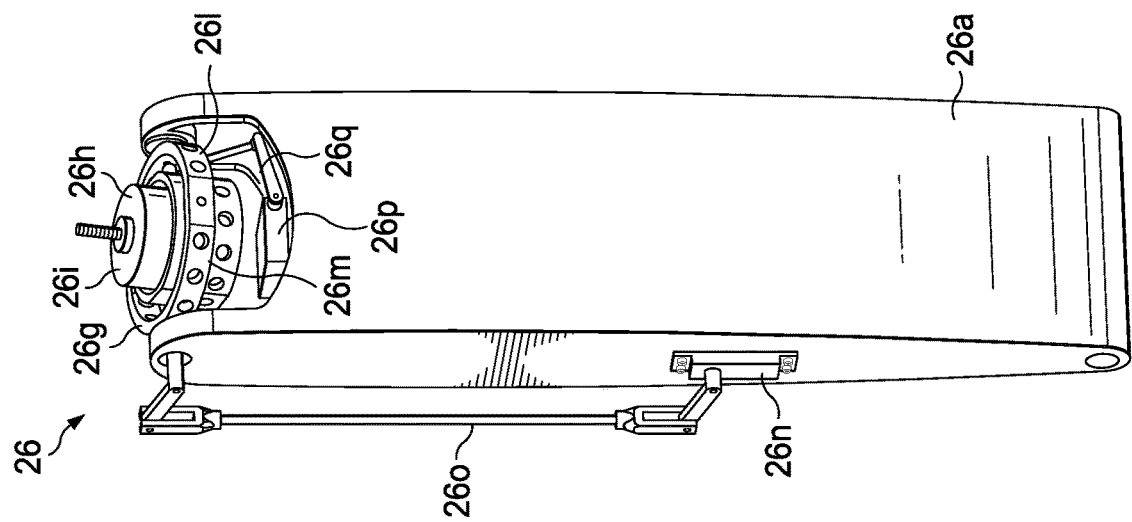
FIGS. 6A-6I are schematic illustrations of a propulsion assembly having a two-axis gimbal for an aircraft in accordance with embodiments of the present disclosure.
Figure 6B:
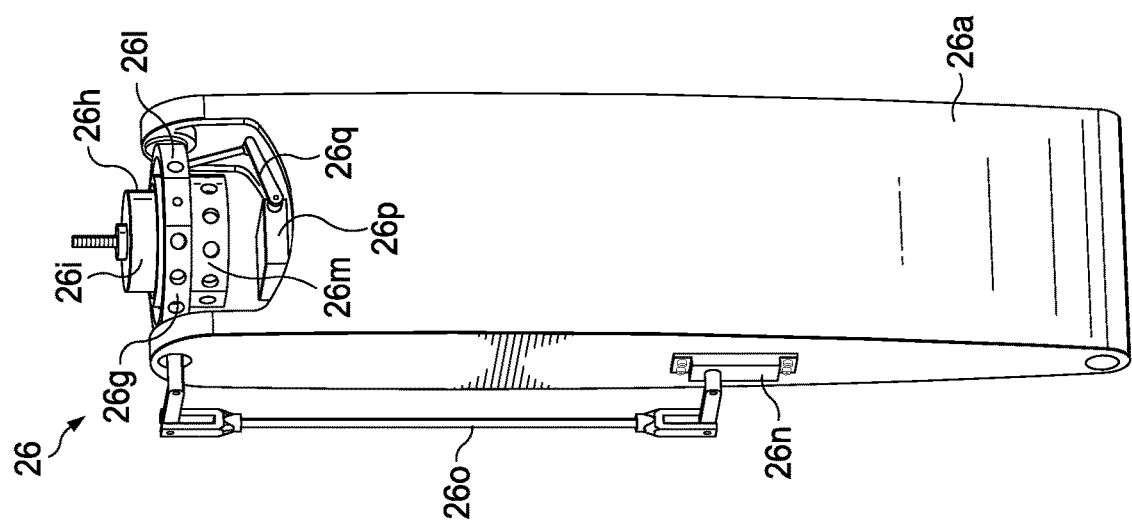
Figure 6C:
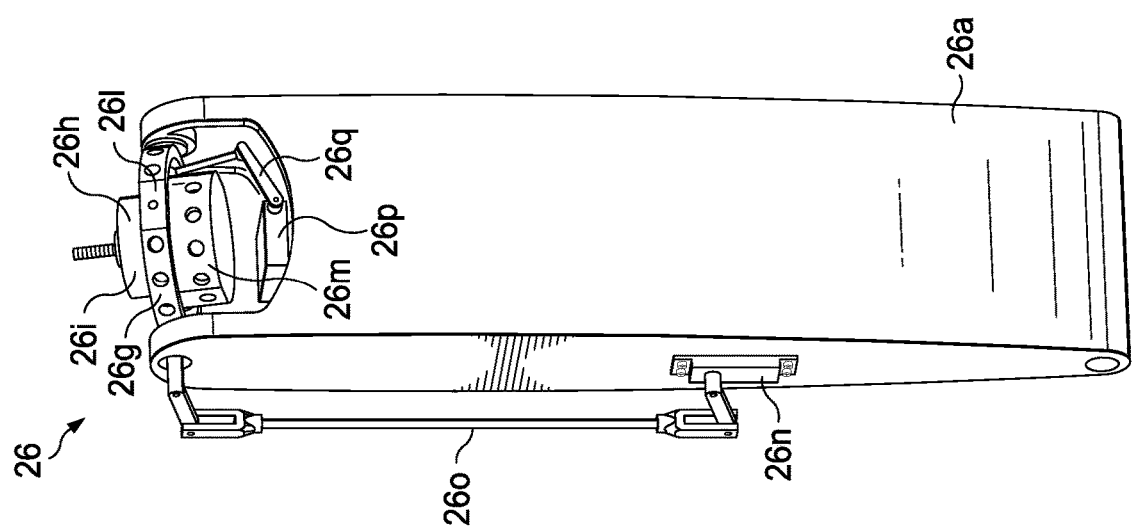

The operation of an omnidirectional thrust vectoring propulsion assemblies 26 will now be described with reference to FIGS. 6A-6I. In one example, propulsion assemblies 26 are operable to provide aircraft 10 with control authority to translate in the longitudinal direction, fore-aft along longitudinal axis 10a in FIG. 1E, during a stable hover. The achieve this, flight control system 22 sends commands to operate actuators 26n to collectively tilt each of propulsion systems 26h in the forward or aft direction while having actuators 26p in an unactuated state. In this configuration, propulsion assemblies 26 generate thrust vectors having a forward or aftward directed longitudinal component. In a stable hover, such collective thrust vectoring of propulsion assemblies 26 provides longitudinal control authority to aircraft 10. As best seen in the comparison of FIGS. 6A-6C, actuator 26n is operated to tilt propulsion system 26h longitudinally between a fully forward configuration shown in FIG. 6A and a fully aft configuration shown in FIG. 6C as well as in an infinite number of positions therebetween including the fully vertical configuration shown in FIG. 6B. This operation longitudinally shifts the thrust vector of propulsion assembly 26 to enable the longitudinal control authority of aircraft 10. The maximum longitudinal tilt angle of gimbal 26g may preferably be between about 10 degrees and about 30 degrees, may more preferably be between about 15 degrees and about 25 degrees and may most preferably be about 20 degrees. As should be understood by those having ordinary skill in the art, the magnitude of the longitudinal component of the thrust vector is related to the direction of the thrust vector, which is determined by the longitudinal tilt angle of gimbal 26g.

Figure 6D:
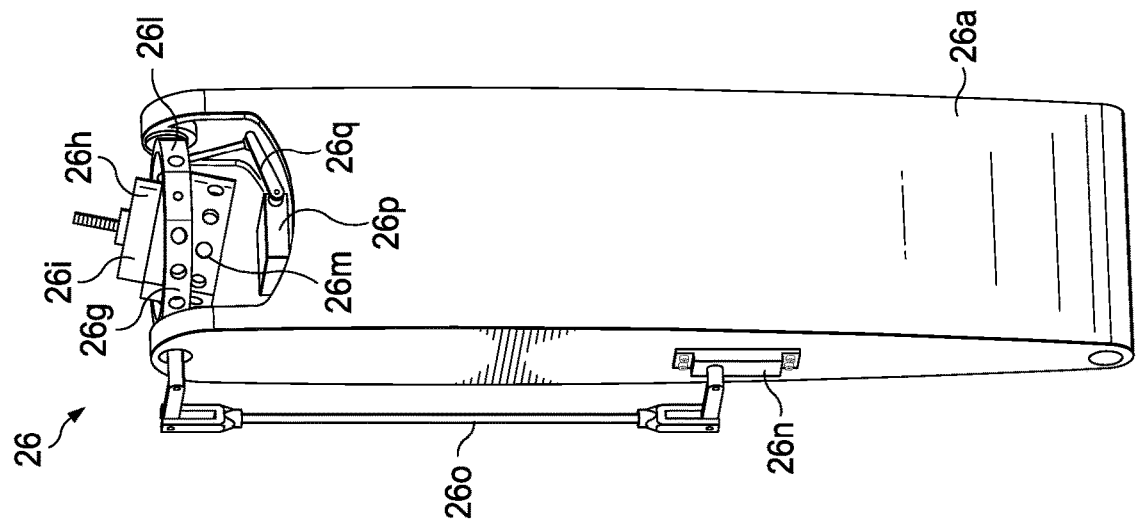
Figure 6E:
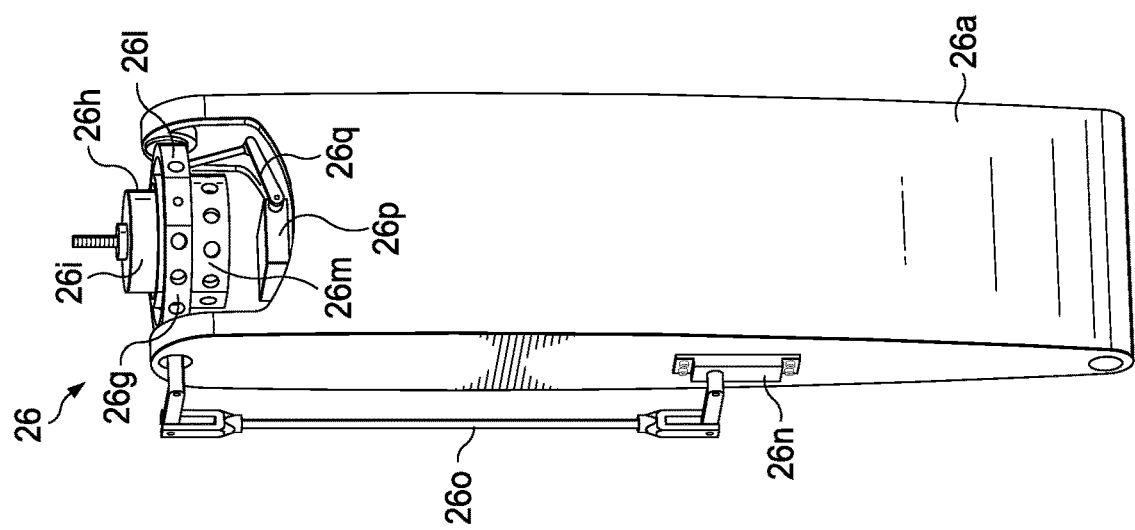
Figure 6F:
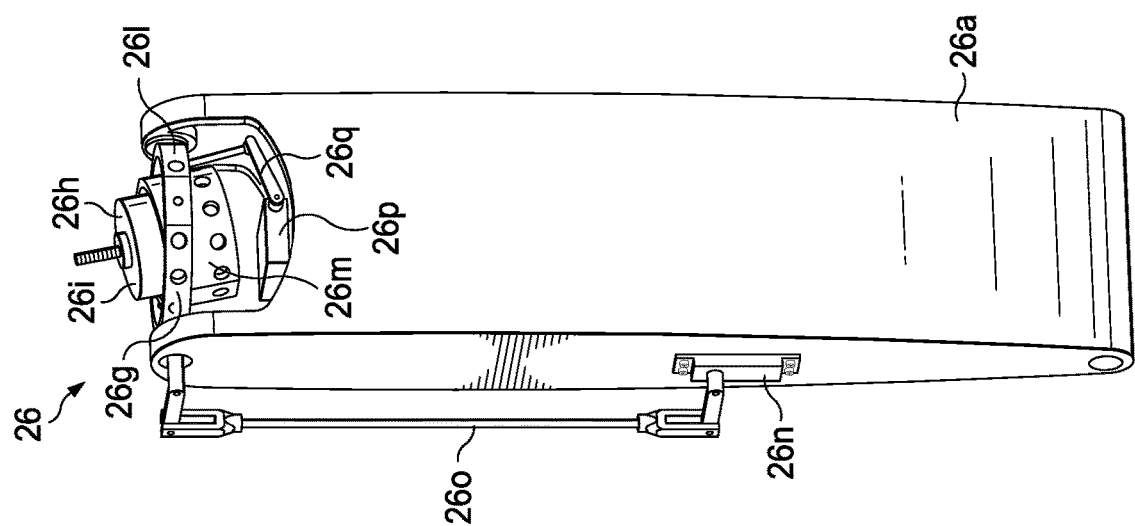
Figure 6I:
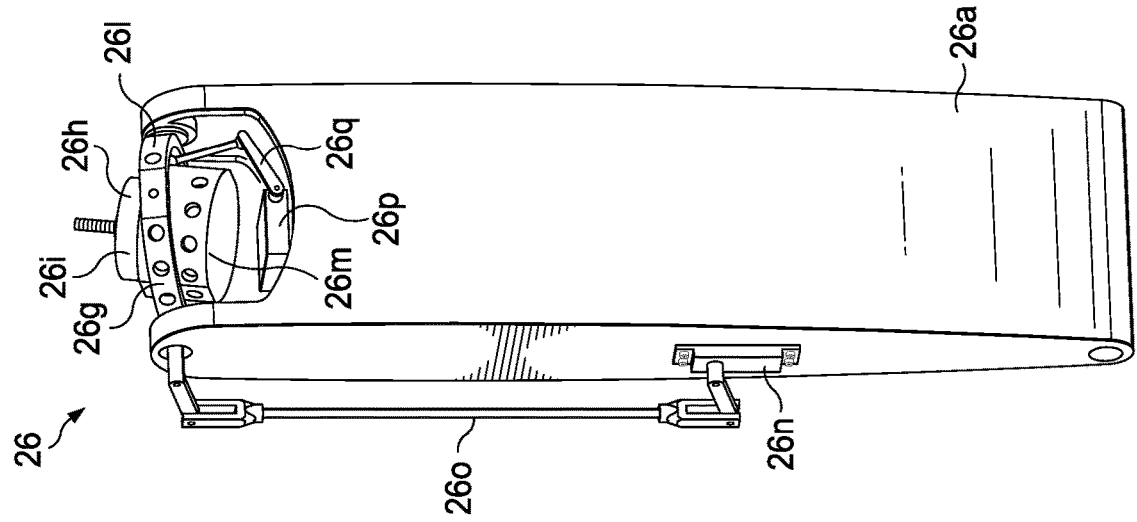
Figure 6H:
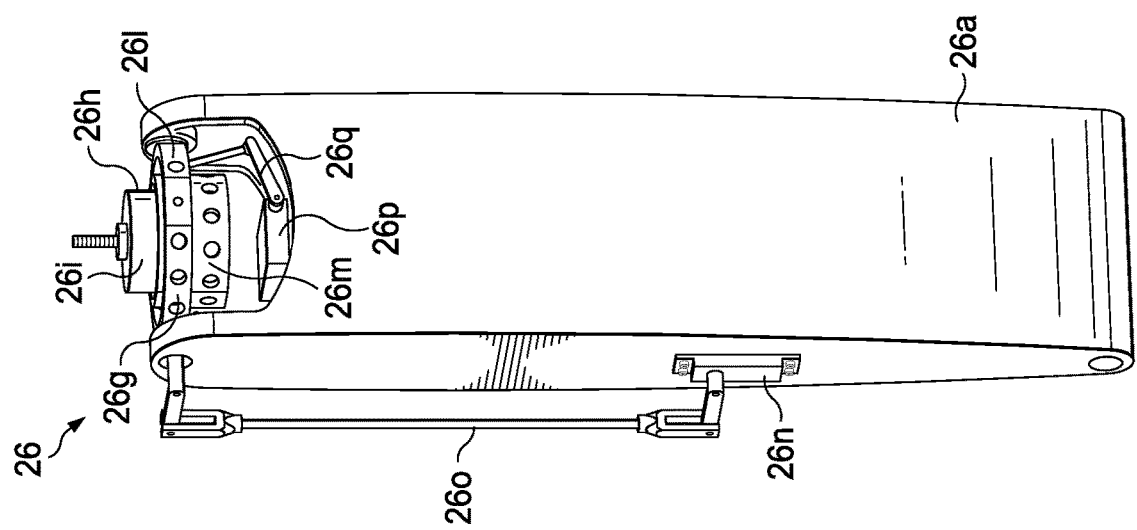
Figure 6G:
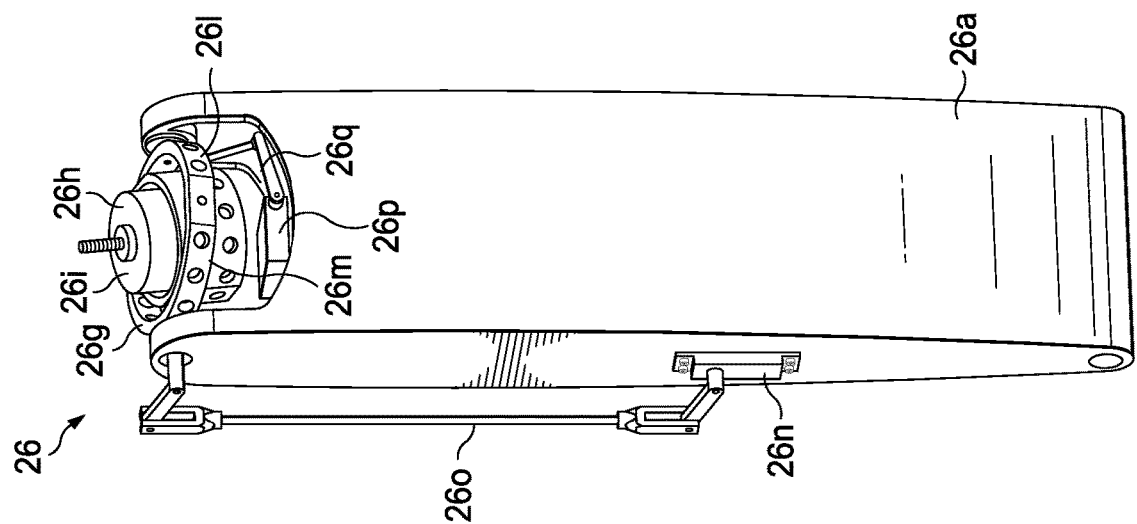

If it is desired to translate aircraft 10 in the lateral direction, right-left along lateral axis 10b in FIG. 1E, flight control system 22 sends commands to operate actuators 26p to collectively tilt each of propulsion systems 26h in the right or left direction while having actuators 26n in an unactuated state. In this configuration, propulsion assemblies 26 generate thrust vectors having a rightward or leftward directed lateral component. In a stable hover, such collective thrust vectoring of propulsion assemblies 26 provides lateral control authority to aircraft 10. As best seen in the comparison of FIGS. 6D-6F, actuator 26p is operated to tilt propulsion system 26h laterally between a fully right configuration shown in FIG. 6D and a fully left configuration shown in FIG. 6F as well as in an infinite number of positions therebetween including the fully vertical configuration shown in FIG. 6E. This operation laterally shifts the thrust vector of propulsion assembly 26 to enable the lateral control authority of aircraft 10. The maximum lateral tilt angle of gimbal 26g may preferably be between about 10 degrees and about 30 degrees, may more preferably be between about 15 degrees and about 25 degrees and may most preferably be about 20 degrees. As should be understood by those having ordinary skill in the art, the magnitude of the lateral component of the thrust vector is related to the direction of the thrust vector, which is determined by the lateral tilt angle of gimbal 26g. Using both the longitudinal and lateral control authority provided by collective thrust vectoring of propulsion assemblies 26, provides omnidirectional translational control authority for aircraft 10 in a stable hover. If it is desired to translate aircraft 10 in a direction between the longitudinal and lateral directions, such as in a diagonal direction, flight control system 22 sends commands to operate actuators 26n to collectively tilt each of propulsion systems 26h in the forward or aft direction and sends commands to operate actuators 26p to collectively tilt each of propulsion systems 26h in the right or left direction. In this configuration, propulsion assemblies 26 generate thrust vectors having a forward or aftward directed longitudinal component and a rightward or leftward directed lateral component. In a stable hover, such collective thrust vectoring of propulsion assemblies 26 provides omnidirectional translational control authority to aircraft 10. As best seen in the comparison of FIGS. 6G-6I, actuators 26n, 26p are operated to tilt propulsion system 26h diagonally between a fully aft/right configuration shown in FIG. 6G and a fully forward/left configuration shown in FIG. 6I as well as in an infinite number of positions therebetween including the fully vertical configuration shown in FIG. 6H. This operation shifts the thrust vector of propulsion assembly 26 to enable the omnidirectional control authority of aircraft 10.

Referring again to FIG. 4A, aircraft 10 includes four inboard propulsion assemblies 24 that form a two-dimensional thrust array of non thrust vectoring propulsion assemblies. Propulsion assemblies 24 each include an electronics node depicted as including controllers, sensors and one or more batteries and a propulsion system including an electric motor and a rotor assembly. The flight control system 22 is operably associated with propulsion assemblies 24 and is communicably linked to the electronic nodes thereof by a communications network depicted as the arrows between flight control system 22 and propulsion assemblies 24. Flight control system 22 receives sensor data from and sends commands to propulsion assemblies 24 to enable flight control system 22 to independently control each of propulsion assemblies 24 as discussed herein. An embodiment of a non thrust vectoring propulsion assemblies 24 is depicted in FIG. 5B. Propulsion assembly 24 includes a nacelle 24a and a propulsion system 24e that is coupled to nacelle 24a. In the illustrated embodiment, the rotor assembly has been removed from propulsion system 24e such that only electric motor 24f is visible. Thus, the thrust array configuration of aircraft 10 depicted in FIG. 4A includes inboard propulsion assemblies 24 having a first thrust type, non thrust vectoring, and outboard propulsion assemblies 26 having a second thrust type, omnidirectional thrust vectoring.

Figure 4B:
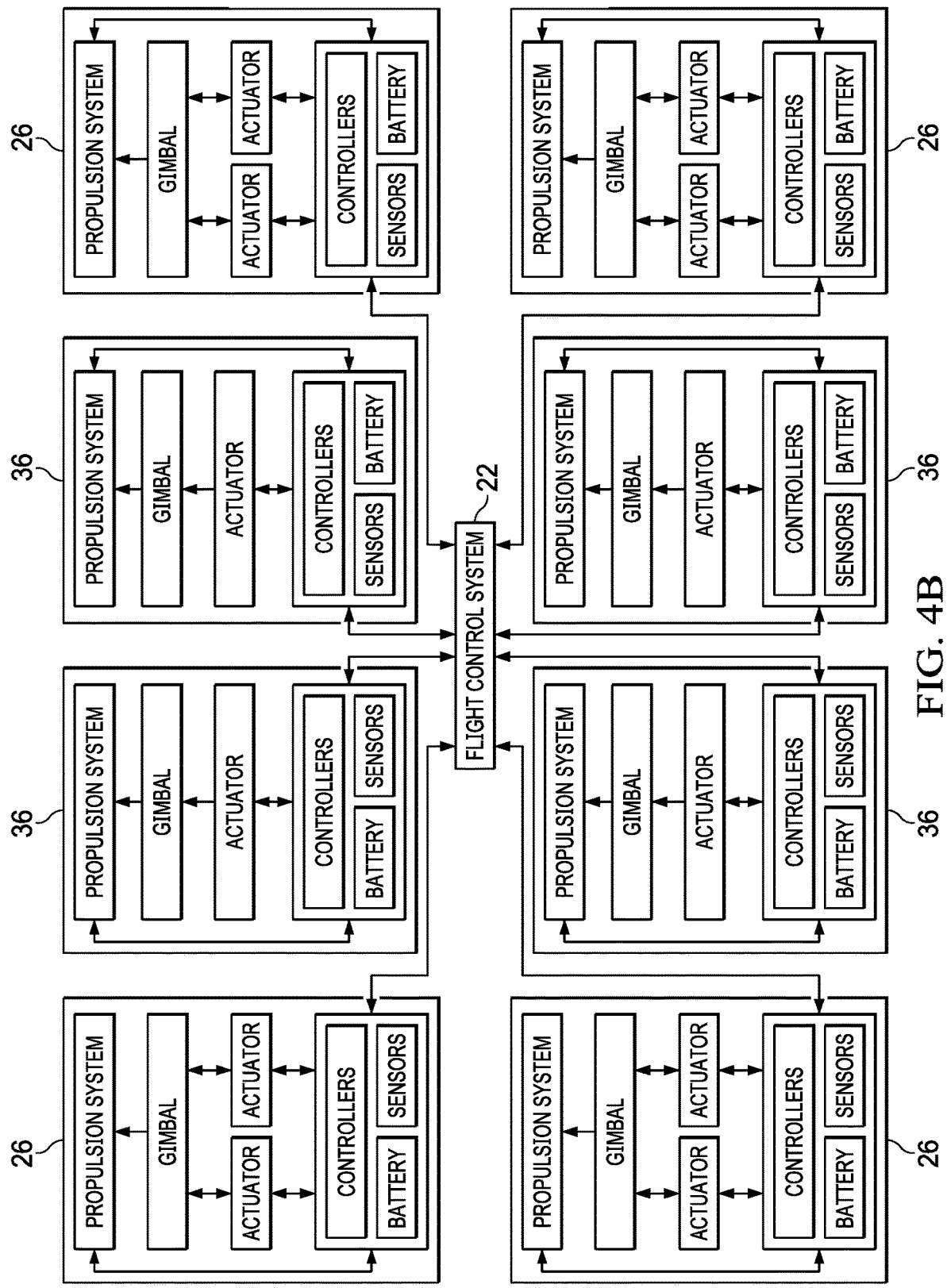

FIG. 4B depicts another embodiment of a thrust array configuration of aircraft 10. Specifically, aircraft 10 includes four outboard propulsion assemblies 26 that form a two-dimensional thrust array of omnidirectional thrust vectoring propulsion assemblies. Propulsion assemblies 26 each include an electronics node depicted as including controllers, sensors and one or more batteries, a two-axis gimbal operated by a pair of actuators and a propulsion system including an electric motor and a rotor assembly. The flight control system 22 is operably associated with propulsion assemblies 26 and is communicably linked to the electronic nodes thereof by a communications network depicted as the arrows between flight control system 22 and propulsion assemblies 26. Flight control system 22 receives sensor data from and sends commands to propulsion assemblies 26 to enable flight control system 22 to independently control each of propulsion assemblies 26 as discussed herein. In addition, aircraft 10 includes four inboard propulsion assemblies 36 that form a two-dimensional thrust array of single-axis thrust vectoring propulsion assemblies. Propulsion assemblies 36 each include an electronics node depicted as including controllers, sensors and one or more batteries, a single-axis gimbal operated by an actuator and a propulsion system including an electric motor and a rotor assembly. The flight control system 22 is operably associated with propulsion assemblies 36 and is communicably linked to the electronic nodes thereof by a communications network depicted as the arrows between flight control system 22 and propulsion assemblies 36. Flight control system 22 receives sensor data from and sends commands to propulsion assemblies 36 to enable flight control system 22 to independently control each of propulsion assemblies 36 as discussed herein. Thus, the thrust array configuration of aircraft 10 depicted in FIG. 4B includes inboard propulsion assemblies 36 having a first thrust type, single-axis thrust vectoring, and outboard propulsion assemblies 26 having a second thrust type, omnidirectional thrust vectoring.

An embodiment of a single-axis thrust vectoring propulsion assemblies 36 is depicted in FIG. 5C. Propulsion assembly 36 includes a nacelle 36a and a gimbal 36b that is pivotally coupled to nacelle 36a and is operable to tilt about a single axis. In the illustrated embodiment, actuator 36c is coupled between nacelle 36a and gimbal 36b such that operation of actuator 36c shifts linkage 36d to tilt gimbal 36b about the axis relative to nacelle 36a. A propulsion system 36e is coupled to and is operable to tilt with gimbal 36b about the axis relative to nacelle 36a. In the illustrated embodiment, the rotor assembly has been removed from propulsion system 36e such that only electric motor 36f is visible.

Figure 7A:
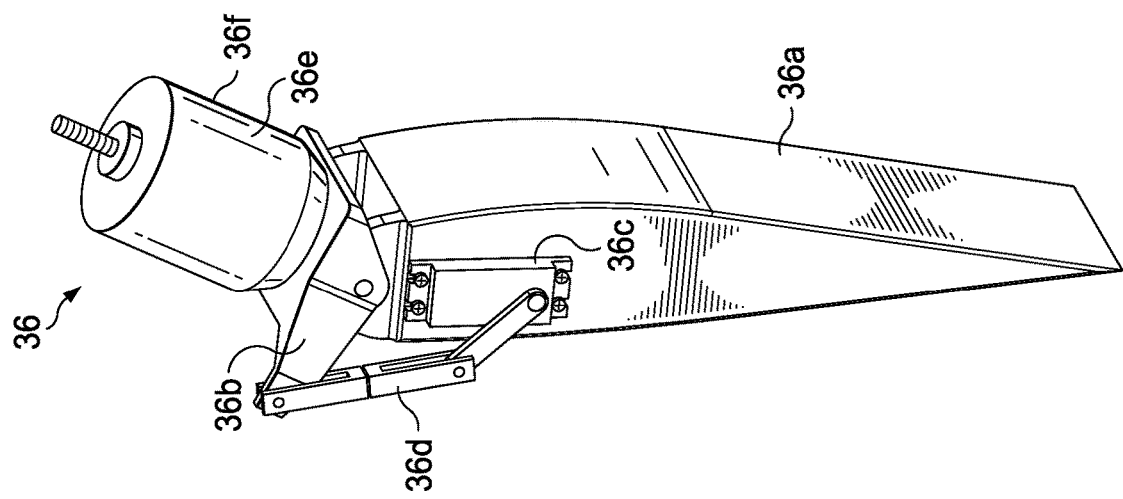
FIGS. 7A-7C are schematic illustrations of a propulsion assembly having a single-axis gimbal for an aircraft in accordance with embodiments of the present disclosure.
Figure 7B:
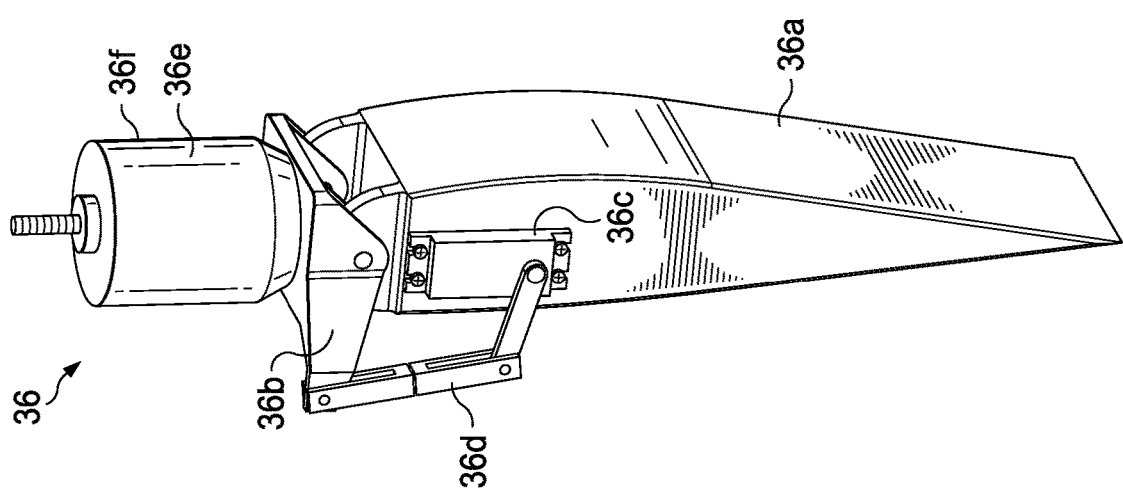
Figure 7C:
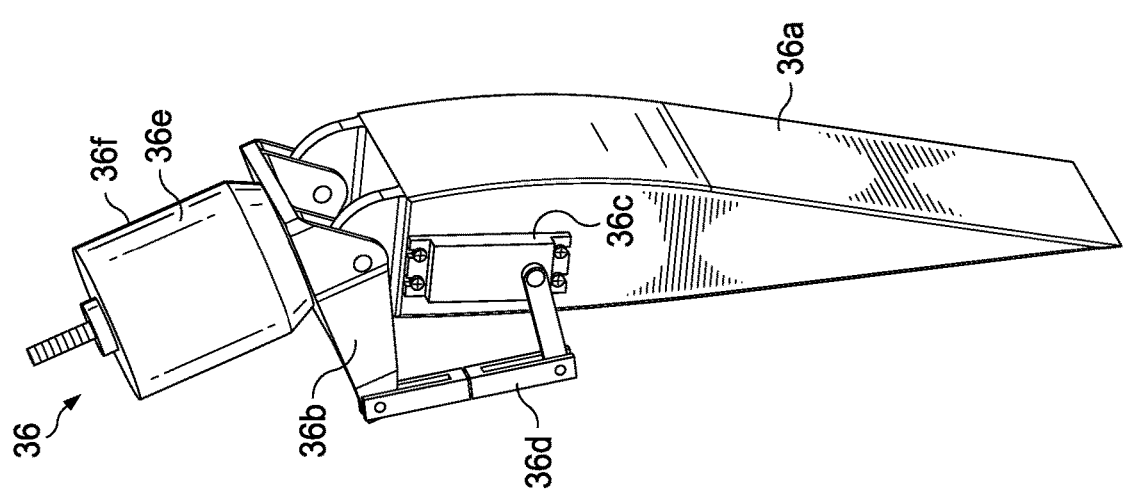

The operation of a single-axis thrust vectoring propulsion assemblies 36 will now be described with reference to FIGS. 7A-7C. Propulsion assemblies 36 are operable to provide aircraft 10 with control authority to translate in either the longitudinal direction or the lateral direction during a stable hover depending upon the direction of the single-axis of propulsion assemblies 36. Accordingly, propulsion assemblies 36 may be referred to herein as longitudinal thrust vectoring propulsion assemblies or lateral thrust vectoring propulsion assemblies depending upon their orientation relative to the axes of aircraft 10. For illustrative purposes, propulsion assemblies 36 will be described as longitudinal thrust vectoring propulsion assemblies in FIGS. 7A-7C. If it is desired to translate aircraft 10 in the longitudinal direction, fore-aft along longitudinal axis 10a, flight control system 22 sends commands to operate actuators 36c to collectively tilt each of propulsion systems 36e in the forward or aft direction. In this configuration, propulsion assemblies 36 generate thrust vectors having a forward or aftward directed longitudinal component. In a stable hover, such collective thrust vectoring of propulsion assemblies 36 provides longitudinal control authority to aircraft 10. As best seen in the comparison of FIGS. 7A-7C, actuator 36c is operated to tilt propulsion system 36e longitudinally between a fully forward configuration shown in FIG. 7A and a fully aft configuration shown in FIG. 7C as well as in an infinite number of positions therebetween including the fully vertical configuration shown in FIG. 7B. This operation longitudinally shifts the thrust vector of propulsion assembly 36 to enable the longitudinal control authority of aircraft 10. The maximum longitudinal tilt angle of gimbal 36b may preferably be between about 10 degrees and about 30 degrees, may more preferably be between about 15 degrees and about 25 degrees and may most preferably be about 20 degrees. As should be understood by those having ordinary skill in the art, the magnitude of the longitudinal component of the thrust vector is related to the direction of the thrust vector, which is determined by the longitudinal tilt angle of gimbal 36b.

Figure 4C:
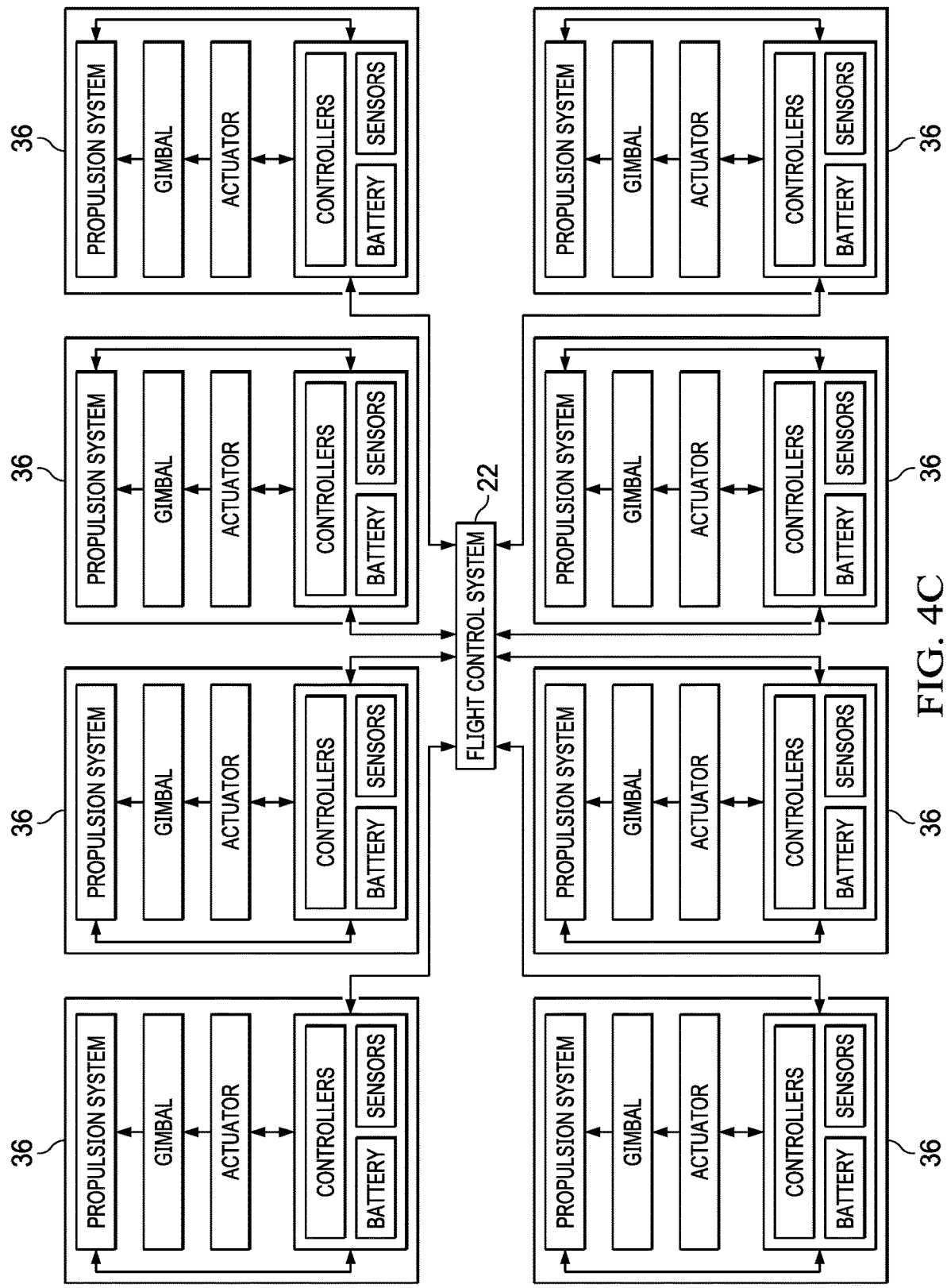

FIG. 4C depicts another embodiment of a thrust array configuration of aircraft 10. Specifically, aircraft 10 includes four outboard propulsion assemblies 36 that form a two-dimensional thrust array of single-axis thrust vectoring propulsion assemblies, either longitudinal thrust vectoring propulsion assemblies or lateral thrust vectoring propulsion assemblies. Propulsion assemblies 36 each include an electronics node depicted as including controllers, sensors and one or more batteries, a single-axis gimbal operated by an actuator and a propulsion system including an electric motor and a rotor assembly. The flight control system 22 is operably associated with propulsion assemblies 36 and is communicably linked to the electronic nodes thereof by a communications network depicted as the arrows between flight control system 22 and propulsion assemblies 36. Flight control system 22 receives sensor data from and sends commands to propulsion assemblies 36 to enable flight control system 22 to independently control each of propulsion assemblies 36 as discussed herein. In addition, aircraft 10 includes four inboard propulsion assemblies 36 that form a two-dimensional thrust array of single-axis thrust vectoring propulsion assemblies, either longitudinal thrust vectoring propulsion assemblies or lateral thrust vectoring propulsion assemblies, preferably having the alternate thrust type of the outboard propulsion assemblies 36. Inboard propulsion assemblies 36 each include an electronics node depicted as including controllers, sensors and one or more batteries, a single-axis gimbal operated by an actuator and a propulsion system including an electric motor and a rotor assembly. The flight control system 22 is operably associated with propulsion assemblies 36 and is communicably linked to the electronic nodes thereof by a communications network depicted as the arrows between flight control system 22 and propulsion assemblies 36. Flight control system 22 receives sensor data from and sends commands to propulsion assemblies 36 to enable flight control system 22 to independently control each of propulsion assemblies 36 as discussed herein. Thus, the thrust array configuration of aircraft 10 depicted in FIG. 4C includes inboard propulsion assemblies 36 having a first thrust type, single-axis thrust vectoring in one of the lateral or longitudinal direction, and outboard propulsion assemblies 36 having a second thrust type, single-axis thrust vectoring in the other of the lateral or longitudinal direction.

Figure 4D:
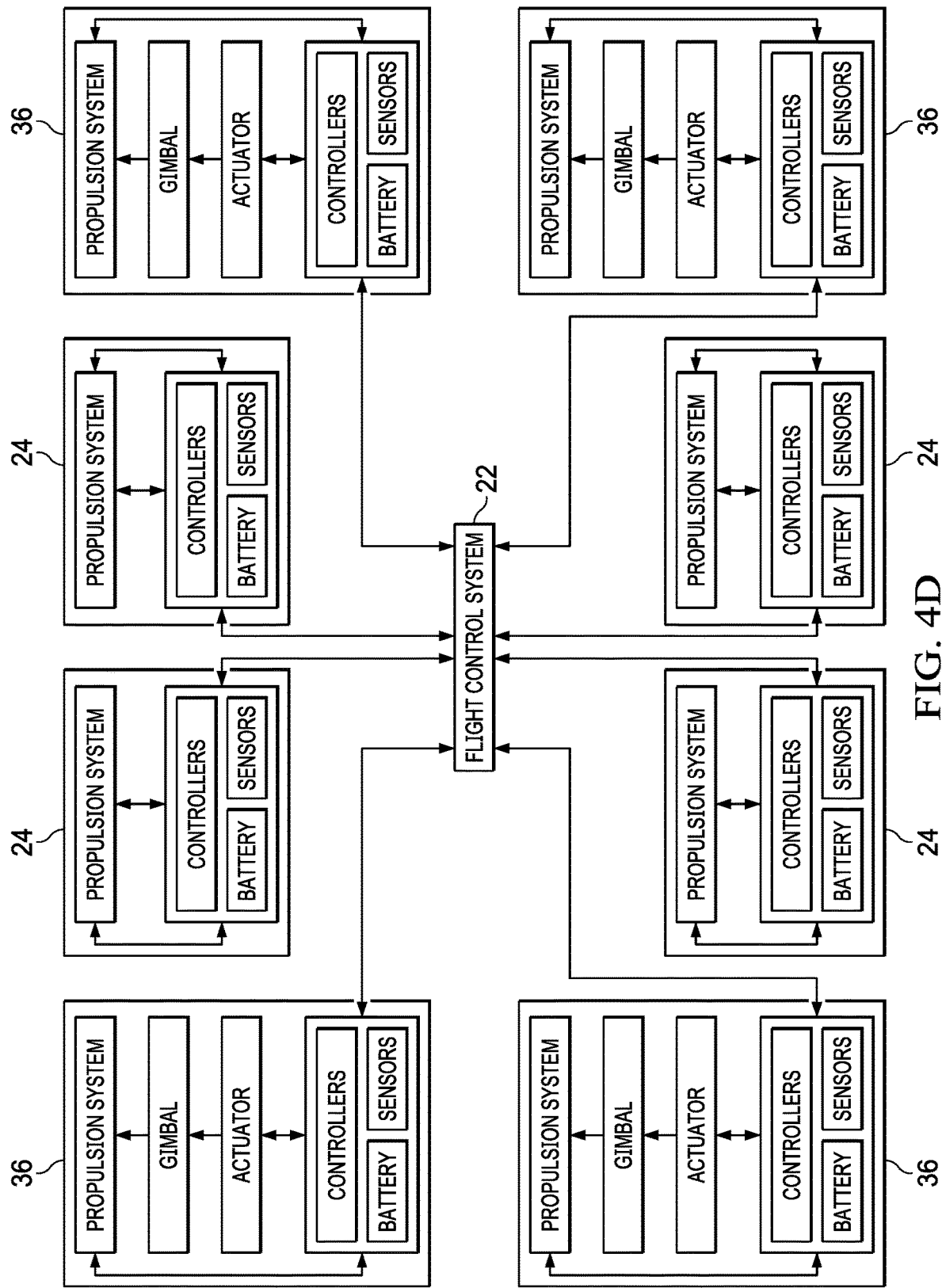

FIG. 4D depicts another embodiment of a thrust array configuration of aircraft 10. Specifically, aircraft 10 includes four outboard propulsion assemblies 36 that form a two-dimensional thrust array of single-axis thrust vectoring propulsion assemblies, either longitudinal thrust vectoring propulsion assemblies or lateral thrust vectoring propulsion assemblies. Propulsion assemblies 36 each include an electronics node depicted as including controllers, sensors and one or more batteries, a single-axis gimbal operated by an actuator and a propulsion system including an electric motor and a rotor assembly. The flight control system 22 is operably associated with propulsion assemblies 36 and is communicably linked to the electronic nodes thereof by a communications network depicted as the arrows between flight control system 22 and propulsion assemblies 36. Flight control system 22 receives sensor data from and sends commands to propulsion assemblies 36 to enable flight control system 22 to independently control each of propulsion assemblies 36 as discussed herein. In addition, aircraft 10 includes four inboard propulsion assemblies 24 that form a two-dimensional thrust array of non thrust vectoring propulsion assemblies. Propulsion assemblies 24 each include an electronics node depicted as including controllers, sensors and one or more batteries and a propulsion system including an electric motor and a rotor assembly. The flight control system 22 is operably associated with propulsion assemblies 24 and is communicably linked to the electronic nodes thereof by a communications network depicted as the arrows between flight control system 22 and propulsion assemblies 24. Flight control system 22 receives sensor data from and sends commands to propulsion assemblies 24 to enable flight control system 22 to independently control each of propulsion assemblies 24 as discussed herein. Thus, the thrust array configuration of aircraft 10 depicted in FIG. 4D includes outboard propulsion assemblies 36 having a first thrust type, single-axis thrust vectoring in one of the lateral or longitudinal direction, and inboard propulsion assemblies 24 having a second thrust type, non thrust vectoring.

Even though particular embodiments of the thrust array configuration of aircraft 10 have been depicted and described, those having ordinary skill in the art will recognize that the mission configurable aircraft of the present disclosure has a multitude of additional and/or alternate thrust array configurations. For example, aircraft 10 could have four outboard propulsion assemblies 36 that form a two-dimensional thrust array of single-axis thrust vectoring propulsion assemblies, either longitudinal thrust vectoring propulsion assemblies or lateral thrust vectoring propulsion assemblies and four inboard propulsion assemblies 26 that form a two-dimensional thrust array of omnidirectional thrust vectoring propulsion assemblies. As another alternative, aircraft 10 could have four outboard propulsion assemblies 24 that form a two-dimensional thrust array of non thrust vectoring propulsion assemblies and four inboard propulsion assemblies 26 that form a two-dimensional thrust array of omnidirectional thrust vectoring propulsion assemblies. As still another alternative, aircraft 10 could have four inboard propulsion assemblies 36 that form a two-dimensional thrust array of single-axis thrust vectoring propulsion assemblies, either longitudinal thrust vectoring propulsion assemblies or lateral thrust vectoring propulsion assemblies and four outboard propulsion assemblies 24 that form a two-dimensional thrust array of non thrust vectoring propulsion assemblies.

Figure 8B:
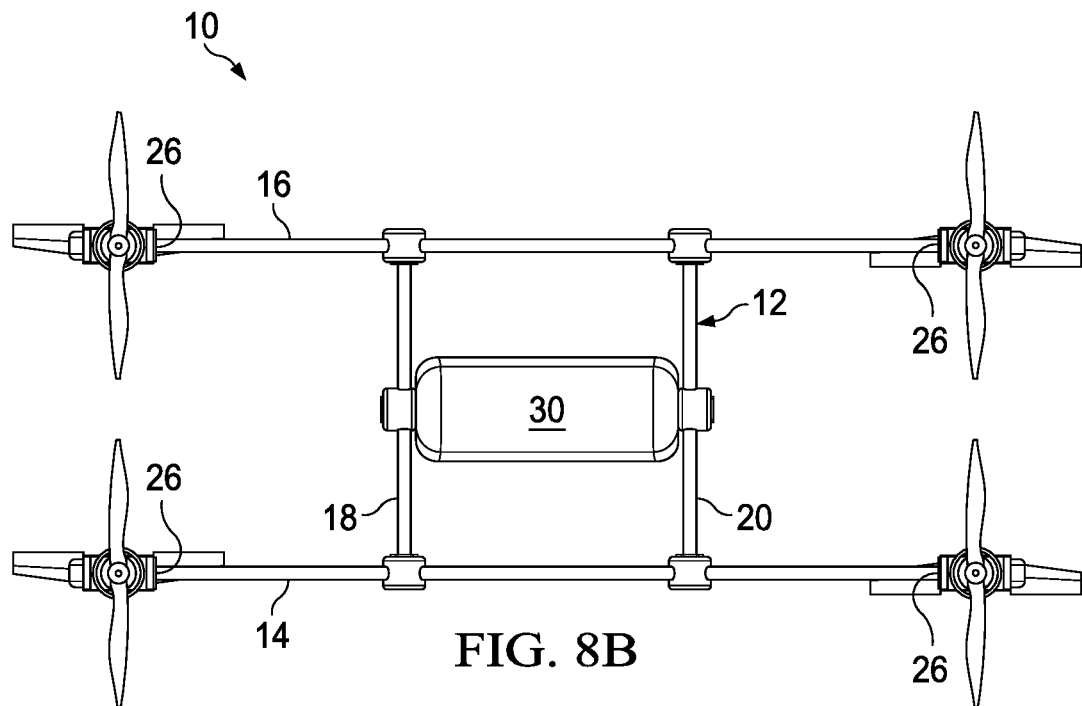
FIGS. 8A-8B are schematic illustrations of an aircraft operable to transition between thrust-borne lift in a VTOL orientation and wing-borne lift in a biplane orientation in accordance with embodiments of the present disclosure.
Figure 8A:
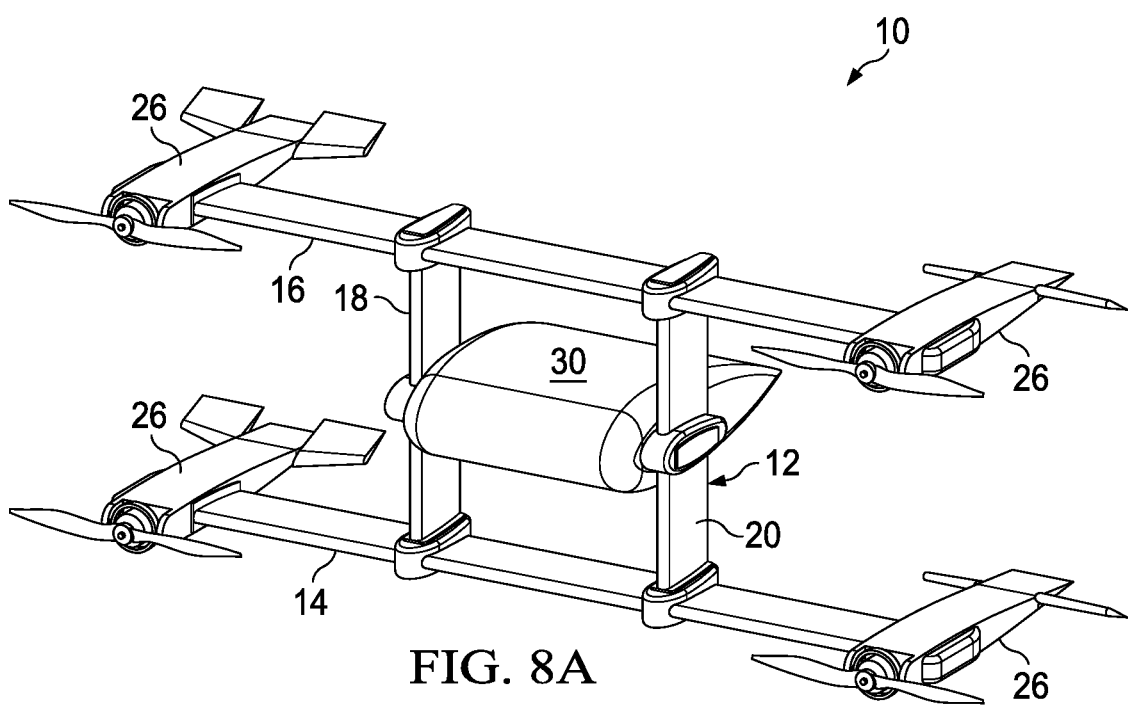

In addition to thrust array configurations having four inboard propulsion assemblies and four outboard propulsion assemblies, mission configurable aircraft 10 may have thrust array configurations with other numbers of propulsion assemblies. For example, as best seen in FIGS. 8A-8B, aircraft 10 has been configured with four propulsion assemblies 26 that form a two-dimensional distributed thrust array of omnidirectional thrust vectoring propulsion assemblies. In the illustrated embodiment, the airframe 12 is the same airframe described herein including wings 14, 16 each having two pylon stations and four nacelle stations. Extending generally perpendicularly between wings 14, 16 are two truss structures depicted as pylons 18, 20 each of which is coupled between two pylon stations of wings 14, 16 and preferably forming mechanical and electrical connections therebetween. Pylons 18, 20 each have a nacelle station and a payload station. Wings 14, 16 and pylons 18, 20 preferably include central passageways operable to contain systems such as flight control systems, energy sources and communication lines that enable the flight control system to communicate with the thrust array of aircraft 10. In the illustrated embodiment, payload 30 is selectively couplable between the payload stations of pylons 18, 20 preferably forming a mechanical and electrical connection therebetween.

Figure 9B:
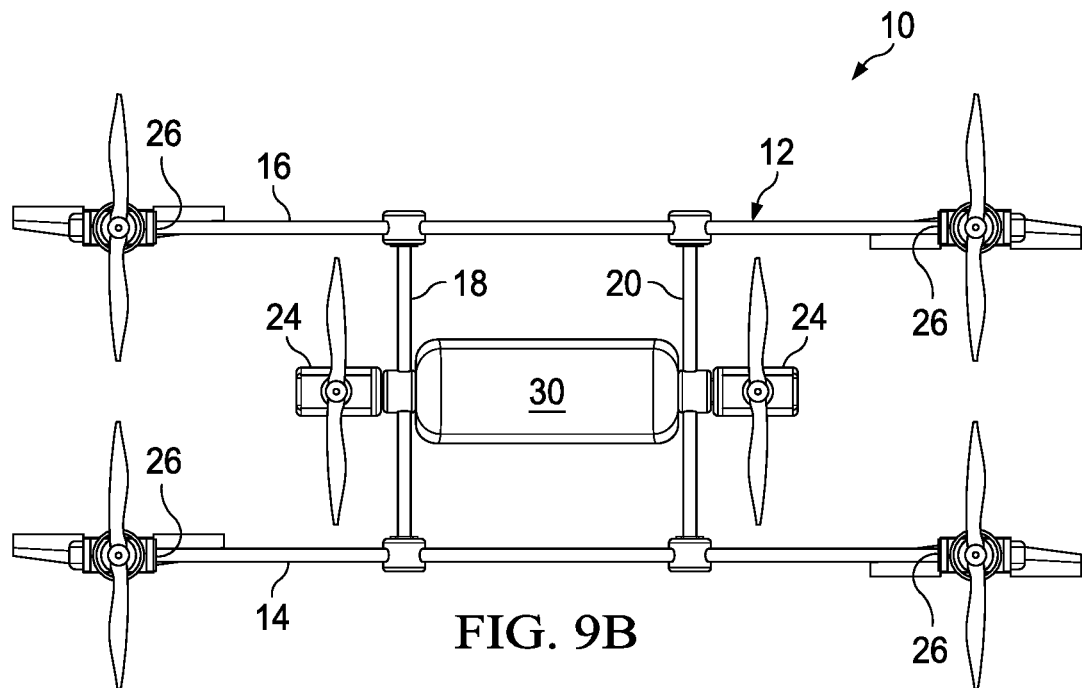
FIGS. 9A-9B are schematic illustrations of an aircraft operable to transition between thrust-borne lift in a VTOL orientation and wing-borne lift in a biplane orientation in accordance with embodiments of the present disclosure.
Figure 9A:
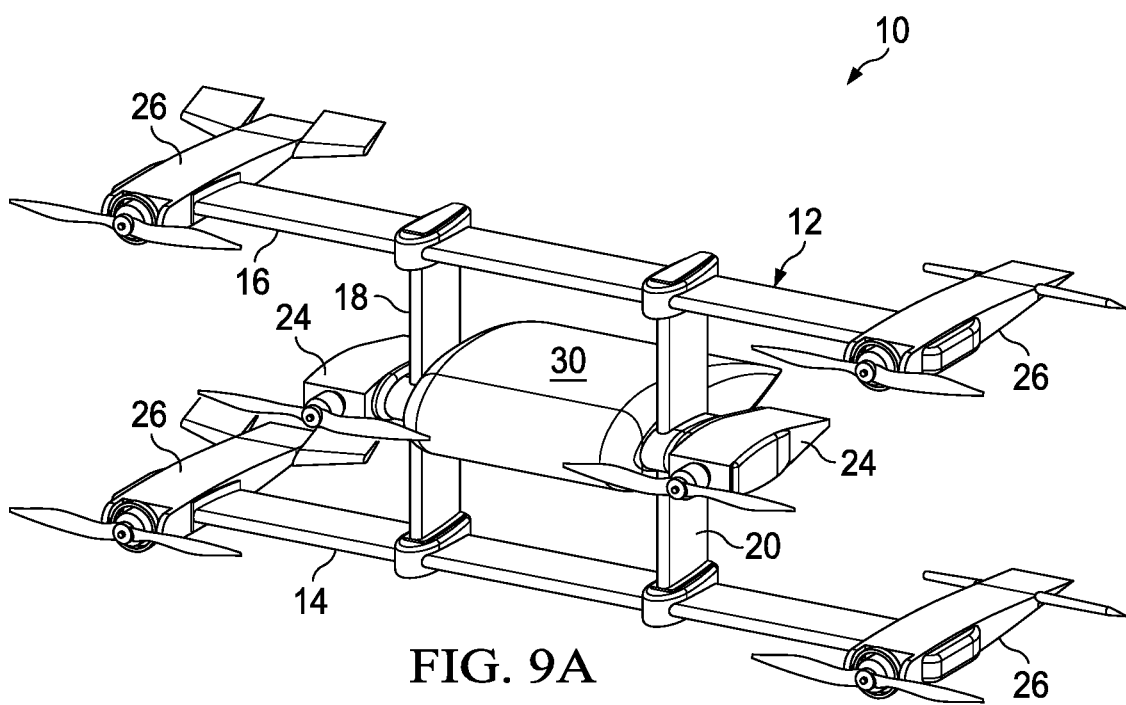

FIGS. 9A-9B, depict aircraft 10 configured with four outboard propulsion assemblies 26 that form a two-dimensional distributed thrust array of omnidirectional thrust vectoring propulsion assemblies and two inboard propulsion assemblies 24 that form a distributed thrust array of non thrust vectoring propulsion assemblies. In the illustrated embodiment, the airframe 12 is the same airframe described herein including wings 14, 16 each having two pylon stations and four nacelle stations. Extending generally perpendicularly between wings 14, 16 are two truss structures depicted as pylons 18, 20 each of which is coupled between two pylon stations of wings 14, 16 and preferably forming mechanical and electrical connections therebetween. Pylons 18, 20 each have a nacelle station and a payload station. Wings 14, 16 and pylons 18, 20 preferably include central passageways operable to contain systems such as flight control systems, energy sources and communication lines that enable the flight control system to communicate with the thrust array of aircraft 10. In the illustrated embodiment, payload 30 is selectively couplable between the payload stations of pylons 18, 20 preferably forming a mechanical and electrical connection therebetween.

Figure 10B:
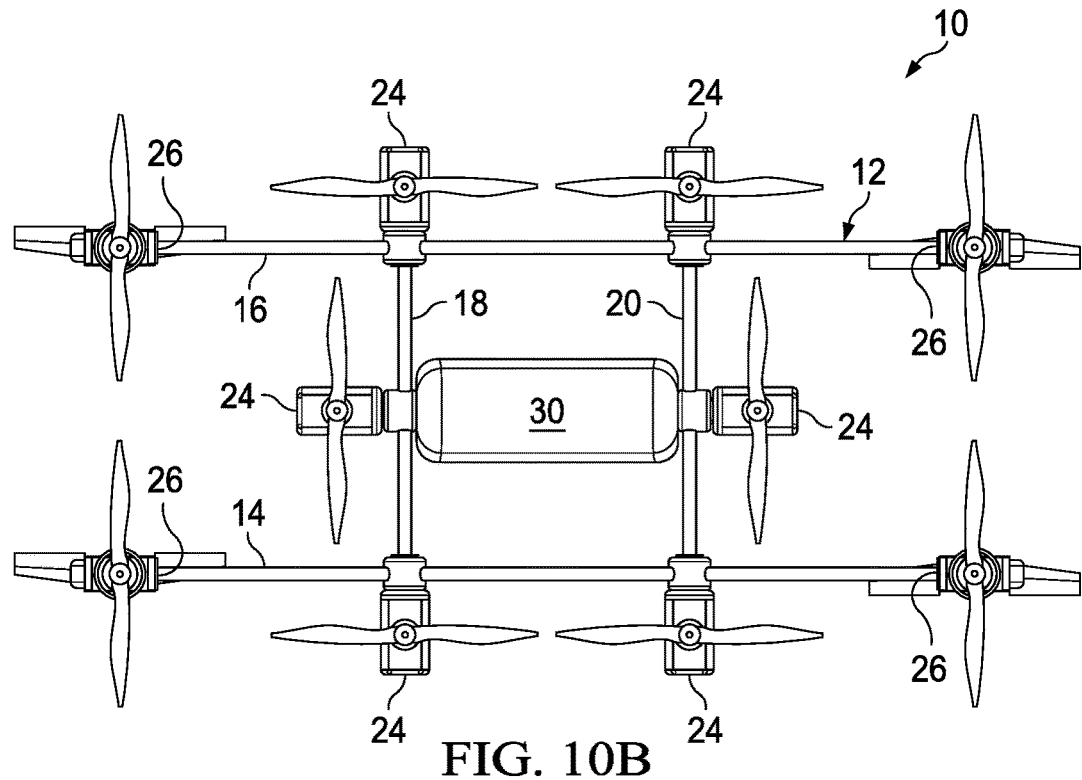
FIGS. 10A-10B are schematic illustrations of an aircraft operable to transition between thrust-borne lift in a VTOL orientation and wing-borne lift in a biplane orientation in accordance with embodiments of the present disclosure.
Figure 10A:
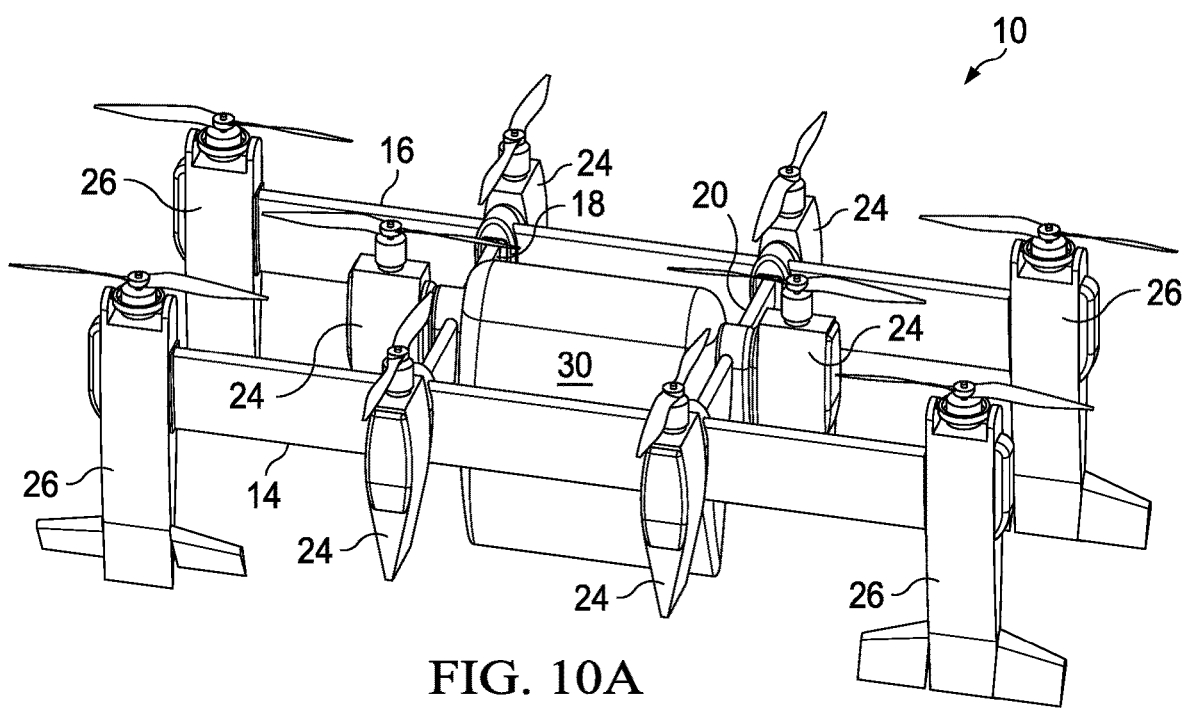
Figure 11B:
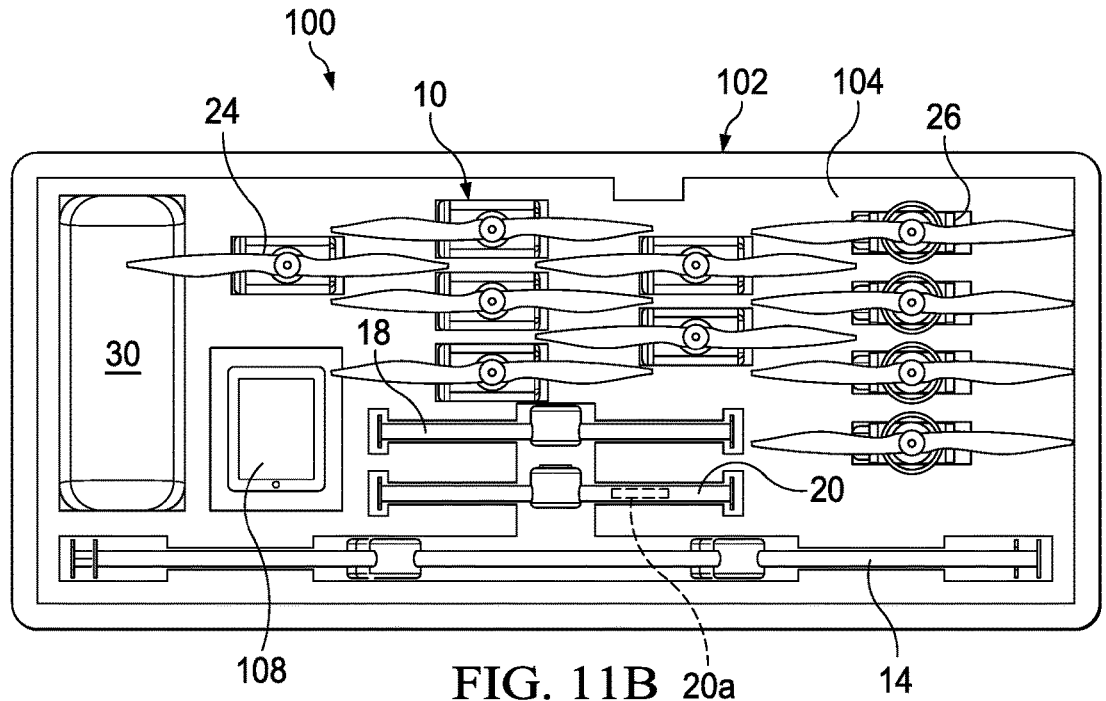
FIGS. 11A-11D are schematic illustrations of a man portable aircraft system operable for rapid in-situ assembly in accordance with embodiments of the present disclosure.
Figure 11A:
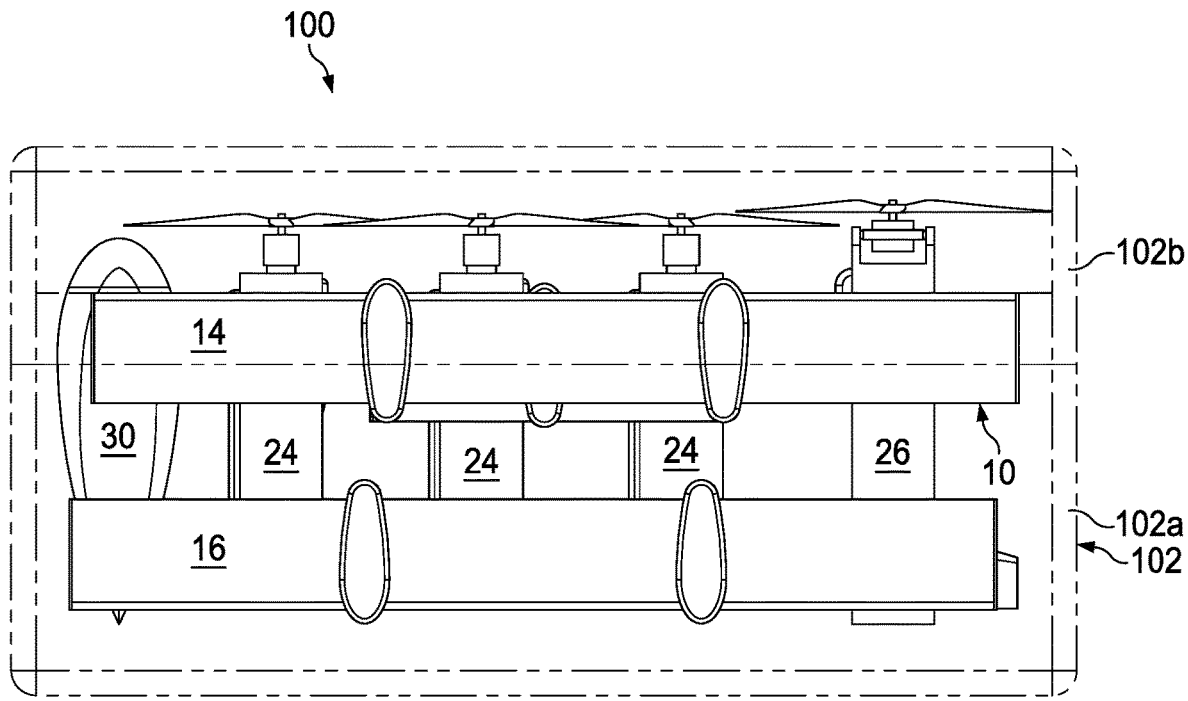
Figure 11D:
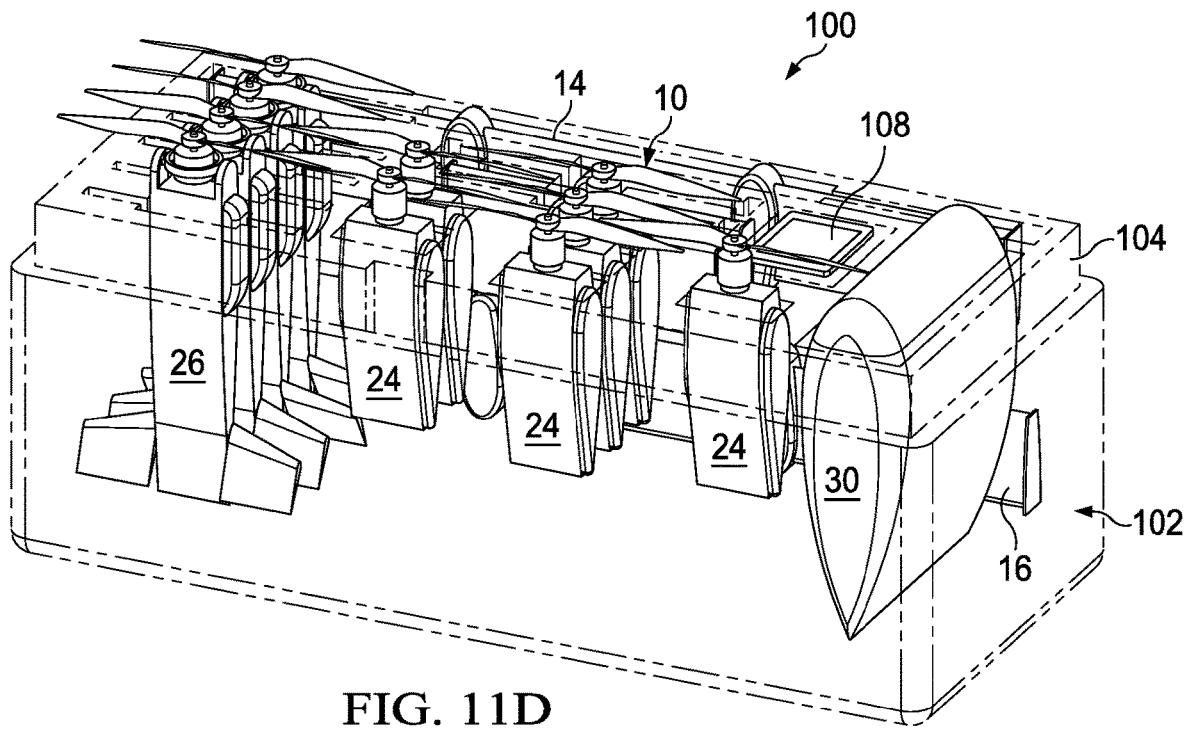
Figure 11C:
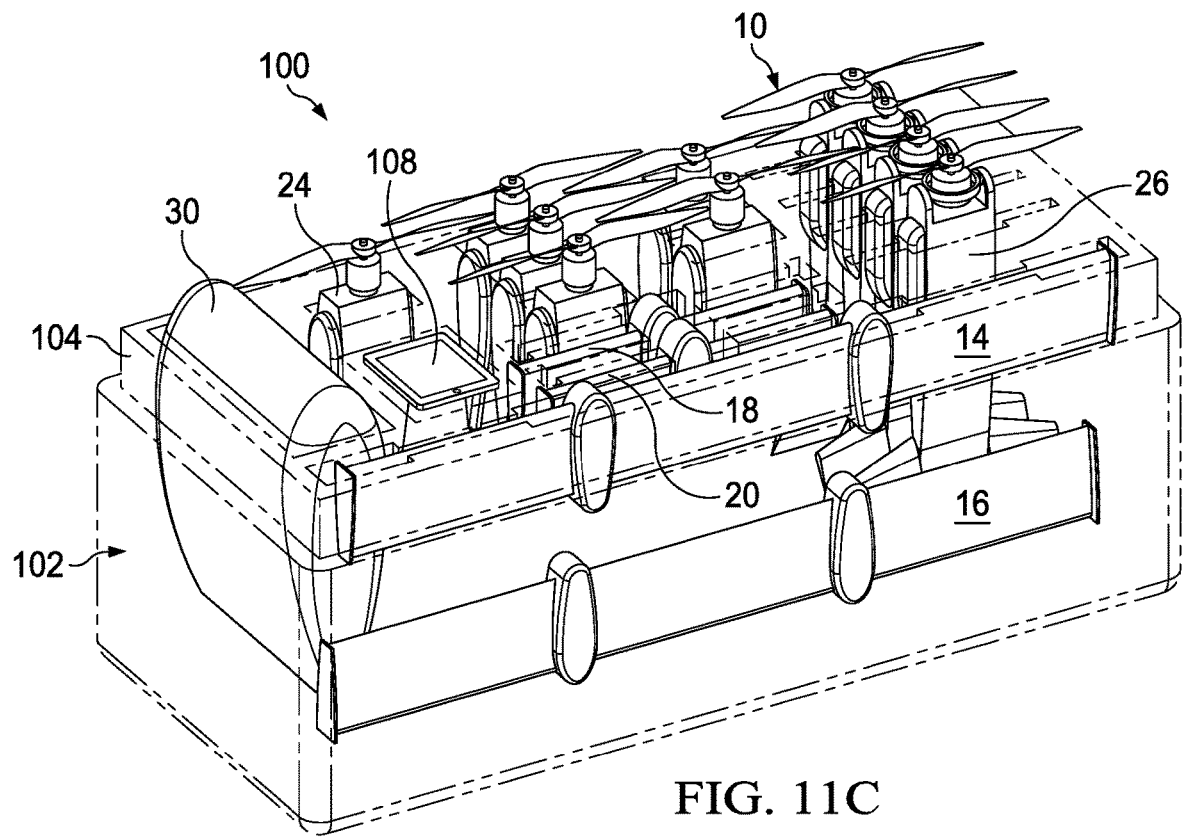

FIGS. 10A-10B, depict aircraft 10 configured with four outboard propulsion assemblies 26 that form a two-dimensional distributed thrust array of omnidirectional thrust vectoring propulsion assemblies and six inboard propulsion assemblies 24 that form a two-dimensional distributed thrust array of non thrust vectoring propulsion assemblies. In the illustrated embodiment, the airframe 12 is the same airframe described herein including wings 14, 16 each having two pylon stations and four nacelle stations. Extending generally perpendicularly between wings 14, 16 are two truss structures depicted as pylons 18, 20 each of which is coupled between two pylon stations of wings 14, 16 and preferably forming mechanical and electrical connections therebetween. Pylons 18, 20 each have a nacelle station and a payload station. Wings 14, 16 and pylons 18, 20 preferably include central passageways operable to contain systems such as flight control systems, energy sources and communication lines that enable the flight control system to communicate with the thrust array of aircraft 10. In the illustrated embodiment, payload 30 is selectively couplable between the payload stations of pylons 18, 20 preferably forming a mechanical and electrical connection therebetween.

The versatility of the mission configurable aircraft of the present disclosure enables a single aircraft or fleet of aircraft to become a mission specific suite of aircraft. For example, in a mission scenario of picking up and delivering a payload, aircraft 10 could initially be configured as shown in FIGS. 8A-8B with four outboard propulsion assemblies 26 that form a two-dimensional distributed thrust array of omnidirectional thrust vectoring propulsion assemblies located on the outboard nacelle stations of aircraft 10. This initial thrust array configuration provides aircraft 10 with the necessary thrust capacity and vehicle control to fly from a storage location such as an aircraft hub or hanger or a field location such as within a military theater to the location of the payload to be picked up, without the weight penalty of carrying the inboard propulsion assemblies and the accompanying loss of efficiency. Upon reaching the payload location, aircraft 10 could be reconfigured to the configuration as shown in FIGS. 10A-10B keeping the four outboard propulsion assemblies 26 and adding six inboard propulsion assemblies 24 that form a two-dimensional distributed thrust array of non thrust vectoring propulsion assemblies located on the inboard nacelle stations of aircraft 10. This thrust array configuration provides aircraft 10 with the added thrust capacity to lift and transport a heavy payload 30 to a delivery location. After delivery of payload 30, aircraft 10 could again be reconfigured to the configuration shown in FIGS. 8A-8B, FIGS. 9A-9B, FIGS. 1A-1G, any of FIGS. 4A-4D or other desired configuration depending upon the parameters of the next mission.

In certain implementations, the mission configurable aircraft of the present disclosure may be part of a man portable aircraft system that is easily transportable and operable for rapid in-situ assembly. Such a man portable aircraft system 100 is depicted in FIGS. 11A-11D of the drawings. Man portable aircraft system 100 includes a container 102 formed from a base 102a and a cover 102b that may be secured together with hinges, latches, locks or other suitable connections. Cover 102b and/or base 102a may include handles, straps or other means to enable container 102 with aircraft 10 therein to be easily moved or carried. As used herein, the term "man portable" means capable of being carried by one man. As a military term in land warfare, "man portable" means capable of being carried by one man over a long distance without serious degradation to the performance of normal duties. The term "man portable" may be used to qualify items, for example, a man portable item is one designed to be carried as an integral part of individual, crew-served or team equipment of a dismounted soldier in conjunction with assigned duties and/or an item with an upper weight limit of approximately 31 pounds.

In the illustrated embodiment, container 102 has an insert 104 disposed within base 102a having precut locations that are designed to receive the various component parts of aircraft 10 therein while aircraft 10 is in a disassembled state. Aircraft 10 of man portable aircraft system 100 is preferably operable to transition between thrust-borne lift in a VTOL orientation and wing-borne lift in a biplane orientation, as discussed herein. In the illustrated embodiment, man portable aircraft system 100 includes wing 14 that has first and second pylon stations, first and second inboard nacelle stations and first and second outboard nacelle stations. Man portable aircraft system 100 also includes wing 16 having first and second pylon stations, first and second inboard nacelle stations and first and second outboard nacelle stations. Man portable aircraft system 100 further includes pylon 18 that is couplable between the first pylon stations of wings 14, 16 and pylon 20 that is couplable between the second pylon stations of wings 14, 16. Pylons 18, 20 each include a payload station and an inboard nacelle station. When assembled, wings 14, 16 and pylons 18, 20 form the airframe of aircraft 10. Man portable aircraft system 100 includes six inboard propulsion assemblies 24 which represent the maximum number of inboard propulsion assemblies that may be coupled to the inboard nacelle stations of wings 14, 16 and/or pylons 18, 20. Man portable aircraft system 100 also includes four outboard propulsion assemblies 26 which represent the maximum number of outboard propulsion assemblies that may be coupled to the outboard nacelle stations of wings 14, 16. In the illustrated embodiment, a flight control system 20a is disposed within pylon 20 and is operable to independently control each of the propulsion assemblies once aircraft 10 is in an assembled state. One or more batteries (not shown) may also be located in pylon 20, within other airframe members and preferably within each propulsion assembly 24, 26. Man portable aircraft system 100 includes a payload 30 that is operable to be coupled between the payload stations of pylons 18, 20. Payload 30 may carry, include or be integral with a variety of modules such as a package delivery module, an air reconnaissance module, a light detection and ranging module, a camera module, an optical targeting module, a laser module, a sensors module, an air-to-ground weapons module, an air-to-air weapons module, a communications module and/or a cargo hook module or the like depending upon the mission being perform by aircraft 10. Thus, in certain configurations, aircraft 10 may be operable as a man portable observation platform.

Man portable aircraft system 100 includes a computing system 108, depicted as a tablet computer that is operable as a ground control station for aircraft 10. Computing system 108 preferably includes non-transitory computer readable storage media including one or more sets of computer instructions or applications that are executable by one or more processors for configuring, programming and/or remotely controlling aircraft 10. Computing system 108 may be one or more general-purpose computers, special purpose computers or other machines with memory and processing capability. Computing system 108 may include one or more memory storage modules including, but is not limited to, internal storage memory such as random access memory, non-volatile memory such as read only memory, removable memory such as magnetic storage memory, optical storage, solid-state storage memory or other suitable memory storage entity. Computing system 108 may be a microprocessor-based system operable to execute program code in the form of machine-executable instructions. In addition, computing system 108 may be selectively connectable to other computer systems via a proprietary encrypted network, a public encrypted network, the Internet or other suitable communication network that may include both wired and wireless connections.

Figure 12:
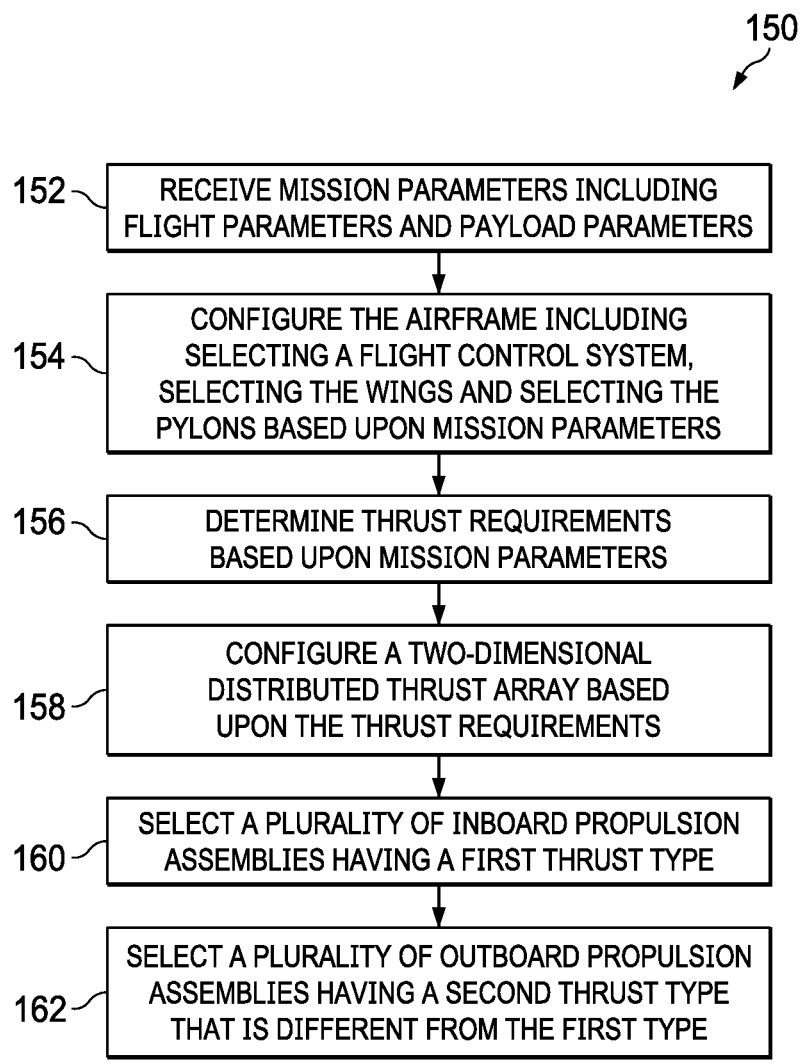
FIG. 12 is a flow diagram of a process for automated configuration of mission specific aircraft in accordance with embodiments of the present disclosure.

In the illustrated man portable aircraft system 100, computing system 108 is operable for automated configuration of a mission specific aircraft as described with reference to FIG. 12. In process 150, computing system 108 is configured to receive mission parameters including flight parameters and payload parameters, as indicated in block 152. The flight parameters may include time requirements, flight speed requirements, elevation requirements, range requirements, endurance requirements, environmental conditions and the like that may be manually input into computing system 108 or received as a digital flight plan from another computing entity over a wired and/or wireless communication channel. The payload parameters may include payload weight requirements, payload functionality requirements, payload coupling and decoupling requirements, payload operational requirements and the like. In block 154, based upon the mission parameters, computing system 108 configures the airframe including selecting a flight control system, selecting the wings and selecting the pylons. While the illustrated man portable aircraft system 100 included only one set of wings, pylons and a flight control system, other man portable aircraft systems may include additional or different airframe components. For example, other man portable aircraft systems may have wings and pylons of different sizes, wings and pylons made from other materials, wings and pylons having other numbers of or locations for inboard and/or outboard propulsion assemblies, flight control systems having different capabilities and the like. Accordingly, computing system 108 is operable for mission specific aircraft configuration using a wide variety of different airframe components. In the illustrated example of man portable aircraft system 100, computing system 108 is operable to select wing 14 having first and second pylon stations, first and second inboard nacelle stations and first and second outboard nacelle stations, wing 16 having first and second pylon stations, first and second inboard nacelle stations and first and second outboard nacelle stations, pylon 18 having a payload station, an inboard nacelle station and couplable between the first pylon stations of wings 14, 16 and pylon 20 having a payload station, an inboard nacelle station and couplable between the second pylon stations of wings 14, 16.

In block 156, computing system 108 is operable to determine the thrust requirements for aircraft 10 based upon the mission parameters. This process will identify a thrust array capable of the total and/or maximum thrust requirements of aircraft 10 based on upon various expected operating conditions including, for example, the thrust requirement during VTOL operations, the thrust requirement for stable hover in a level flight attitude, the thrust requirement for stable hover in an inclined flight attitude, the thrust requirement for attitude stability during translation and/or other high or unique thrust demand conditions. This process may also identify a thrust array capable of high efficiency for high endurance missions. In block 158, computing system 108 is operable to configure a two-dimensional distributed thrust array based upon the thrust requirements. This process includes selecting the number, the type and the mounting locations for the propulsion assemblies. As an example, this process may include selecting the number and type of batteries to be contained within the selected propulsion assemblies. As another example, this process may include selecting various rotor blades for the selected propulsion assemblies such as selecting the number of rotor blades, the rotor assembly diameter, the rotor blade twist, the rotor blade chord distribution and the like. As discussed herein, aircraft 10 is a mission configurable aircraft that may be operated with various thrust array configurations such as with only outboard propulsion assembles as depicted in FIGS. 8A-8B, with outboard propulsion assembles and pylon mounted inboard propulsion assemblies as depicted in FIGS. 9A-9B, with outboard propulsion assembles and wing mounted inboard propulsion assemblies as depicted in FIGS. 1A-2I, or with outboard propulsion assembles, wing mounted inboard propulsion assemblies and pylon mounted inboard propulsion assemblies as depicted in FIGS. 10A-10B, as examples.

In the illustrated example of man portable aircraft system 100, computing system 108 is operable to select a plurality of inboard propulsion assemblies having a first thrust type operable for coupling to the first and second inboard nacelle stations of wings 14, 16, as indicated in block 160. In addition, computing system 108 is operable to select a plurality of outboard propulsion assemblies having a second thrust type operable for coupling to the first and second outboard nacelle stations of wings 14, 16 with the first thrust type being different from the second thrust type, as indicated in block 162. As examples, based upon the thrust requirements, computing system 108 may select outboard propulsion assemblies that are thrust vectoring propulsion assemblies and inboard propulsion assemblies that are non thrust vectoring propulsion assemblies. Computing system 108 may select outboard propulsion assemblies that are unidirectional thrust vectoring propulsion assemblies and inboard propulsion assemblies that are non thrust vectoring propulsion assemblies. Computing system 108 may select outboard propulsion assemblies that are omnidirectional thrust vectoring propulsion assemblies and inboard propulsion assemblies that are non thrust vectoring propulsion assemblies. Computing system 108 may select outboard propulsion assemblies that are omnidirectional thrust vectoring propulsion assemblies and inboard propulsion assemblies that are unidirectional thrust vectoring propulsion assemblies. Computing system 108 may select inboard propulsion assemblies that are longitudinal thrust vectoring propulsion assemblies and outboard propulsion assemblies that are lateral thrust vectoring propulsion assemblies. Computing system 108 may select outboard propulsion assemblies that are longitudinal thrust vectoring propulsion assemblies and inboard propulsion assemblies that are lateral thrust vectoring propulsion assemblies.

Figure 13:
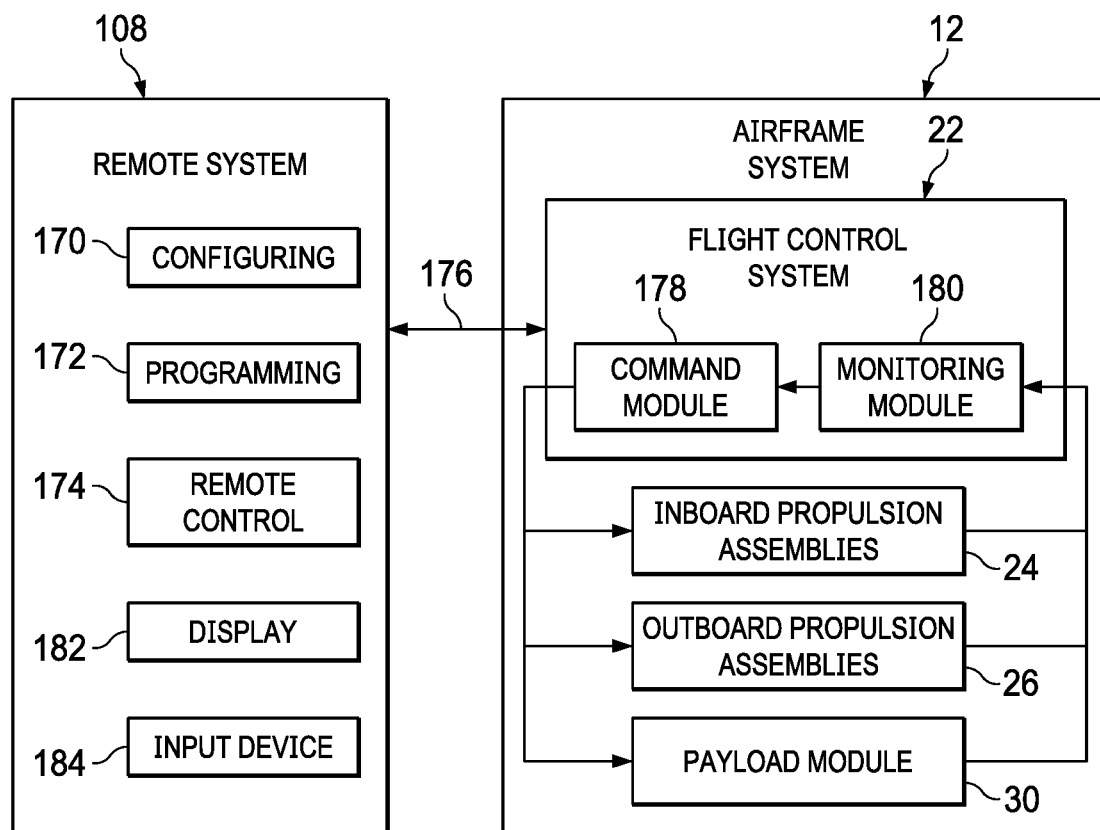
FIG. 13 is a block diagram of autonomous and remote control systems for an aircraft in accordance with embodiments of the present disclosure.

Referring additional to FIG. 13, computing system 108 not only includes the configuring application 170, but also includes a programming application 172 and a remote control application 174. Programming application 172 enables a user to provide a flight plan and mission information to aircraft 10 such that flight control system 22 may engage in autonomous control over aircraft 10. For example, programming application 172 may communicate with flight control system 22 over a wired or wireless communication channel 176 to provide a flight plan including, for example, a starting point, a trail of waypoints and an ending point such that flight control system 22 may use waypoint navigation during the mission. In addition, programming application 172 may provide one or more tasks to flight control system 22 for aircraft 10 to accomplish during the mission. Following programming, aircraft 10 may operate autonomously responsive to commands generated by flight control system 22. In the illustrated embodiment, flight control system 22 includes a command module 178 and a monitoring module 180. It is to be understood by those skilled in the art that these and other modules executed by flight control system 22 may be implemented in a variety of forms including hardware, software, firmware, special purpose processors and combinations thereof.

Figure 14A:
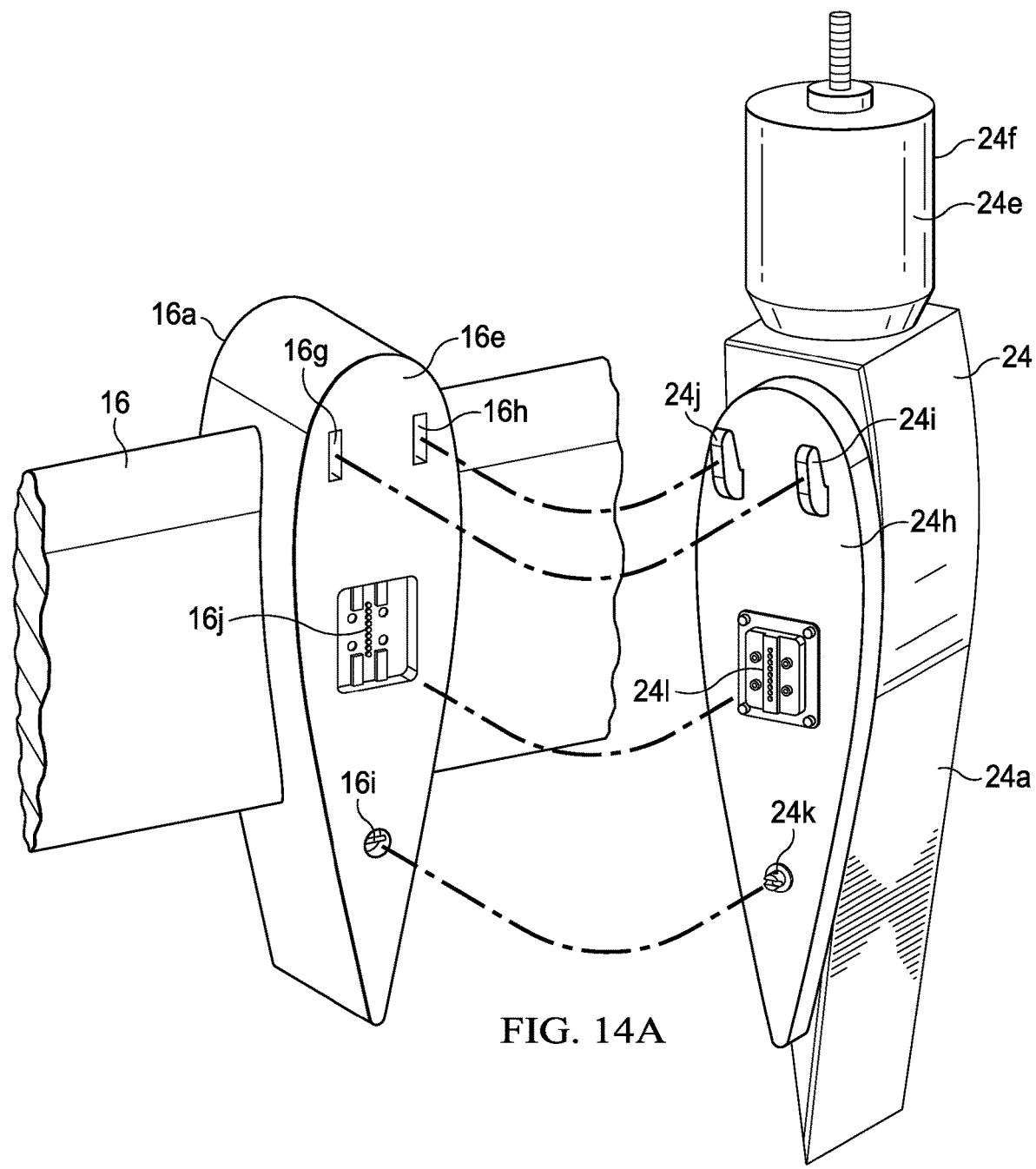
FIGS. 14A-14C are schematic illustrations of rapid connection interfaces operable for use in coupling component parts of an aircraft in accordance with embodiments of the present disclosure.
Figure 14B:
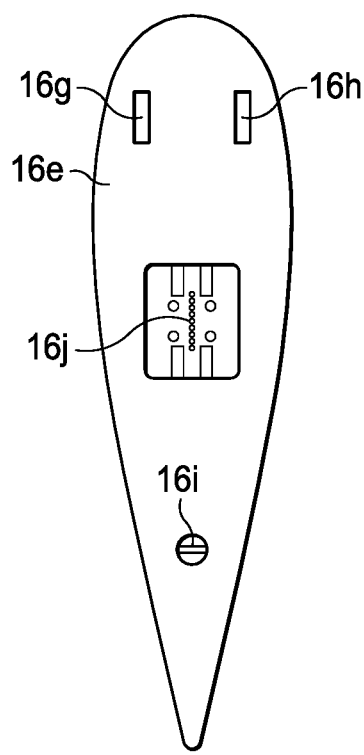
Figure 14C:
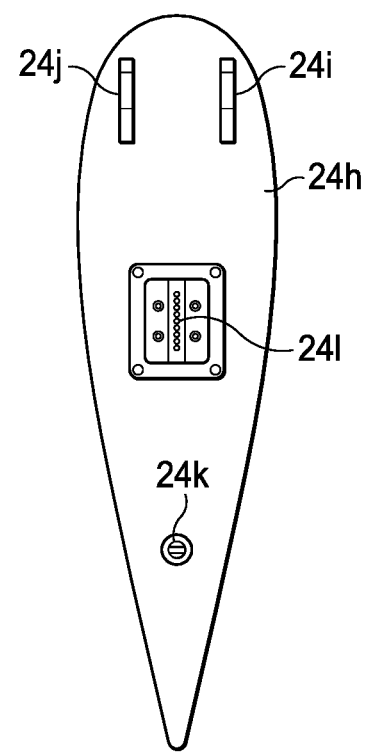

During flight operations, command module 178 sends commands to inboard propulsion assemblies 24 and outboard propulsion assemblies 26 to individually and independently control and operate each propulsion assembly. For example, flight control system 22 is operable to individually and independently control the operating speed, the thrust vector and the aerosurface position of the propulsion assembly. In addition, command module 178 may send commands to payload module 30 such that payload module 30 may accomplish the intended mission. For example, upon reaching an operational location, command module 178 may command payload module 30 to release a package, engage in a surveillance operation, optically mark a target, launch an air-to-ground or air-to-air weapon, deploy a cargo hook or perform another payload module function. Also during flight operation, monitoring module 180 receives feedback from the various elements within inboard propulsion assemblies 24, outboard propulsion assemblies 26 and payload module 30 such as information from sensors, controllers, actuators and the like. This feedback is processed by monitoring module 180 to supply correction data and other information to command module 178. Aircraft 10 may utilize additional sensor systems such as altitude sensors, attitude sensors, speed sensors, environmental sensors, fuel supply sensors, temperature sensors and the like that also provide information to monitoring module 180 to further enhance autonomous control capabilities. Some or all of the autonomous control capability of flight control system 22 can be augmented or supplanted by remote control application 174 of computing system 108. Computing system 108 may communicate with flight control system 22 in real-time over communication link 176. Computing system 108 preferably includes one or more display devices 182 configured to display information relating to or obtained by one or more aircraft of the present disclosure. Computing system 108 may also include audio output and input devices such as a microphone, speakers and/or an audio port allowing an operator to communicate with, for example, other remote station operators. Display device 182 may also serve as a remote input device 184 in touch screen display implementation, however, other remote input devices, such as a keyboard or joysticks, may alternatively be used to allow an operator to provide control commands to aircraft 10. Accordingly, aircraft 10 of man portable aircraft system 100 may be operated responsive to remote flight control, autonomous flight control and combinations thereof Returning again to the automated configuration functionality of computing system 108, once the design parameters of aircraft 10 have been determined by configuring application 170, man portable aircraft system 100 is operable for rapid in-situ assembly of aircraft 10. Specifically, the connections between the wings, the pylons, the propulsion assemblies and the payload of man portable aircraft system 100 are each operable for rapid in-situ assembly through the use of high speed fastening elements. For example, referring additionally to FIGS. 14A-14C of the drawings, the structural and electrical connections between an inboard nacelle station of a wing and an inboard propulsion assembly will now be described. In the illustrated embodiment, a section of wing 16 include inboard nacelle station 16e which is oppositely disposed from pylon station 16a. Inboard nacelle station 16e has a rapid connection interface that includes a pair of upper mechanical connections depicted as cams 16g, 16h, the outer slot portion of each being visible in the figures. Inboard nacelle station 16e includes a lower mechanical connection depicted as spring 16i. Disposed between upper mechanical connections 16g, 16h and lower mechanical connection 16i is a central mechanical connection including an electrical connection depicted as a female mating profile with a plurality of electrical pins 16j, such as spring biased pins. In the illustrated embodiment, inboard propulsion assembly 24 including a rapid connection interface 24h having a pair of upper mechanical connections depicted as hooks 24i, 24j and a lower mechanical connection depicted as a slotted fastener 24k. Disposed between upper mechanical connections 24i, 24j and lower mechanical connection 24k is a central mechanical connection including an electrical connection depicted as a male mating profile with a plurality of electrical sockets 24l.

In operation, inboard nacelle station 16e and inboard propulsion assembly 24 may be coupled and decoupled with simple operations. Specifically, to coupled inboard propulsion assembly 24 with inboard nacelle station 16e, the distal ends of hooks 24i, 24j are inserted into the outer slots of cams 16g, 16h with inboard propulsion assembly 24 tilted relative to inboard nacelle station 16e at an angle between about 30 degrees and about 60 degrees. Once hooks 24i, 24j are inserted into cams 16g, 16h, inboard propulsion assembly 24 is rotated relative to inboard nacelle station 16e about cams 16g, 16h to reduce the angle therebetween, such that hooks 24i, 24j further penetrate into inboard nacelle station 16e providing a self location operation for the other mechanical and electrical connections. Specifically, as the angle between inboard propulsion assembly 24 and inboard nacelle station 16e is reduced, the male mating profile enters the female mating profile and pins 16j sequentially enter sockets 24l forming a multi-channel parallel interface. Depending upon the number of pin and sockets as well as the desired communication protocol being established therebetween, this electrical connection may provide single communication channels, redundant communication channels or triply redundant communication channels for the transfer of control commands, low power current, high power current and/or other signals between inboard propulsion assembly 24 and inboard nacelle station 16e to enable, for example, communication between flight control system 22 and components within inboard propulsion assembly 24 such as battery 24b, electronic speed controller 24c, electronics node 24d, sensors and/or other electronic equipment, as discussed herein.

As the angle between inboard propulsion assembly 24 and inboard nacelle station 16e is further reduced, a lower mechanical connection between inboard propulsion assembly 24 and inboard nacelle station 16e is established with slotted fastener 24k and spring 16i. Once spring 16i enters the channel of slotted fastener 24k, a simple manual or automated quarter turn rotation of slotted fastener 24k securely completes the mechanical and electrical connection of inboard propulsion assembly 24 with inboard nacelle station 16e. In a similar manner, the various connections may be made between pylons 18, 20 and pylon stations 14a, 14b, 16a, 16b, outboard propulsion assemblies 26 and outboard nacelle stations 14c, 14d, 16c, 16d, payload 30 and payload stations 18b, 20b as well as the other inboard propulsion assemblies 24 and inboard nacelle stations 14e, 14f, 16f, 18a, 20a, in accordance with the desired configuration of aircraft 10.

Disassembly of aircraft 10 is achieved by reversing the assembly process. Referring again to FIGS. 14A-14C, from the assembled state, a quarter turn rotation of slotted fastener 24k enables separation of slotted fastener 24k from spring 16i. Thereafter, inboard propulsion assembly 24 is rotated relative to inboard nacelle station 16e about cams 16g, 16h to increase the angle therebetween. As the angle between inboard propulsion assembly 24 and inboard nacelle station 16e is increased, the electrical connection between inboard propulsion assembly 24 and inboard nacelle station 16e is released as pins 16j sequentially separate from sockets 24l and the male mating profile separates from the female mating profile. As the angle between inboard propulsion assembly 24 and inboard nacelle station 16e is further increased, hooks 24i, 24j are released from cams 16g, 16 completing the mechanical and electrical decoupling of inboard propulsion assembly 24 from inboard nacelle station 16e. In a similar manner, the connections between pylons 18, 20 and pylon stations 14a, 14b, 16a, 16b, outboard propulsion assemblies 26 and outboard nacelle stations 14c, 14d, 16c, 16d, payload 30 and payload stations 18b, 20b as well as the other inboard propulsion assemblies 24 and inboard nacelle stations 14e, 14f, 16f, 18a, 20a may be decoupled.

Figure 15A:
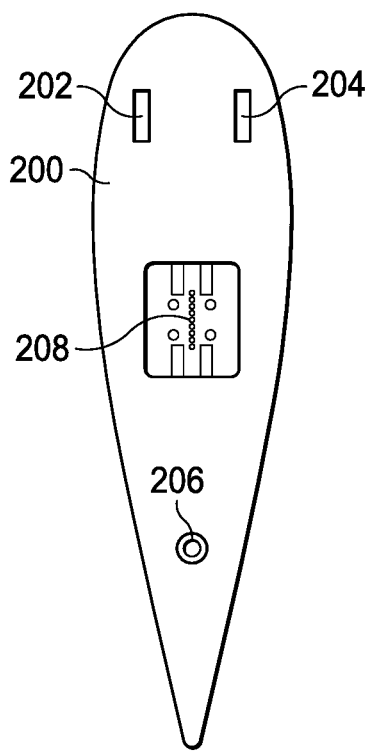
FIGS. 15A-15B are schematic illustrations of rapid connection interfaces operable for use in coupling component parts of an aircraft in accordance with embodiments of the present disclosure.
Figure 15B:
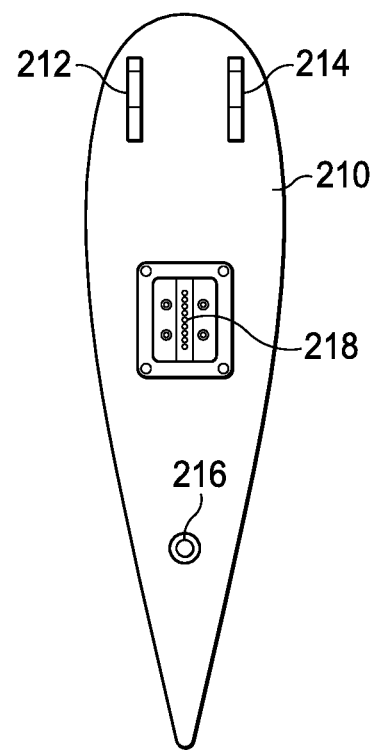

Referring to FIGS. 15A-15B of the drawings, an alternate embodiment of the structural and electrical connections between components of aircraft 10 will now be described. In the illustrated embodiment, a rapid connection interface 200 includes a pair of upper mechanical connections depicted as cams 202, 204 and a lower mechanical connection depicted as a female snap element 206. Disposed between upper mechanical connections 202, 204 and lower mechanical connection 206 is a central mechanical connection including an electrical connection depicted as a female mating profile and a plurality of pins 208. Rapid connection interface 200 may represent the connection interface of an inboard or outboard nacelle station, a pylon station and/or a payload station. In the illustrated embodiment, a rapid connection interface 210 includes a pair of upper mechanical connections depicted as hooks 212, 214 and a lower mechanical connection depicted as a male snap element 216. Disposed between upper mechanical connections 212, 214 and lower mechanical connection 216 is a central mechanical connection including an electrical connection depicted as a male mating profile and a plurality of sockets 218. Rapid connection interface 210 may represent the connection interface of an inboard or outboard propulsion assembly, a pylon and/or a payload. The connection of rapid connection interface 200 with rapid connection interface 210 is substantially similarly to the connection of inboard nacelle station 16e with rapid connection interface 24h described above with the exception that instead of using a quarter turn operation to securely complete the mechanical and electrical connection, a snapping operation is used to securely complete the mechanical and electrical connection. Likewise, the disassembly of rapid connection interface 200 from rapid connection interface 210 is substantially similarly to the disassembly of inboard nacelle station 16e and rapid connection interface 24h described above with the exception that instead of using a quarter turn operation to release the lower mechanical connection, an unsnapping operation is used to release the lower mechanical connection.

Figure 16A:
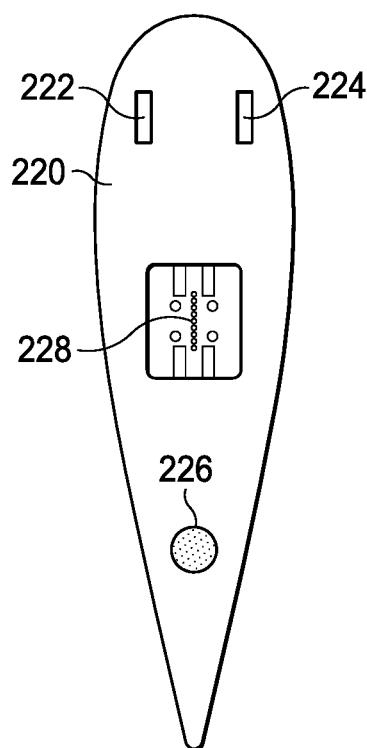
FIGS. 16A-16B are schematic illustrations of rapid connection interfaces operable for use in coupling component parts of an aircraft in accordance with embodiments of the present disclosure.
Figure 16B:
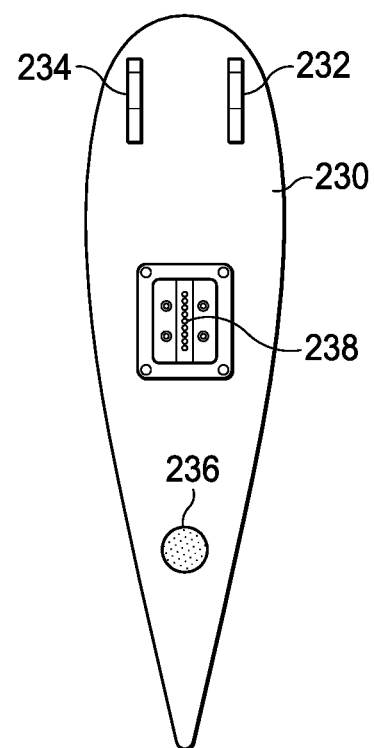

Referring to FIGS. 16A-16B of the drawings, another alternate embodiment of the structural and electrical connections between components of aircraft 10 will now be described. In the illustrated embodiment, a rapid connection interface 220 includes a pair of upper mechanical connections depicted as cams 222, 224 and a lower connection depicted as a magnetic element 226 such as a permanent magnet, a switchable magnet or an electromagnet. Disposed between upper mechanical connections 222, 224 and lower connection 226 is a central mechanical connection including an electrical connection depicted as a female mating profile and a plurality of pins 228. Rapid connection interface 220 may represent the connection interface of an inboard or outboard nacelle station, a pylon station and/or a payload station. In the illustrated embodiment, a rapid connection interface 230 includes a pair of upper mechanical connections depicted as hooks 232, 234 and a lower connection depicted as a magnetic element 236 such as a permanent magnet, a switchable magnet or an electromagnet. Disposed between upper mechanical connections 232, 234 and lower connection 236 is a central mechanical connection including an electrical connection depicted as a male mating profile and a plurality of sockets 238. Rapid connection interface 230 may represent the connection interface of an inboard or outboard propulsion assembly, a pylon and/or a payload. The connection of rapid connection interface 220 with rapid connection interface 230 is substantially similarly to the connection of inboard nacelle station 16e with rapid connection interface 24h described above with the exception that instead of using a quarter turn operation to securely complete the mechanical and electrical connection, magnetic attraction is used to securely complete the mechanical and electrical connection by, for example, establishing an electrical current to energize an electromagnet. Likewise, the disassembly of rapid connection interface 220 with rapid connection interface 230 is substantially similarly to the disassembly of inboard nacelle station 16e from rapid connection interface 24h described above with the exception that instead of using a quarter turn operation to release the lower mechanical connection, a mechanical force or discontinuing the electrical current is used to release the lower connection.

Figure 17A:
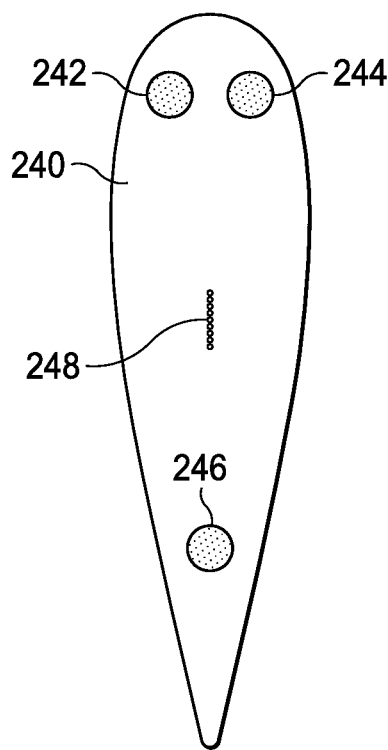
FIGS. 17A-17B are schematic illustrations of rapid connection interfaces operable for use in coupling component parts of an aircraft in accordance with embodiments of the present disclosure.
Figure 17B:
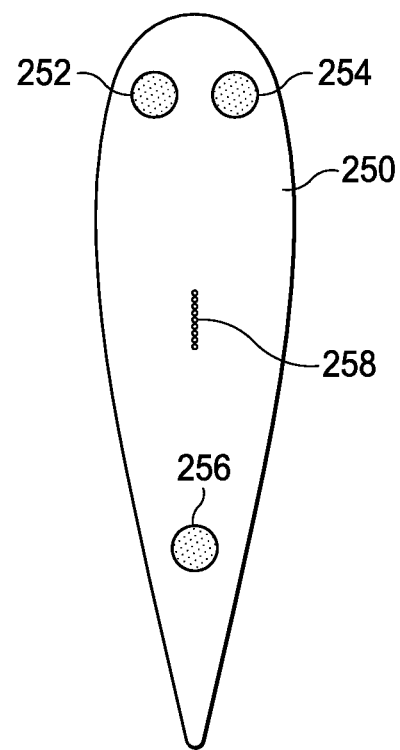

Referring to FIGS. 17A-17B of the drawings, a further alternate embodiment of the structural and electrical connections between components of aircraft 10 will now be described. This embodiment is particularly useful for payload coupling when remote release capabilities are desired. In the illustrated embodiment, a rapid connection interface 240 includes a pair of upper connections depicted as electromagnets 242, 244 and a lower connection depicted as an electromagnet 246. Disposed between upper connections 242, 244 and lower connection 246 is an electrical connection depicted as a plurality of pins 248. Rapid connection interface 240 may represent the connection interface of a payload station. In the illustrated embodiment, a rapid connection interface 250 includes a pair of upper connections depicted as magnets 252, 254 and a lower connection depicted as a magnet 256. Disposed between upper connections 252, 254 and lower connection 256 is an electrical connection depicted as a plurality of sockets 258. Rapid connection interface 250 may represent the connection interface of a payload. The connection of rapid connection interface 240 with rapid connection interface 250 is achieved by aligning upper connections 242, 244, lower connection 246 and electrical connections 248 with upper connections 252, 254, lower connection 256 and electrical connections 258 then engaging a current to create the desired magnetic attraction. In the case of the remotely releasable payload embodiment, when aircraft 10 has transported payload 30 to a desired location, flight control system 22, either autonomously or responsive to commands send from computing system 108, may disengage the current to electromagnets 242, 244, 246 which ends the magnetic attraction to magnets 252, 254, 256 thus releasing payload 30 from airframe 12 either during flight or after landing aircraft 10.

Referring to FIGS. 18A-18D of the drawings, certain unique operations of aircraft 10 will now be described. As discussed herein, aircraft 10 is operable to transition between thrust-borne lift in a VTOL orientation and wing-borne lift in a biplane orientation. In addition, responsive to flight control system 22 independently controlling each propulsion assembly of aircraft 10 including speed control, thrust vectoring and/or aerosurface maneuvers, aircraft 10 is operable to maintain hover stability in level flight attitudes and inclined flight attitudes while also having pitch, roll, yaw and translation authority. In the illustrated embodiment, aircraft 10 has been configured with a two-dimensional distributed thrust array of outboard propulsion assembles 26, such as aircraft 10 depicted in FIGS. 8A-8B. Aircraft 10 has a longitudinal axis 10a and lateral axis 10b which are each located in the horizontal plane H, normal to the local vertical in the earth's reference frame, when aircraft 10 has a level flight attitude in hover (see FIG. 2B). Having hover stability in a level flight attitude is an important characteristic achieved by many VTOL aircraft. With aircraft 10, such hover stability in a level flight attitude is achieved and/or maintained using the various flight attitude controls as discussed herein. Aircraft 10, however, is also operable to achieve and/or maintain hover stability in inclined flight attitudes using the various flight attitude controls including speed control, thrust vectoring, aerosurface maneuvers and combinations thereof of the propulsion assemblies. For example, aircraft 10 has in a nonzero pitch down flight attitude in FIG. 18A and a nonzero pitch up flight attitude in FIG. 18B. Angle P represents the pitch angle relative to the horizontal plane H that may be up to about five degrees, between about five degrees and about fifteen degrees, between about fifteen degrees and about twenty-five degrees, between about twenty-five degrees and about thirty-five degrees or other desired angle. For example, once aircraft 10 has transitioned from hover in a level flight attitude to hover in a nonzero pitch flight attitude, aircraft 10 may maintain hover stability in the nonzero pitch flight attitude using collective thrust vectoring of propulsion assemblies 26, as illustrated in FIGS. 18A-18B, wherein each of the rotor assemblies is rotating in a plane substantially parallel to the horizontal plane H. Depending upon the magnitude of angle P and the maximum thrust vector angle of propulsion assemblies 26, the collective thrust vectoring flight attitude control may be augmented with differential speed control and/or aerosurface maneuvers of propulsion assemblies 26. The ability to maintain hover stability in a nonzero pitch flight attitude may be particularly useful during missions requiring orientation of payload 30 relative to a stationary or moving target on the ground or in the air such as during missions using the light detection and ranging module, the camera module, the optical targeting module, the laser module, the air-to-ground weapons module or the air-to-air weapons module.

Aircraft 10 has in a nonzero roll right flight attitude in FIG. 18C and a nonzero roll left flight attitude in FIG. 18D. Angle R represents the roll angle relative to the horizontal plane H that may be up to about five degrees, between about five degrees and about fifteen degrees, between about fifteen degrees and about twenty-five degrees, between about twenty-five degrees and about thirty-five degrees or other desired angle. For example, once aircraft 10 has transitioned from hover in a level flight attitude to hover in a nonzero roll flight attitude, aircraft 10 may maintain hover stability in the nonzero roll flight attitude using collective thrust vectoring of propulsion assemblies 26 as illustrated in FIGS. 18C-18D, wherein each of the rotor assemblies is rotating in plane substantially parallel to the horizontal plane H. Depending upon the magnitude of angle R and the maximum thrust vector angle of propulsion assemblies 26, the collective thrust vectoring flight attitude control may be augmented with differential speed control and/or aerosurface maneuvers of propulsion assemblies 26. The ability to maintain hover stability in a nonzero roll flight attitude may be particularly useful during missions using the package delivery module, the cargo hook module or missions requiring vertical takeoffs and landings on unlevel surfaces and/or autonomous or self-docking of aircraft 10.

While FIGS. 18A-18B have described and depicted aircraft 10 maintaining hover stability in a nonzero pitch flight attitude and FIGS. 18C-18D have described and depicted aircraft 10 maintaining hover stability in a nonzero roll flight attitude, it should be understood by those having ordinary skill in the art that aircraft 10 is also operable to maintain hover stability when aircraft 10 has a combination of a nonzero pitch flight attitude and a nonzero roll flight attitude using the various flight attitude controls of aircraft 10 including speed control, thrust vectoring, aerosurface maneuvers and combinations thereof of the propulsion assemblies. To maintain hover stability in any inclined flight attitude, the propulsion system of aircraft 10 should preferably be formed as a two-dimensional distributed array of omnidirectional thrust vectoring propulsion assemblies. It is noted, however, that selected hover stability in a single inclined orientation could be achieved with collective thrust vectoring of a two-dimensional distributed array of unidirectional thrust vectoring propulsion assemblies. For example, maintaining hover stability in the nonzero pitch flight attitude may be achieved using collective thrust vectoring of propulsion assemblies having longitudinal thrust vectoring capabilities. Likewise, maintaining hover stability in the nonzero roll flight attitude may be achieved using collective thrust vectoring of propulsion assemblies having lateral thrust vectoring capabilities.

Figure 19A:
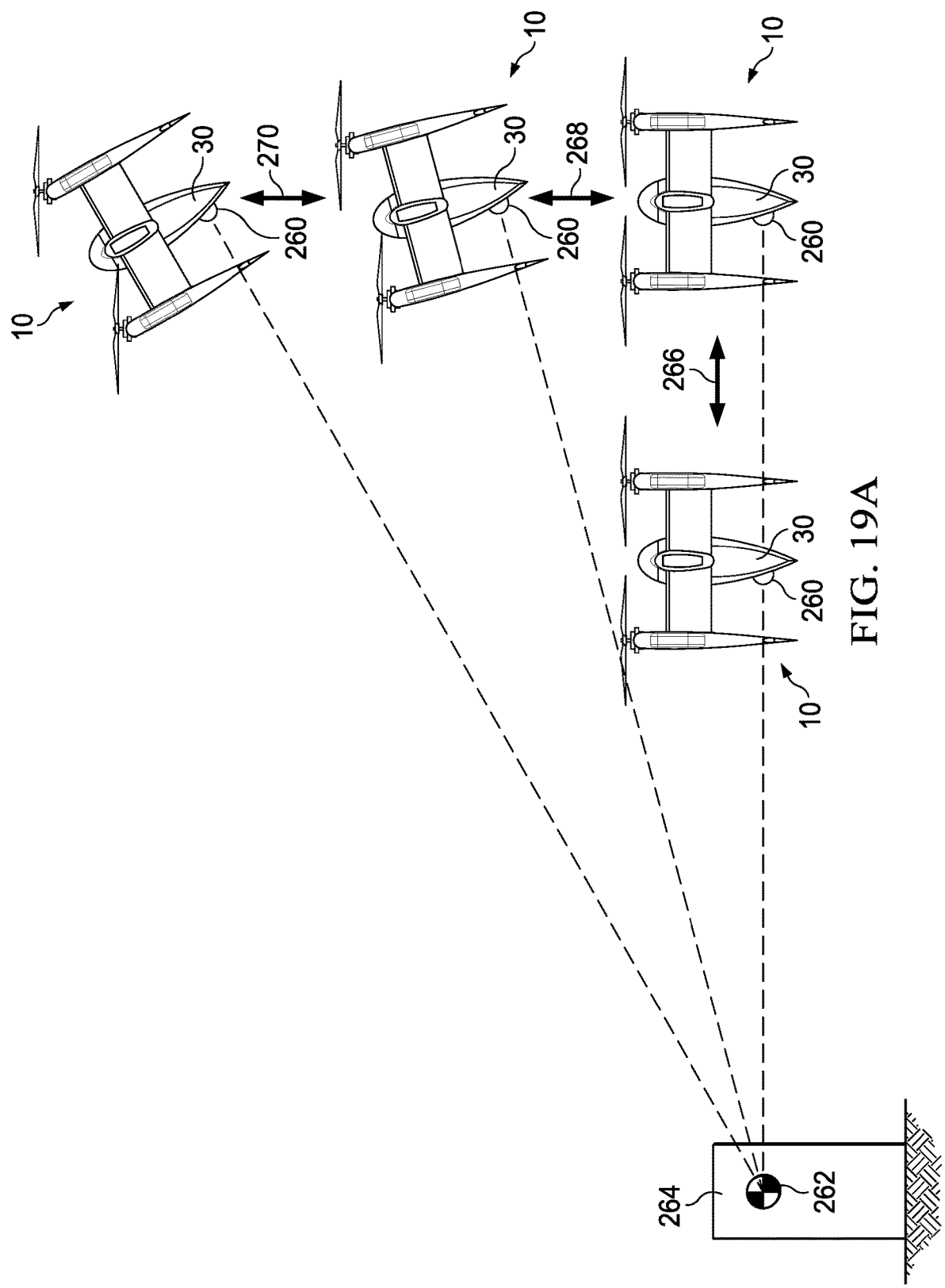
FIGS. 19A-19B are schematic illustrations of an aircraft operable to translate and change altitude in level and inclined flight attitudes in accordance with embodiments of the present disclosure.
Figure 19B:
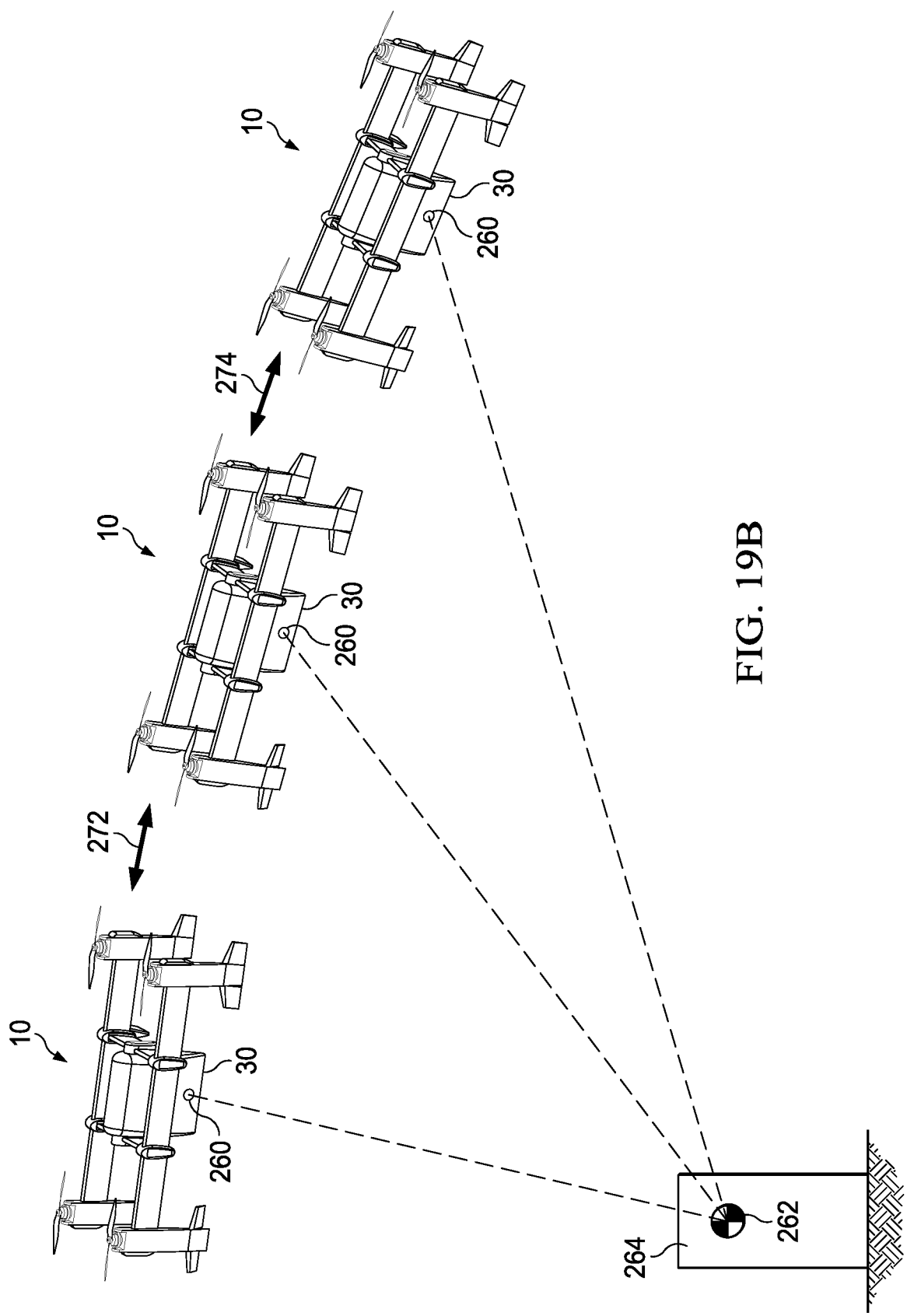

FIG. 19A-19B depict additional capabilities of aircraft 10 that are achievable through flight control system 22 independently controlling each propulsion assembly of aircraft 10 including speed control, thrust vectoring, aerosurface maneuvers and combinations thereof. Aircraft 10 is depicted with payload 30 having an aerial imaging module 260 such as a light detection and ranging module, a camera module, an X-ray module or the like. As illustrated, aerial imaging module 260 is orientated toward a focal point 262 of a stationary object 264 on the ground such as a military target or a structure being inspected. As represented by arrow 266, flight control system 22 is operable to maintain the orientation of aerial imaging module 260 toward focal point 262 when aircraft 10 is translating in a level flight attitude, such as moving in the depicted fore-aft direction, moving in the lateral direction or moving in any diagonal direction therebetween. This translation is accomplished responsive to controlling the speed, the thrust vector and/or the aerosurface position of each of the propulsion assemblies.

Similarly, as represented by arrows 268, 270, flight control system 22 is operable to maintain the orientation of aerial imaging module 260 toward focal point 262 when aircraft 10 is changing altitude by simultaneously adjusting the flight attitude of aircraft 10. These altitude and attitude changes are accomplished responsive to controlling the speed, the thrust vector and/or the aerosurface position of each of the propulsion assemblies. For example, as aircraft 10 increases altitude from the lower right position to the middle position along arrow 268, aircraft 10 transitions from a level flight attitude to a pitch down flight attitude with an incline or pitch angle P of between about five degrees and about fifteen degrees. As aircraft 10 further increases altitude from the middle position to the upper right position along arrow 270, aircraft 10 transitions from a pitch down flight attitude with an incline or pitch angle P of between about five degrees and about fifteen degrees to a pitch down flight attitude with an incline or pitch angle P of between about fifteen degrees and about twenty-five degrees.

As represented by arrows 272, 274 in FIG. 19B, flight control system 22 is operable to maintain the orientation of aerial imaging module 260 toward focal point 262 when aircraft 10 is translating in an inclined flight attitude, such as moving in the fore-aft direction, moving in the depicted lateral direction or moving in any diagonal direction therebetween. This translation is accomplished responsive to controlling the speed, the thrust vector and/or the aerosurface position of each of the propulsion assemblies. In one example, aircraft 10 is operable to travel in circles around stationary object 264 while maintaining the orientation of aerial imaging module 260 toward focal point 262 to engage in, for example, phased array aerial imaging and/or three dimensional aerial imaging of ground object 264.

Referring next to FIGS. 20A-20D, an advantageous use of aircraft 10 during external load operations is depicted. As discussed herein, aircraft 10 is operable to transition between thrust-borne lift in a VTOL orientation and wing-borne lift in a biplane orientation. In addition, in the VTOL orientation, aircraft 10 is operable to maintain hover stability while translating in a level flight attitude or an inclined flight attitude using the various flight attitude controls discussed herein. These unique capabilities of aircraft 10 enable aircraft 10 to lift, carry and transport cargo and/or equipment externally as a sling load. For example, aircraft 10 may engage in external load operations for military campaigns including ship-to-shore movement of equipment during amphibious operations, movement of supplies over a battlefield, vertical replenishment of ships, firepower emplacement and the like without putting pilots at risk. Aircraft 10 provides external load transportation advantages including the rapid movement of heavy or outsized equipment, efficient delivery of emergency supplies directly to the user, the ability to bypass surface obstacles as well as the use of multiple flight routes and/or landing sites, thereby providing improved movement flexibility to accomplish a mission.

Figure 20A:
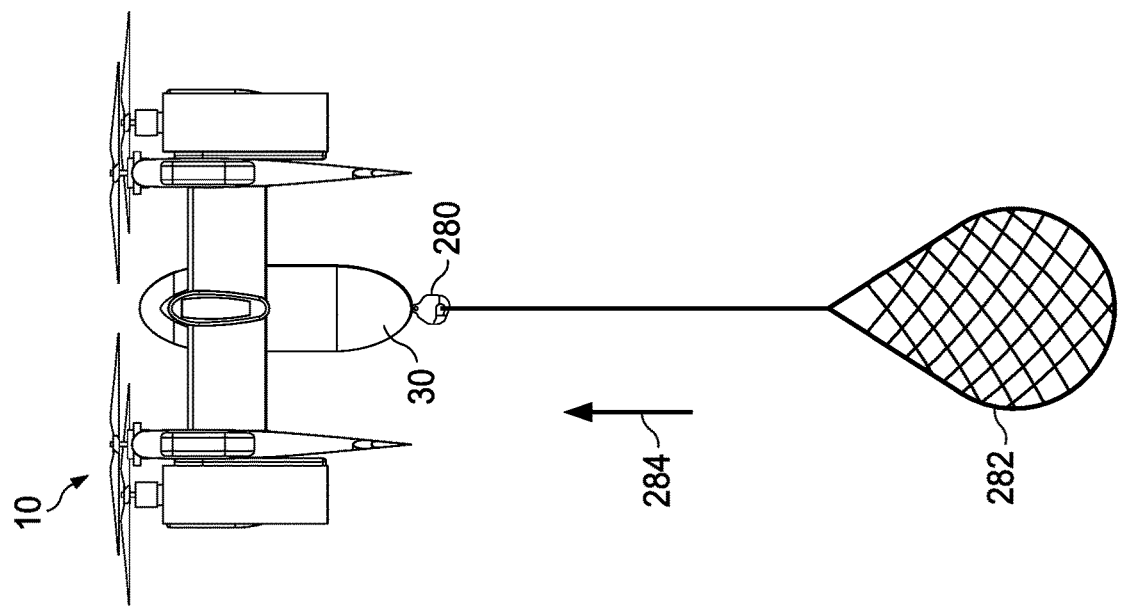
FIGS. 20A-20D are schematic illustrations of an aircraft operable for external load operations in accordance with embodiments of the present disclosure.
Figure 20B:
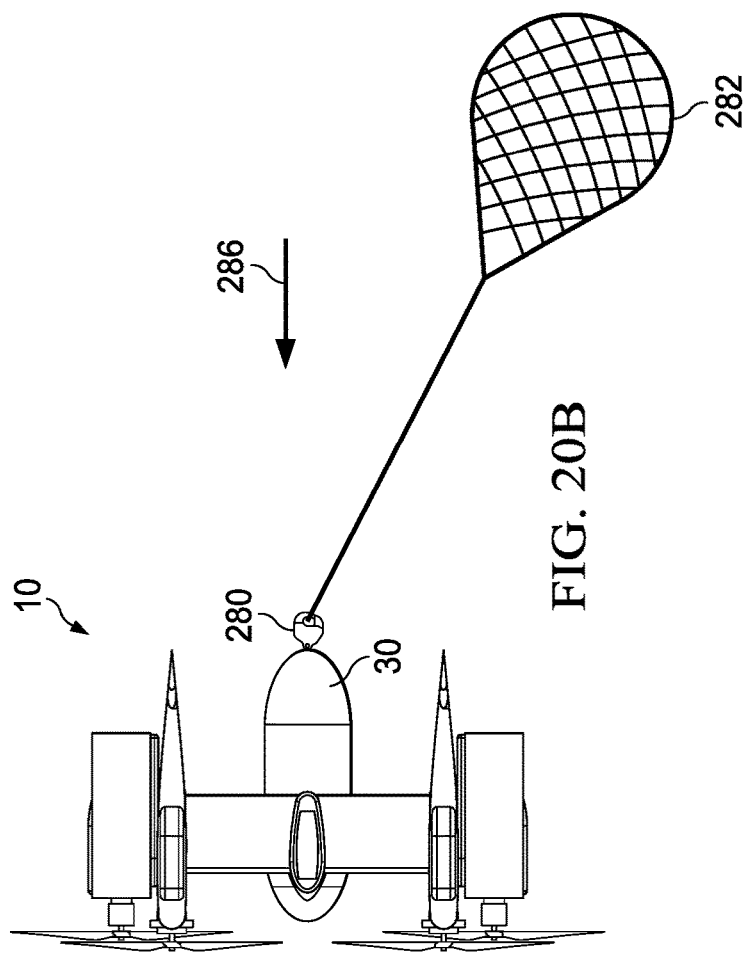

In FIG. 20A, aircraft 10 is engaged in aerial crane operations. Specifically, aircraft 10 includes payload 30 having a cargo hook module 280. In the illustrated embodiment, cargo hook module 280 includes a fixed cargo hook attached to a lower portion of payload 30 when aircraft 10 is in the VTOL orientation. The cargo hook is operable to receive and suspend equipment underneath aircraft 10. In the illustrated embodiment, a cargo net 282 is being used to support supplies and/or equipment disposed therein. The cargo hook may be opened manually and/or electrically by the ground crew during hookup and release operations while aircraft 10 is on the ground or during flight by attaching or removing, for example, a cargo net apex fitting ring from the cargo hook. During flight, a spring-loaded keeper prevents the fitting ring from slipping off the load beam of the cargo hook. In FIG. 20A, aircraft 10 is engaging in thrust-borne lift in the VTOL orientation and is ascending, as indicated by arrow 284, with the external load disposed within cargo net 282 and supported by cargo hook module 280. In FIG. 20B, aircraft 10 has transitioned to wing-borne lift in the biplane orientation and is engaged in forward flight, as indicated by arrow 286. Depending upon the weight of the external load, aircraft 10 may be in a low thrust to weight configuration and may use a low thrust to weight transition procedure for the thrust-borne lift to wing-borne lift transition, as discussed herein. Upon arrival at the destination, aircraft 10 may transition back to the VTOL orientation and lower the external load such that ground crew may manually and/or electrically open the cargo hook to release the external load while aircraft 10 remains in the air or after aircraft 10 has landed.

Figure 20D:
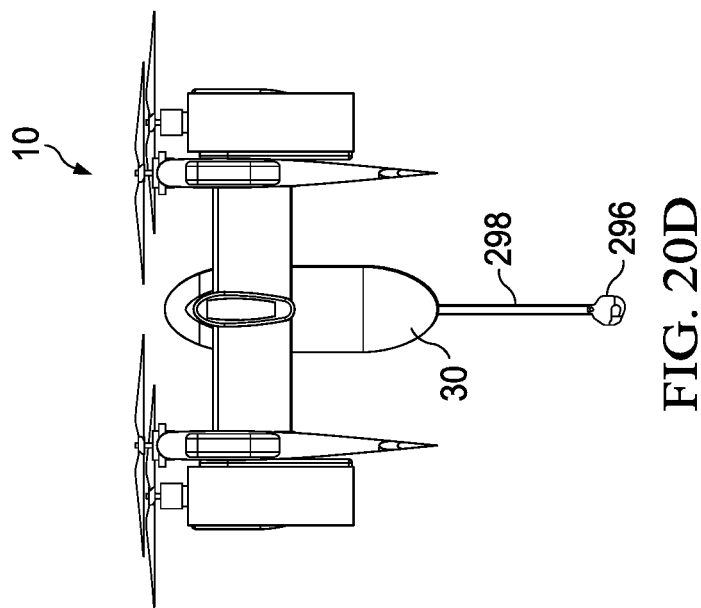
Figure 20C:
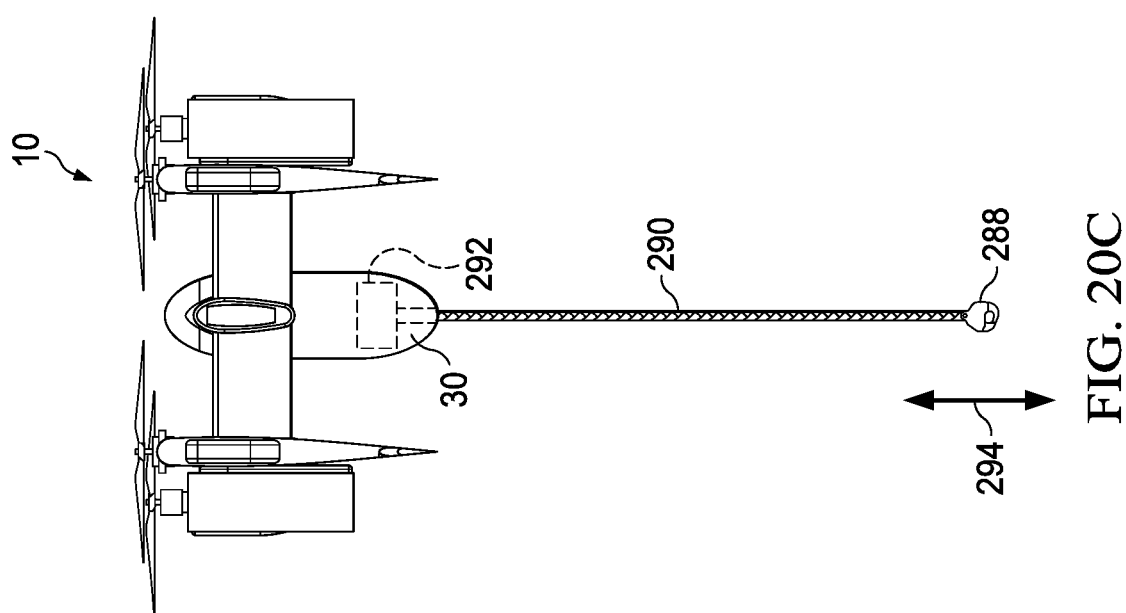

FIG. 20C, depicts an alternate embodiment of aircraft 10 having a payload 30 including a cargo hook module 288. In the illustrated embodiment, cargo hook module 288 includes a cargo hoisting device operable to raise and lower an external load while aircraft 10 remains in a stable hover. Cargo hook module 288 includes a retractable hoisting cable 290 that is supported by a cargo hook winch system 292 for raising and lowering the cargo hook, as indicated by arrow 294. FIG. 20D, depicts another alternate embodiment of aircraft 10 having a payload 30 including a cargo hook module 296. In the illustrated embodiment, cargo hook module 296 includes a remote or free-swinging cargo hook on a fixed length sling leg assembly cable 298 that is operable to suspend the cargo hook a desired distance from the bottom of aircraft 10.

Referring additionally to FIGS. 21A-21E and 22A-22E, multiple VTOL to biplane transition procedures selected based upon the thrust to weight configuration of aircraft 10 will now be described. As discussed herein, aircraft 10 is a mission configurable aircraft that is operable to transition between thrust-borne lift in a VTOL orientation and wing-borne lift in a biplane orientation. As aircraft 10 is mission configurable, the particular thrust array that is coupled to a particular airframe may vary depending upon factors including flight parameters such as time requirements, flight speed requirements, elevation requirements, range requirements, endurance requirements, environmental conditions and the like as well as payload parameters such as payload weight requirements, payload functionality requirements, payload coupling and decoupling requirements, payload operational requirements, external loads requirements and the like. During certain portions of a mission, such as after picking up a payload or an external load, aircraft 10 may have a low thrust to weight configuration with a thrust to weight ratio below a first predetermined threshold, while during other portions of a mission, such as after delivery of a payload or releasing the external load, aircraft 10 may have a high thrust to weight configuration with a thrust to weight ratio above a second predetermined threshold. For example, the predetermined threshold for the low thrust to weight configuration of aircraft 10 may be about 1.4 or may be stated as between about 1.1 and about 1.4. The predetermined threshold for the high thrust to weight configuration of aircraft 10 may be about 1.7.

Figure 21A:
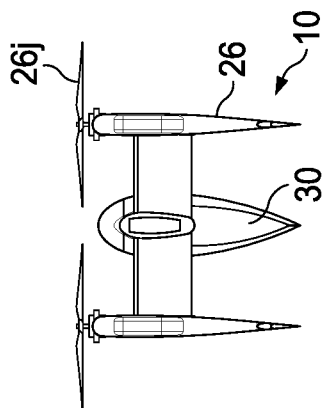
FIGS. 21A-21E are schematic illustrations of an aircraft operable to perform transitions from a VTOL orientation to a biplane orientation in a low thrust to weight configuration in accordance with embodiments of the present disclosure.
Figure 21B:
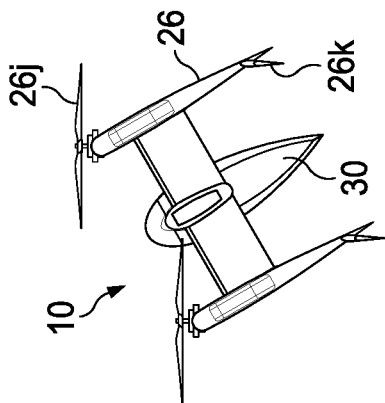

As illustrated in FIGS. 21A-21E, aircraft 10 is in a low thrust to weight configuration and thus preforms a low thrust to weight transition procedure. In the illustrated embodiment, aircraft 10 includes a two-dimensional distributed thrust array of outboard propulsion assemblies 26 coupled to the outboard nacelle stations of the wings, such as the embodiment depicted in FIGS. 8A-8B. Even through a particular aircraft is depicted in FIGS. 21A-21E, it should be understood by those having ordinary skill in the art that any of the aircraft of the present disclosure having omnidirectional or longitudinal thrust vectoring propulsion assemblies could also preform the low thrust to weight transition procedure. In this procedure, the initial step involves engaging in a stable hover at a substantially level flight attitude, as illustrated in FIG. 21A. The next step involves establishing a pitch down flight attitude while maintaining a stable hover, as illustrated in FIG. 21B. This step is accomplished through the use of the flight attitude controls including rotor speed, thrust vector, aerosurface position and combinations thereof of one or more of the propulsion assemblies 26. For example, using differential speed control the rotor assemblies 26j of the forward propulsion assemblies relative to the aft propulsion assemblies in combination with collective thrust vectoring, the level flight attitude is transitioned to the desired pitch down flight attitude. For example, the pitch down flight attitude may be between about 10 degrees and about 20 degrees relative to the horizontal. Alternatively, the pitch down flight attitude may be between about 20 degrees and about 30 degrees relative to the horizontal. The angle of the thrust vectors should substantially match the pitch down angle relative to the horizontal in order to maintain the stable hover. Optionally, collective tilting of the aerosurfaces 26k may be use such that air blowing thereon generates a pitch down moment for aircraft 10 to urge aircraft 10 in the pitch down direction, as illustrated in FIG. 21B.

Figure 21C:
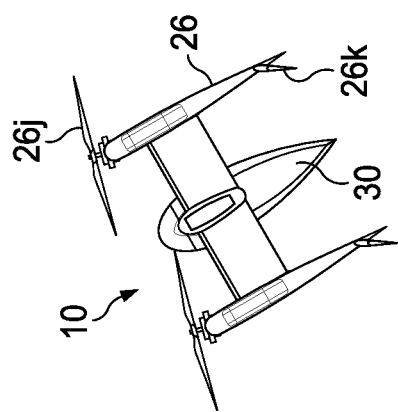
Figure 21D:
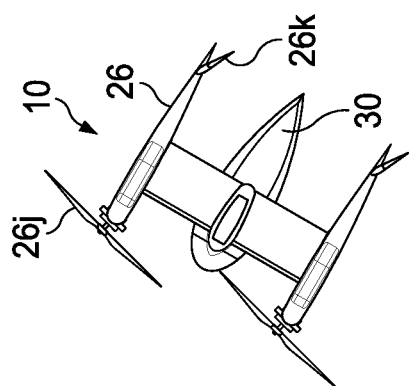
Figure 21E:
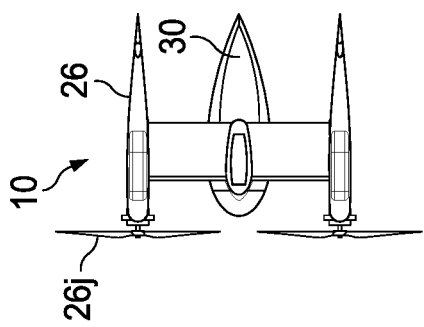

The next step involves initiating forward flight, as illustrated in FIG. 21C. Beginning from the stable hover condition, collective increase or decrease in rotor speed will result in an increase or decrease in altitude if desired. Collective reduction of the thrust vector angles causes the rotors assemblies 26j to tilt forward from the horizontal which in turn changes the direction of the thrust vectors to include not only down components but also aft components. The aft thrust vector components initiate the forward movement of aircraft 10. As the airspeed increases, the thrust vector angles are collective reduced while simultaneously increasing the pitch down attitude of aircraft 10 until the thrust vectors and the wings are substantially horizontal, as seen in the progression of FIGS. 21C-21E. By reducing the angle of attack of the wings in pitch down configuration prior to initiating forward flight, wing-borne lift can be generated at a lower forward airspeed thus enabling the low thrust to weight transitions from VTOL orientation to biplane orientation of aircraft 10.

Figure 22E:
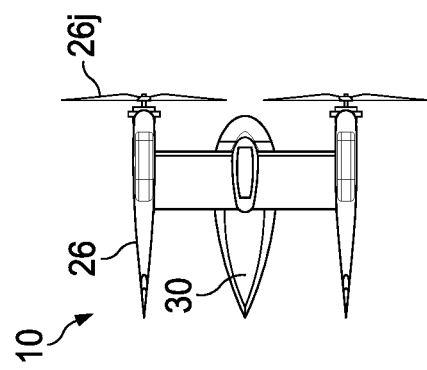
FIGS. 22A-22E are schematic illustrations of an aircraft operable to perform transitions from a VTOL orientation to a biplane orientation in a high thrust to weight configuration in accordance with embodiments of the present disclosure.
Figure 22D:
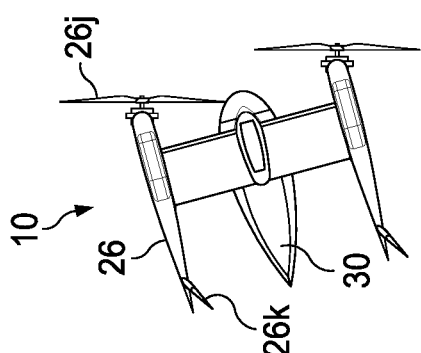
Figure 22C:
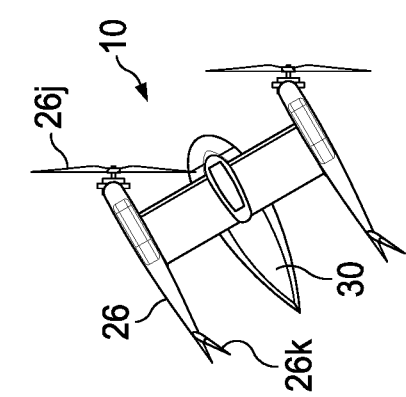
Figure 22B:
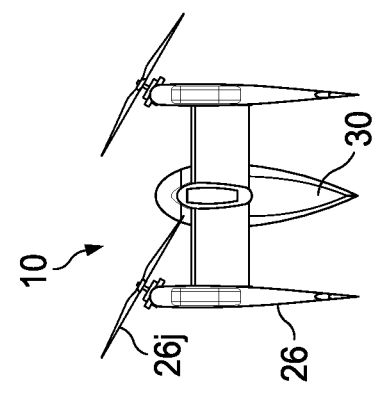
Figure 22A:
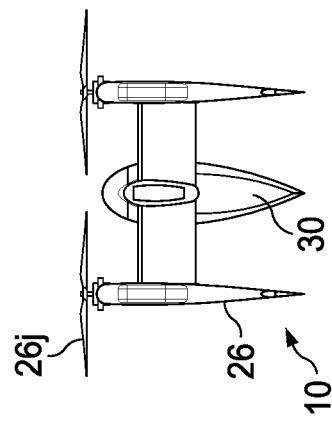

As illustrated in FIGS. 22A-22E, aircraft 10 is in a high thrust to weight configuration and thus preforms a high thrust to weight transition procedure. In this procedure, the initial step may involve engaging in a stable hover at a substantially level flight attitude, as illustrated in FIG. 22A. From this condition, collective increase or decrease in rotor speed will result in an increase or decrease in altitude if desired. The next step involves engaging in collective thrust vectoring of propulsion assemblies 26 to initiate forward flight, as illustrated in FIG. 22B. The next step involves maintaining the thrust vector angles and increasing the pitch down attitude of aircraft 10 until the thrust vectors are substantially horizontal, as illustrated in FIG. 22C. Optionally, collective tilting of the aerosurfaces 26k may be use such that air blowing thereon generates a pitch down moment for aircraft 10 to urge aircraft 10 in the pitch down direction, as illustrated in FIG. 22C. This is followed by collectively reducing the thrust vector angles and increasing the pitch down attitude while maintaining the thrust vectors substantially horizontal until the wings are also substantially horizontal, as seen in the progression of FIGS. 22C-22E. In the high thrust to weight configuration of aircraft 10, the command authority provided by collective thrust vectoring may provide the most efficient response when transitioning from VTOL orientation to biplane orientation is desired.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A method of prioritizing use of flight attitude controls of an aircraft operable to transition between thrust-borne lift in a VTOL orientation and wing-borne lift in a biplane orientation, the method comprising:
    determining an optimal flight attitude state for the aircraft during flight, the aircraft including first and second wings with first and second pylons coupled therebetween forming an airframe, each pylon including a payload station, a payload non-rotatably coupled to the payload stations of the first and second pylons, a plurality of propulsion assemblies coupled to the airframe forming a two-dimensional distributed thrust array and a plurality of aerosurfaces coupled to the airframe, the first wing positioned forward of the payload and the second wing positioned aft of the payload with each of the propulsion assemblies rotating in the same horizontal plane, in the VTOL orientation, and the first wing positioned below the payload and the second wing positioned above the payload with each of the propulsion assemblies rotating in the same vertical plane, in the biplane orientation;
    monitoring a current flight attitude state of the aircraft including determining whether the aircraft is in the VTOL orientation or the biplane orientation;
    identifying deviations between the current flight attitude state and the optimal flight attitude state;
    ordering the flight attitude controls of the aircraft based upon a flight attitude control authority of each of the flight attitude controls in the current flight attitude state; and
    implementing a highest order flight attitude control to bias the aircraft from the current flight attitude state toward the optimal flight attitude state.

2. The method as recited in claim 1 wherein identifying deviations between the current flight attitude state and the optimal flight attitude state further comprises identifying deviations between a current pitch state and an optimal pitch state of the aircraft.

3. The method as recited in claim 1 wherein identifying deviations between the current flight attitude state and the optimal flight attitude state further comprises identifying deviations between a current roll state and an optimal roll state of the aircraft.

4. The method as recited in claim 1 wherein identifying deviations between the current flight attitude state and the optimal flight attitude state further comprises identifying deviations between a current yaw state and an optimal yaw state of the aircraft.

5. The method as recited in claim 1 wherein identifying deviations between the current flight attitude state and the optimal flight attitude state further comprises identifying deviations between current pitch, roll and yaw states and optimal pitch, roll and yaw states of the aircraft.

6. The method as recited in claim 1 wherein monitoring the current flight attitude state of the aircraft further comprises identifying the occurrence of a flight anomaly.

7. The method as recited in claim 1 wherein ordering the flight attitude controls of the aircraft further comprises determining the flight attitude control authority provided by thrust vectoring, changing rotor speed, changing aerosurface position and combination thereof in the current flight attitude state.

8. The method as recited in claim 1 further comprising sensing the aircraft response to implementing the highest order flight attitude control to bias the aircraft from the current flight attitude state toward the optimal flight attitude state;
  determining whether the aircraft response was consistent with an expected aircraft response; and
  implementing a second highest order flight attitude control to bias the aircraft from the current flight attitude state to the optimal flight attitude state if the aircraft response to the highest order flight attitude control was not consistent with the expected aircraft response.

9. A system for prioritizing use of flight attitude controls of an aircraft operable to transition between thrust-borne lift in a VTOL orientation and wing-borne lift in a biplane orientation, the system comprising:
  a flight control computing system having logic stored within a non-transitory computer readable medium, the logic executable by a processor, wherein the flight control computing system is configured to:
  determine an optimal flight attitude state for the aircraft during flight, the aircraft including first and second wings with first and second pylons coupled therebetween forming an airframe, each pylon including a payload station, a payload non-rotatably coupled to the payload stations of the first and second pylons, a plurality of propulsion assemblies coupled to the airframe forming a two-dimensional distributed thrust array and a plurality of aerosurfaces coupled to the airframe, the first wing positioned forward of the payload and the second wing positioned aft of the payload with each of the propulsion assemblies rotating in the same horizontal plane, in the VTOL orientation, and the first wing positioned below the payload and the second wing positioned above the payload with each of the propulsion assemblies rotating in the same vertical plane, in the biplane orientation;
  monitor a current flight attitude state of the aircraft including determining whether the aircraft is in the VTOL orientation or the biplane orientation;
  identify deviations between the current flight attitude state and the optimal flight attitude state;
  order the flight attitude controls of the aircraft based upon a flight attitude control authority of each of the flight attitude controls in the current flight attitude state; and
  implement a highest order flight attitude control to bias the aircraft from the current flight attitude state toward the optimal flight attitude state.

10. The system as recited in claim 9 wherein the flight control computing system is configured to identify deviations between a current pitch state and an optimal pitch state of the aircraft.

11. The system as recited in claim 9 wherein the flight control computing system is configured to identify deviations between a current roll state and an optimal roll state of the aircraft.

12. The system as recited in claim 9 wherein the flight control computing system is configured to identify deviations between a current yaw state and an optimal yaw state of the aircraft.

13. The system as recited in claim 9 wherein the flight control computing system is configured to identify deviations between current pitch, roll and yaw states and optimal pitch, roll and yaw states of the aircraft.

14. The system as recited in claim 9 wherein the flight control computing system is configured to identify the occurrence of a flight anomaly.

15. The system as recited in claim 9 wherein the flight control computing system is configured to determine the flight attitude control authority provided by thrust vectoring, changing rotor speed, changing aerosurface position and combination thereof in the current flight attitude state.

16. The system as recited in claim 9 wherein the flight control computing system is configured to sense the aircraft response to the implementation of the highest order flight attitude control to bias the aircraft from the current flight attitude state toward the optimal flight attitude state;
  determine whether the aircraft response was consistent with an expected aircraft response; and
  implement a second highest order flight attitude control to bias the aircraft from the current flight attitude state to the optimal flight attitude state if the aircraft response to the highest order flight attitude control was not consistent with the expected aircraft response.

* * * * *